US012749304B1

(12) United States Patent
Khan et al.

(10) Patent No.: US 12,749,304 B1
(45) Date of Patent: Sep. 29, 2026

(54) METHOD AND SYSTEM FOR AERIAL LAND RECOGNITION BASED ON REMOTE SENSING IMAGES

(71) Applicant: PRINCE MOHAMMAD BIN FAHD UNIVERSITY, Dhahran (SA)

(72) Inventors: Muhammad Attique Khan, Dhahran (SA); Faisal Yousif Al Anezi, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

(21) Appl. No.: 19/629,166

(22) Filed: Mar. 26, 2026

(51) Int. Cl.
*G06V 20/13* (2022.01)
*G06F 16/55* (2019.01)
(Continued)

(52) U.S. Cl.
CPC .............. *G06V 20/13* (2022.01); *G06F 16/55* (2019.01); *G06V 10/52* (2022.01); *G06V 10/764* (2022.01);
(Continued)

(58) Field of Classification Search
None
See application file for complete search history.

(56) References Cited

U.S. PATENT DOCUMENTS

| | | | | |
|---|---|---|---|---|
| 12,136,134 B2 * | 11/2024 | Budlong | ............. | G06F 3/04817 |
| 2015/0071528 A1 * | 3/2015 | Marchisio | ............... | G06F 16/29 382/159 |

(Continued)

FOREIGN PATENT DOCUMENTS

| | | | | |
|---|---|---|---|---|
| CN | 114596502 B * | 4/2023 | ........... | G06F 18/214 |
| CN | 116523934 A | 8/2023 | | |

(Continued)

OTHER PUBLICATIONS

Khan, M.—“SEMSF-Net: Explainable Squeeze-Excitation Multiscale Fusion Network for Aerial Scene and Coastal Area Recognition Using Remote Sensing Images”—IEEE 2025—pp. 15755-15773 (Year: 2025).*

(Continued)

*Primary Examiner* — Bernard Krasnic
(74) *Attorney, Agent, or Firm* — Oblon, McClelland, Maier & Neustadt, L.L.P.

(57) ABSTRACT

A method and system for land use classification includes capturing remote sensing (RS) images by sensors on various remote sensing devices. The system includes a satellite constellation and an image database system. The database system stores classified remote sensing images in the image database system by downstream application. The system is provided with an input interface and built-in database functions for performing analysis on remote-sensing images. The method includes receiving the RS images by server communication circuitry and storing the RS images in memory. The method includes iteratively training a deep learning network that integrates an input layer, a residual block, inception blocks, bottleneck blocks and inverted bottleneck blocks, dense blocks, having integrated squeeze-excitation blocks. The method includes inputting the RS images, preventing a training gradient from vanishing, extracting features at multiple scales, balancing computational cost, and promoting reuse of the extracted features.

20 Claims, 53 Drawing Sheets

(51) Int. Cl.

| | |
|---|---|
| ***G06V 10/52*** | (2022.01) |
| ***G06V 10/764*** | (2022.01) |
| ***G06V 10/77*** | (2022.01) |
| ***G06V 10/778*** | (2022.01) |
| ***G06V 10/82*** | (2022.01) |
| ***G06V 20/70*** | (2022.01) |

(52) U.S. Cl.

CPC ........ *G06V 10/7715* (2022.01); *G06V 10/778* (2022.01); *G06V 10/82* (2022.01); *G06V 20/70* (2022.01)

(56) References Cited

U.S. PATENT DOCUMENTS

| | | | | |
|---|---|---|---|---|
| 2024/0071393 | A1 | 2/2024 | Simonchik et al. | |
| 2025/0285467 | A1* | 9/2025 | Tripathi | G06T 3/18 |

FOREIGN PATENT DOCUMENTS

| | | | | | |
|---|---|---|---|---|---|
| WO | WO2024/199543 | A1 | | 10/2024 | |
| WO | WO-2025144823 | A1 | * | 7/2025 | G06V 20/10 |

OTHER PUBLICATIONS

Khan, M.—“A Novel Multiscale Feature Fusion With Adaptive Scale-Space Pyramid Network for Aerial Scene Recognition Using Remote Sensing Images”—IEEE 2026—pp. 4337-4357 (Year: 2026).*

Khan, M.—“Coastal and Land Use Land Cover Area Recognition From High-Resolution Remote Sensing Images Using a Novel Multimodal Attention Inception Residual Deep Network”—IEEE 2025—pp. 17460-17475 (Year: 2025).*

Dewangkoro, H.I.—“Land Use and Land Cover Classification Using CNN, SVM, and Channel Squeeze & Spatial Excitation Block”—IOP Conf. Series: Earth and Environmental Science 704—2021—pp. 1-8 (Year: 2021).*

Deressu, T.F.—“Enhancing land use and land cover classification with deep learning-based satellite imagery segmentation”—International Journal of Applied Earth Observation and Geoinformation 2025—pp. 1-24 (Year: 2025).*

M. Sundara Srivathsan et al., “An explainable hybrid feature aggregation network with residual inception positional encoding attention and EfficientNet for cassava leaf disease classification”, Scientific Reports, vol. 15, Article No. 11750 (2025), 16 pages.

* cited by examiner

Proposed Inception Block
900

1404

METHOD AND SYSTEM FOR AERIAL LAND RECOGNITION BASED ON REMOTE SENSING IMAGES

STATEMENT REGARDING PRIOR DISCLOSURE BY THE INVENTORS

Aspects of this technology are described in "SEMSF-Net: Explainable Squeeze-Excitation Multiscale Fusion Network for Aerial Scene and Coastal Area Recognition Using Remote Sensing Images," *IEEE Journal of Selected Topics in Applied Earth Observations and Remote Sensing*, vol. 18, pp. 15755-15773 (2025). The article is herein incorporated by reference in its entirety.

BACKGROUND

Technical Field

The present disclosure is directed to a remote sensing image analysis system and, more particularly, to a system for analyzing classification of land cover and land use in high-resolution remote sensing imagery.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Remote sensing images are being accumulated from various sources. Satellite-based imaging systems can capture images at varying resolutions depending on whether they are at low Earth orbit or more distant orbits. Satellite imagary is generally used to obtain images over large regions. Aerial photography is also useful for obtaining images over large regions, but is typically limited to certain regions. Aerial photography offers higher resolution, e.g., a resolution of a few centimeters, as opposed to 5m/pixel and above for satellite. Cameras on Unmanned Aerial Vehicles (UAV) can capture remote sensing imagery at very high resolution, on the order of sub-centimeter, but over much smaller regions. Subsequently, each source of remote sensing images has its own benefits.

Some business or government organizations are interested in environmental monitoring. As an example, an organization may be interested in tracking forests, for monitoring decreases or increases in regions covered by forest. These organizations may be interested in controlling deforestation, monitoring changes in forest cover due to storms or fires, and the spread of disease in forest land.

From a different perspective, some organizations may be interested in monitoring changes in housing and building construction, or faster changes issues, such as traffic patterns. Such organizations may need to determine impacts on green space. Such organizations may be interested in comparing urban sprawl or green space area to other regions.

Those involved in agriculture may be interested in planning crop plantings. On a larger scale, these in the agriculture industry may be interested in identifying the extent of crop types in a region, assessing crop health, or optimizing crop types.

Other organizations may be interested in assessing the impact of disasters, such as fires, flooding, storms, to determine types of impact and extent of an impact. These other organizations may be interested in assessing the extent of damage as well as monitor recovery efforts that revive a damaged region.

Defence and maritime organizations may be interested in real-time monitoring of protected areas and detection of intruders. These organizations may be interested in identifying potential hazard zones.

Conventional software systems are available for the businesses and government organizations to use in studies and decision making in which the various remote sensing imagary provides a tremendious resource. Software providers like Esri, Hexagon Geospatial, and SpaceKnow offer software solutions for Earth observation. Esri has products and services related to geographic information system (GIS). Esri provides pre-trained AI models to meet business needs in land use. For example, GIS is used to identify landslide-prone areas, then uses a pretrained AI model to pinpoint vulnerable structures. In another example, a pre-trained AI model is used to identify where vegetation threatens power lines.

Hexagon Geospatial provides a Web-based GIS, and remote sensing, photogrammetry and data management platforms for planning, monitoring and analysis. SpaceKnow provides a product for analyzing satellite data. Their product enables a zoom approach, where an analysis begins with selecting a spot on the globe and an area of interest, then begin analysis of the area. Their product offers control over algorithms and filtering results.

The analysis of remote sensing imagery is faced with significant challenges that have a pronounced impact on results. Remote sensing images are captured at a high variation of resolution. As such, a machine learning model needs to be able to handle the different resolution images with consistent accuracy. Remote sensing images tend to be imbalanced, with fewer training images for some classes. For example, images of land impacted by a disaster, will be far less populated than most natural resource images. Also, remote sensing images for certain diseased areas will be less populated than images of normal environments. The extremely large number of remote sensing images from various sources calls for a requirement for scaling up the capacity of the machine learning model.

Accordingly, an object of the present disclosure is to provide a method and system for analyzing remote sensing images from a variety of sources, across multiple spatial scales. The images may be related to a wide variety of land use and land cover that is subject to changing land use and geologic patterns. The method and system is structured for efficient scaling up as the volume of image data continues to increase.

SUMMARY

In an exemplary embodiment, an orbital satellite system for analyzing land use and land cover (LULC) is disclosed. The system includes network communication circuitry configured to receive a plurality of remote sensing (RS) images from multiple sources, wherein each RS image includes a geographic region, a GPS location and a timestamp, a memory configured to store the plurality of RS images, and processing circuitry configured with a deep learning network for real-time classification of LULC. The processing circuitry is configured to iteratively train a deep learning network that integrates an input layer configured to input the plurality of RS images from the memory, at least one residual block to maintain a training gradient by integrating a shortcut connection that skips one or more layers in the at least one residual block, a plurality of inception blocks to extract features at multiple scales, where each inception block includes parallel layers with different kernel sizes, a plurality of dense blocks to enhance the extracted features, and a classification layer that determines at least one class label and a respective confidence score for the at least one class label based on the enhanced extracted features for a RS image of the plurality of remote sensing (RS) images. An image database stores the plurality of remote sensing images with respective class label. A system interface is configured to input a selection of whether general or specific LULC images are of interest; when general is selected, input a date and time, input whether count of number of each class is selected, input whether area of each class is selected, input whether there is a change in class for a location is selected, when specific LULC is selected, input class name, input a region of interest, input a location, input whether change detection is selected. A database compute component is configured to determine a count of images in each respective class for a date/time, determine a total area of the images in each respective class for a data/time, determine a change in an image for a region, determine a change in an image for a location.

In another exemplary embodiment, a non-transitory computer-readable storage medium including computer executable instructions, wherein the instructions, when executed by a computer, cause the computer to perform a method for analyzing land use and land cover (LULC) is described. The method includes receiving, by network communication circuitry, a plurality of remote sensing (RS) images; storing, by a memory, the plurality of RS images, iteratively training, by processing circuitry, a squeeze-excitation multiscale fusion network including: inputting, by an input layer, the plurality of RS images from the memory, maintaining, by at least one residual block, a training gradient by integrating a shortcut connection that skips one or more layers in the at least one residual block, extracting, by a plurality of inception blocks, where each inception block includes parallel layers with different kernel sizes, features of the RS images at multiple scales, enhancing the extracted features, by a dense block incorporated after a bottleneck residual block, wherein the dense block includes a plurality of convolutional layers, a concatenation layer that merges feature of a current layer with subsequent layers, and a squeeze and excitation block; and determining, by a classification layer, at least one class label and a respective confidence score for the class label based on the enhanced extracted features. The method includes storing, in an image database, the plurality of remote sensing images with respective class label. The method includes inputting, by a system interface, a selection of whether general or specific LULC images are of interest; when general is selected, inputting, a date and time; inputting whether count of number of each class is selected; inputting whether area of each class is selected; inputting whether there is a change in class for a location is selected; when specific LULC is selected, inputting class name; inputting a region of interest; inputting a location; inputting whether change detection is selected. The method includes determining, by a database compute component, a count of images in each respective class for a date/time; determining, by the compute component, a total area of the images in each respective class for a data/time; determining, by the compute component, a change in an image for a region; and determining, by the compute component, a change in an image for a location.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
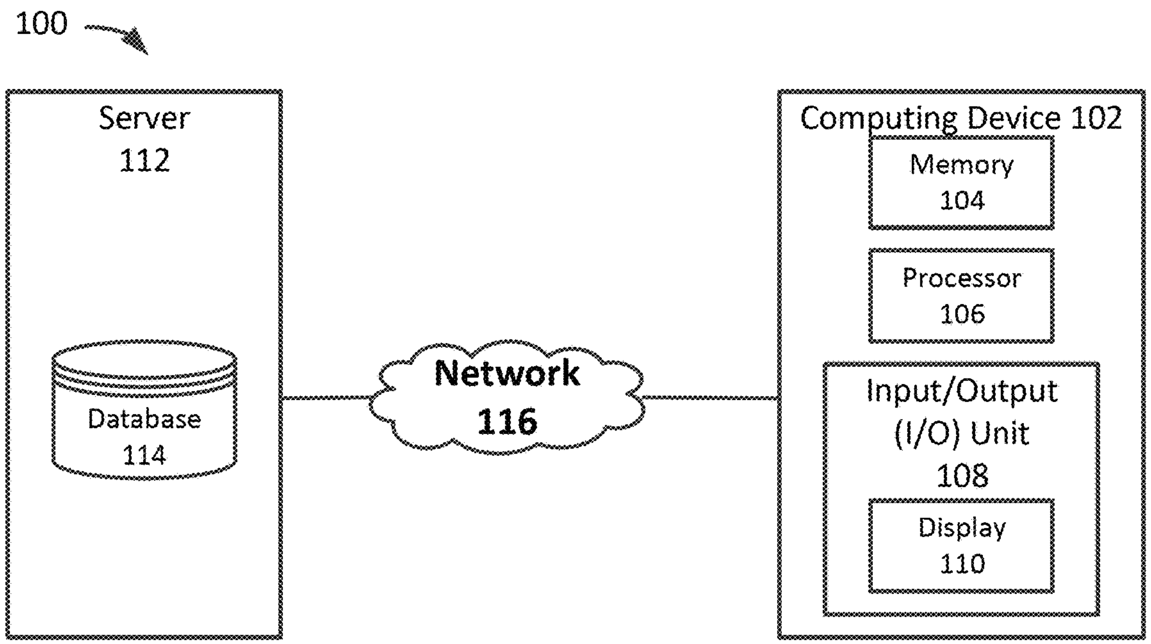
FIG. 1A is an exemplary diagram of a system configured for multi-modal super-resolution deep neural network for remote sensing imagery classification, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and a method for automatic classification of land use and land cover (LULC) in remote sensing (RS) images, and is particularly applicable to remote imaging analysis by a computer configured for machine learning or machine learning-based cloud service, addressing challenges of heterogeneous scene content, multi-scale feature extraction, vanishing gradients, and computational cost. The system and method are particularly tailored to unbalanced data and an increasing volume of image data. To classify LULC, the method includes capturing a number of RS images by a camera, transmitting the RS images by communication circuitry, receiving the RS images by server communication circuitry, and storing the RS images in a memory. The method further includes iteratively training, by a machine learning engine, a deep learning network that integrates an input layer to input the RS images, at least one residual block to prevent a training gradient from vanishing, a number of inception blocks to extract features at multiple scales, a number of bottleneck blocks and inverted bottleneck blocks to balance computational cost, a number of dense blocks to promote reuse of the extracted features, and at least one squeeze-excitation block to emphasize a region of an RS image. The method further includes determining, by a softmax layer, at least one class label and a respective confidence score for the at least one class label based on the extracted features. Aspects further include sensors mounted in various remote sensing imaging systems, including orbital satellites, unmanned aerial vehicles (UAVs), and other aerial vehicles which are configured to capture remote sensing (RS) images of various resolutions. A machine learning engine is configured to classify the RS images.

Aspects include a database management system for maintaining remote sensing images obtained from various remote sensing sources. As described further below, an analysis system taps into the database. The database management system can be a relational database management system, such as from Oracle, provided in a dedicated network, or provisioned as a service in a cloud service provider, including Amazon, Microsoft, and Google. The relational database can include image attributes of class, date/time, location, region. In some embodiments, the images may be related to one or more downstream applications, and can include an attribute for the downstream application type.

Aspects further include a basic input interface in order to enable analysis of classification results maintained in an image database system. Built-in functions include selection operation for selection of a class or classes to obtain data for analysis, alert messages, when a new image arrives for a certain class, storing images in an image database by class, determining an area for a specific class or for several classes. The database can include location, region, and timestamp for stored remote sensing images.

An aspect includes storing remote sensing images in the database by downstream usage, including land cover, urban, agriculture, protected area, natural disaster. The database system can feed remote sensing images to client computers in time periods that are dependent on usage. In particular, remote sensing images can be fed to client computers for real-time monitoring, or for periodic updates, or event based sending. In the case of event-based sending, an event can include a change in class of an image at a particular location or in a designated region, detection of a certain intrusion object in an image, a change in a structure.

An aspect includes a database system that organizes images by downstream application, including images regarding land cover, urban settings, agriculture areas, protected areas, and natural disaster incidents. In some embodiments, this database system can be used to provide remote sensing images for training separate classifiers for each type of downstream application.

Aspects further include satellite, UAV, or other aerial platform respective communication circuitry configured to transmit a plurality of RS images captured over a plurality of the predetermined time periods.

Referring now to FIG. 1A, the present disclosure provides an exemplary diagram of a system 200 configured for multi-modal super-resolution deep neural network for remote sensing imagery classification and analysis, according to certain embodiments. In order to classify and analyze the remote sensing images, the system 200 may include a computing device 102 having a machine learning engine. The machine learning engine is configured to train a super-resolution deep neural network to classify the area in the RS image. Examples of the computing device 202 may include a GPU-equipped computer workstation, a laptop, a tablet, a smartphone, and the like, hosting or embedded with the machine learning engine. In an embodiment, the super-resolution deep neural network (SR-DNN) enhances the resolution of remote sensing images by learning the mapping between low- and high-resolution data. The SR-DNN employs a multi-block residual attention-based Very Deep Super-Resolution (VDSR) model, where each block extracts spatial features and applies attention mechanisms to emphasize critical regions such as coastal boundaries and water textures. The network reconstructs a residual image containing high-frequency details, which is added to the input to generate a high-resolution output. The process improves image clarity, preserves fine textures, and enables more accurate feature extraction for coastal classification tasks. To classify the costal regions, initially, the machine learning engine is configured to retrieve the RS image having a first resolution. The RS image may be an image captured by a satellite or aerial sensor with a predefined spatial resolution representing the level of detail in the captured scene. The first resolution typically denotes the original or low-resolution version of the image obtained directly from the sensor before enhancement. In such an image, each pixel corresponds to a larger ground area, causing fine spatial details such as small coastal boundaries, vegetation textures, or shallow water regions to appear blurred or indistinct. The first-resolution RS image is used as the input to the super-resolution deep neural network, which reconstructs a corresponding high-resolution version that restores finer details, improves feature clarity, and enables more accurate classification of coastal regions.

In an embodiment, the machine learning engine is configured to process the RS image through a multi-block residual attention-based Very Deep Super Resolution (VDSR) network to obtain a residual image, including dynamically adjusting weights in each block of the multi-block residual attention-based VDSR network having a series of convolutional layers with a residual connection and an attention mechanism, to enhance high-frequency details of the RS image. The machine learning engine may generate an initial feature map from the RS image by a first convolutional layer. Further, the machine learning engine may process the initial feature map through sequential residual attention blocks. The machine learning engine may generate a residual image by a final convolutional layer.

In an embodiment, the machine learning engine is configured to generate a high-resolution output image by adding the residual image to the RS image. In some embodiments, each residual attention block may generate an output feature map from the initial feature map by a first rectified linear (ReLU) activation function. Further, each residual attention block may generate a processed feature map from the output feature map by a series of convolutional layers. Further, each residual attention block may generate an attention map using a sigmoid activation function. Each residual attention block may perform element-wise multiplication between the attention map and the processed feature map to generate a post-processed feature map. Further, each residual attention block may add the generated post-processed feature map to the initial feature map.

Further, the machine learning engine is configured to generate a color feature map using the high-resolution output image. In an embodiment, the machine learning engine is configured to convert red green blue (RGB) color space of the high-resolution output image to Hue, Saturation, Value (HSV) color space. Further, the machine learning engine is configured to convert the RGB color space to LAB color space. The LAB color space, also referred to as CIELAB color space, is a color space that expressed color as three values: L* for perceptual lightness and a* and b* for the four unique colors of human vision: red, green, blue and yellow. The machine learning engine is configured to calculate statistical features including mean, variance, standard deviation, skewness, kurtosis, harmonic mean, median, and mode for each color channel in the RGB, HSV, and LAB color spaces to determine the color feature vector. In an embodiment, the machine learning engine is configured to generate a resultant feature map by processing the high-resolution output image through a multimodal inception attention network ($M^2$IAN) including a plurality of inception attention processes, each inception attention process of the plurality of inception attention processes including a spatial attention branch and a channel attention branch configured to identify special and channel features. In an embodiment, the machine learning engine may extract color features from the high-resolution output image. The machine learning engine may extract preliminary features by passing the high-resolution output image through a plurality of inception attention module blocks. Further, the machine learning engine may concatenate a color feature vector with the preliminary features extracted from the inception attention modules to determine a final feature map. Further, each inception attention module block may include identify multi-scale spatial features by a spatial attention branch including a plurality of parallel convolutional paths with different filter sizes. Each inception attention module block may include channel features by a channel attention branch comprising global average pooling and fully connected layers. Further, each inception attention module block may include integrate the multi-scale spatial features and the channel features using addition and sigmoid activation.

Further, the machine learning engine is configured to combine the color feature map and the resultant feature map, including a depth-wise concatenation between the color feature map and the resultant feature map, to generate a composite feature image that captures subtle color variations in coastal areas. The coastal area categories includes at least one from the group consisting of islands, beaches, wetlands, lakes, landslides, anchors, rivers, and snowbergs. In an embodiment, the machine learning engine is configured to learn to classify the composite feature image into coastal area categories. Further, the machine learning engine is configured to display the composite feature image and classification category.

In an embodiment, the machine learning engine is configured to optimize hyperparameters of the multi-block residual attention-based VDSR network and the multimodal inception-attention network ($M^2$IAN) using Red Fox Optimization (RFO). The multi-block residual attention-based VDSR network includes 5 residual attention blocks. The machine learning engine is configured to generate initial hyperparameter sets, each set including values for epochs, learning rate, batch size, and activation functions. Further, the machine learning engine is configured to evaluate each hyperparameter set using a fitness function based on validation loss. The machine learning engine is configured to update hyperparameter values and select the hyperparameter set with the best fitness value for arranging the multi-block residual attention-based VDSR network and the ($M^2$IAN).

In an embodiment, the computing device 102 taps into a database management system 114 for classification and analysis of remote sensing images. The database management system 114, as mentioned above, can be a relational database management system or may be provided as a database service in a cloud service provider. Although the block diagram shows a single server 112, the server 112 can be any of a network of servers, database service in a cloud provider, as well as a single computer platform. The machine learning engine is configured to receive the RS images of the RS images from the server 112 over a network 116. Examples of the server 112 may include, but are not limited to, a cloud service, server computer, a laptop, a tablet, a smartphone, and the like. Examples of the network 116 may include, but are not limited to, a Wide Area Network (WAN), a Local Area Network (LAN), a wireless network, a mobile network, a Virtual Private Network (VPN), an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, or some combination thereof.

The memory 104 may be a volatile memory, such as a Random-Access Memory (RAM), or a non-volatile memory such as a Read Only Memory (ROM), an Erasable Programmable Read Only Memory (EPROM), a flash memory, and the like. The memory 104 may be configured to store one or more computer-readable instructions or routines that when executed may cause the machine learning engine in the machine learning engine to perform the image editing based on the attribute-specific text prompt. The memory 104 may diagnose the dementia based on the GNN in conjunction with a processing circuitry 206. In other words, the processing circuitry 106 may be configured to execute the one or more computer-readable instructions stored within the memory 104 to diagnose the dementia based on the GNN. The processing circuitry 106 may be implemented as one or more microprocessors, microcomputers, microcontrollers, Digital Signal Processors (DSPs), Central Processing Units (CPUs), logic circuitries, and/or any devices that process data based on operational instructions.

In an embodiment, the machine learning engine may also include an Input/Output (I/O) unit 108. The I/O unit 208 may be used by the user to provide inputs (such as remote sensing (RS) images of coastal areas, satellite imagery data, geospatial metadata, environmental monitoring data, and other auxiliary inputs including region identifiers or land cover parameters, and the like) to the machine learning engine. Further, the I/O unit 108 may include a display 110. The display 110 may be used to display intermediatory results, such as residual images, high-resolution reconstructed images, color feature maps, and attention-weighted feature maps, or a final result, such as a classified coastal region image with identified categories including islands, beaches, wetlands, lakes, or rivers, based on processing performed by the machine learning engine using the super-resolution deep neural network and the multimodal inception attention network ($M^2$IAN).

Figure 1B:
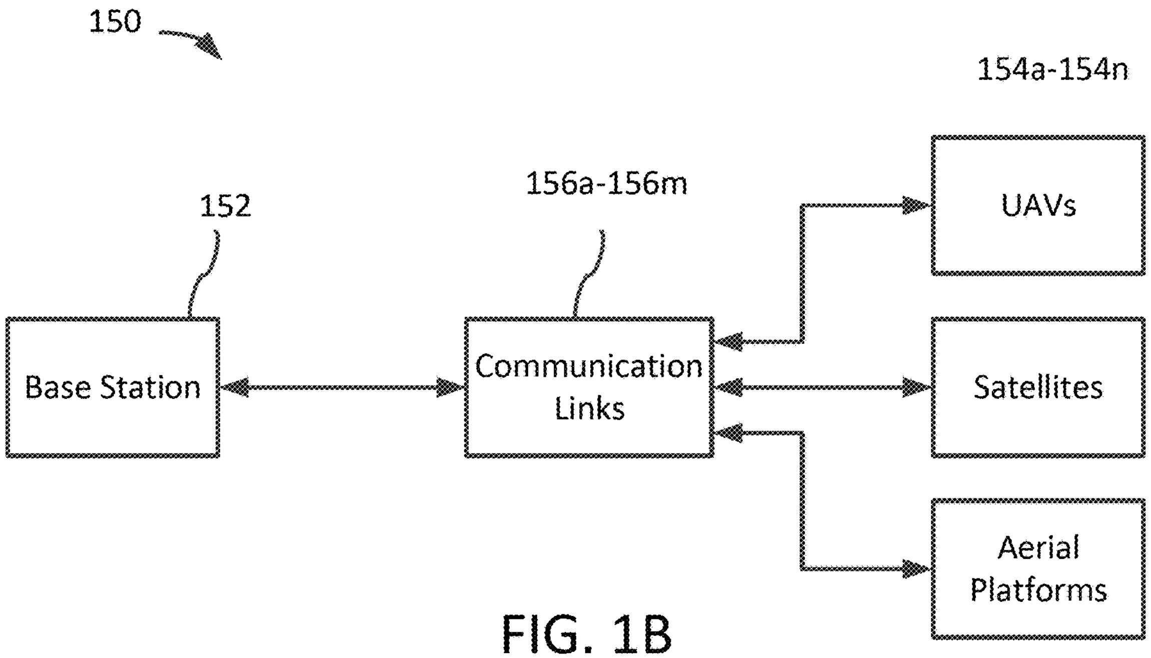
FIG. 1B illustrates a block diagram of a remote sensing system for a variety of remote sensing sources, according to certain embodiments.

FIG. 1B illustrates a block diagram of a remote sensing system for a variety of remote sensing sources, according to certain embodiments. The system 150 includes a base station 152 and remote sensing devices including unmanned aerial vehicles (UAV), aerial platforms, and satellites at different orbit levels 154*a*-154*n*. In an embodiment, a group of satellites are configured as a satellite constellation to fly in a coordinated formation. The remote sensing devices 154*a*-154*n* are communicatively coupled to the base station 152 via communication links 156*a*-156*m*.

The communication links 156*a*-156*m* establish bi-directional communication between the remote sensing devices 154*a*-154*n* and the base station 152. The communication links 156*a*-156*m* may utilize wireless communication protocols, such as but not limited to wireless-fidelity (Wi-Fi), 4G/5G, long-range (LoRa), or dedicated radio frequency (RF) channels. Through the communication links 156*a*-156*m*, the remote sensing devices 154*a*-154*n* may transmit telemetry data (e.g., position, altitude, orientation, speed), sensor readings, onboard diagnostics, energy usage statistics, real-time camera feeds, and so forth to the base station 152. In an embodiment, the remote sensing devices 154*a*-154*n* may operate individually or in coordinated formation flights. Conversely, the base station 152 may transmit control commands, dynamic flight instructions, the mission updates, or software patches to the remote sensing devices 154*a*-154*n* during operation.

In some embodiments, the system 150 may also include inter-satellite communication links (not shown) to support peer-to-peer data exchange between the satellites within the constellitation. The inter-satellite communication links may enable collaborative behavior such as coordinated maneuvering and synchronization of mission objectives across fleet. In one embodiment, the base station 152 receives real-time flight status and telemetry data from each remote sensing device 154*a*-154*n* and uses onboard or remote computing infrastructure to perform path optimization for each remote sensing device 154*a*-154*n* individually. The path optimization accounts for various constraints such as energy availability, while preserving the overall constellation position.

In an embodiment, the base station 152 may dynamically generate or update an optimal path for each UAV and may transmit updated trajectory data to the respective UAVs in the formation. Each UAV is then configured to autonomously execute its assigned trajectory segment based on the received instructions. In some embodiments, each UAV may include the processing circuitry to locally validate, adjust, or smooth the path segment in real-time. By individually managing the flight path of each UAV while maintaining coordination among the formation, the system 150 ensures high mission reliability, adaptability to complex 3D environments, and energy efficiency during the execution of surveillance, monitoring, or reconnaissance tasks.

In an embodiment, a camera system may include one or more cameras mounted on the frame of a remote sensing device, and configured for capturing high-resolution imagery and video during the orbiting. In an embodiment, the camera system may be, but not limited to, a high-resolution optical sensor, a thermal imager, or a multispectral camera depending on the mission, and may be configured to capture images, record videos, or stream live footage to a ground control station. The camera system may be used for a variety of applications including, but not limited to, aerial photography, cinematography, environmental monitoring, agricultural surveying, infrastructure inspection, surveillance, reconnaissance, and other applications that utilize computer vision.

In certain embodiments, the camera system may be equipped with an adjustable or a fixed focal length lens, optical or digital zoom capabilities, low-light imaging support (e.g., infrared or night vision), and optical image stabilization. The camera system may be integrated with a global positioning satellite (GPS) unit to enable geo-tagging, or location tagging, of images and videos.

In further embodiments, the camera system may include onboard electronic storage for locally saving the captured images and video footage. In an alternative embodiment, the camera system may be configured with real-time data transmission capabilities to stream live footage to the ground control station, a cloud platform, or a remote viewer via wireless communication protocols, such as, but not limited to, wireless fidelity (Wi-Fi), 4G/5G networks, dedicated radio-frequency (RF) channels, or other suitable wireless standards. The camera may be controlled via pre-programmed flight paths, a real-time operator input, or artificial intelligence (AI)-based autonomous vision algorithms, allowing dynamic focus, object tracking, or obstacle recognition. In some embodiments, the camera may be swappable or modular, enabling different payloads to be attached depending on the mission requirement.

Figure 2A:
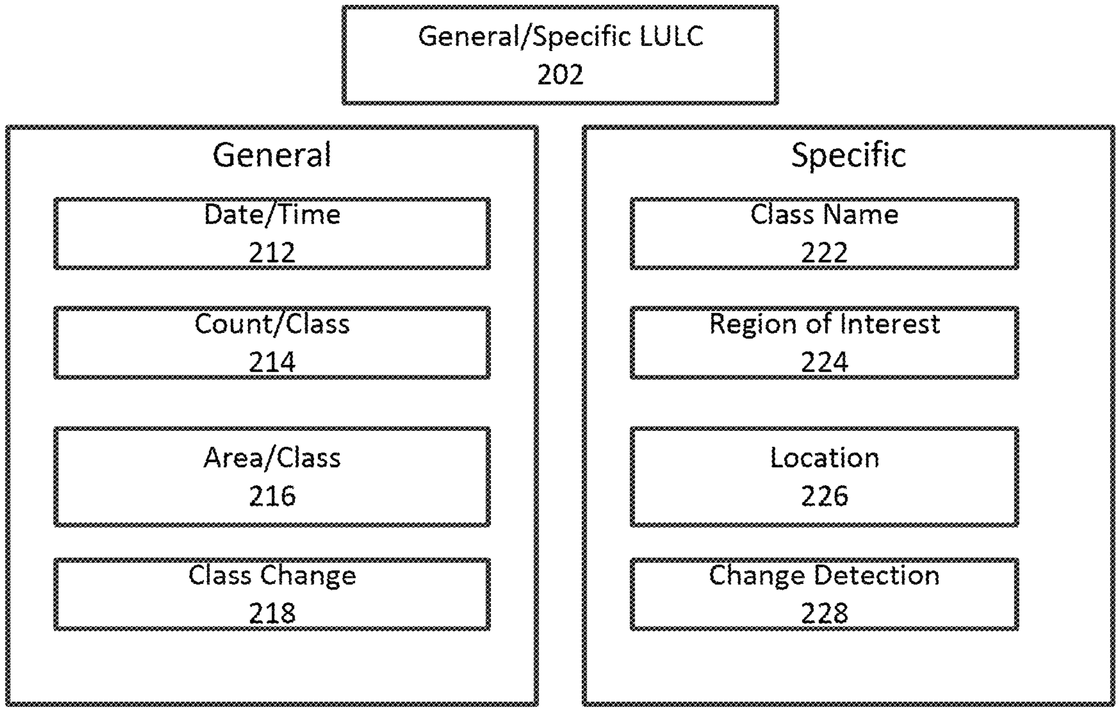
FIG. 2A illustrates an exemplary input interface for inputs to the analysis system, according to certain embodiments.

The system 100 is configured with an image database system 114. FIG. 2A illustrates an exemplary input interface for inputs to the system 100. An input 202 is an input for selection of whether general or specific LULC images are of interest. A set of inputs are provided for a case when general is selected, which include an input for a date and time, an input for whether count of number of each class is selected, an input for whether area of each class is selected, an input for whether there is a change in class for a location is selected. A set of inputs are provided for a case when specific LULC is selected, including an input for class name, an input for a region of interest, an input for a location, and an input for whether change detection is selected.

Figure 2B:
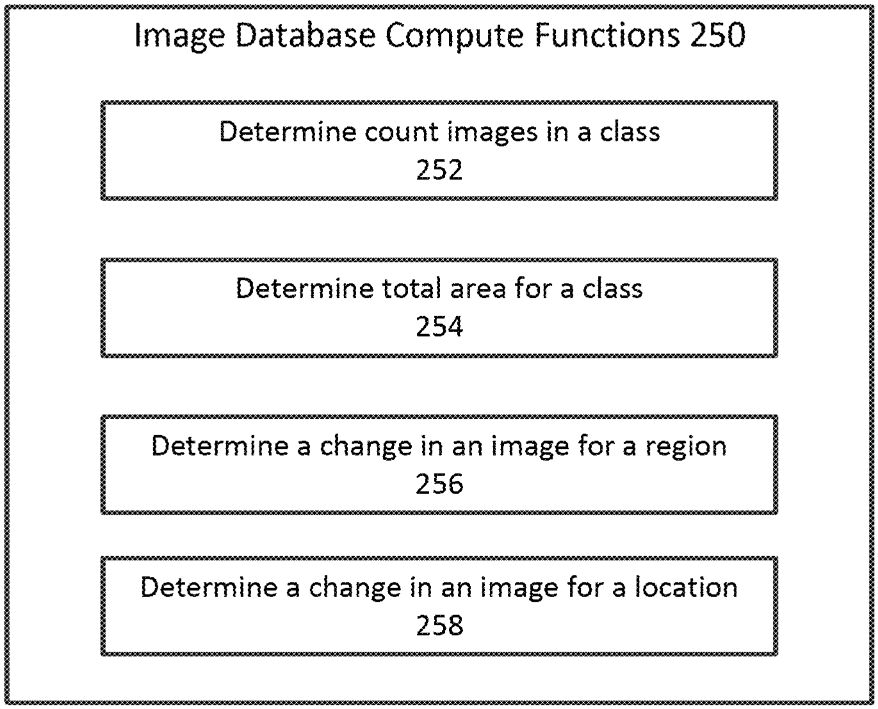
FIG. 2B illustrates exemplary database compute functions that can be performed using results of the remote sensing classifier, according to certain embodiments.

FIG. 2B illustrates exemplary database compute functions that can be performed using results of the remote sensing classifier, according to certain embodiments. Image database compute functions 250 for a database compute component includes a function to determine a count of images in each respective class for a date/time 252, determine a total area of the images in each respective class for a data/time 254, determine a change in an image for a region 256, and determine a change in an image for a location 258.

Figure 3:
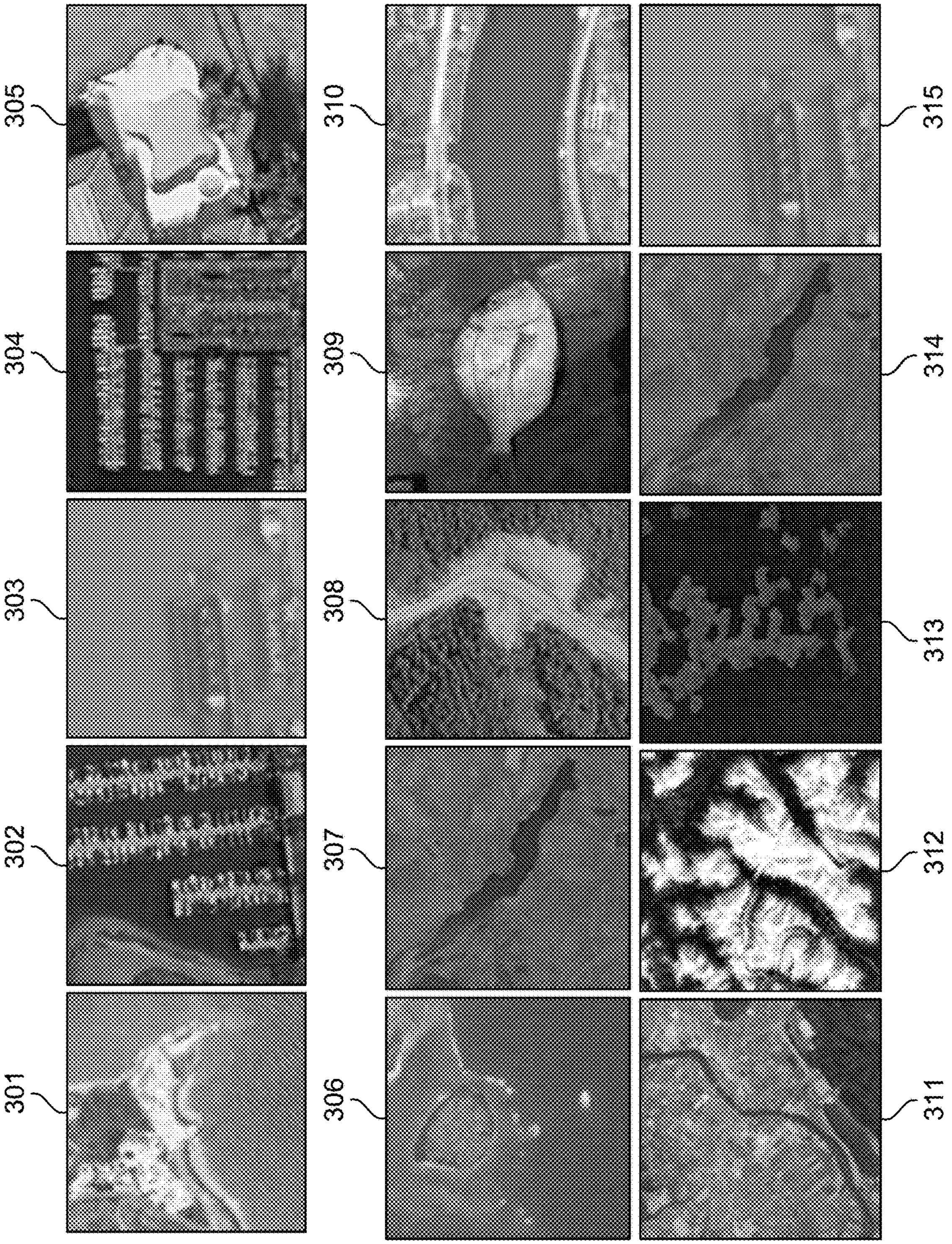
FIG. 3 illustrates an exemplary coastal areas combined dataset for remote sensing classification, according to certain embodiments.

FIG. 3 illustrates a coastal dataset 300 combining various coastal areas for remote sensing (RS) image classification of land use and land cover (LULC). The coastal dataset, also referred to as the dataset 300, is compiled from several publicly available datasets that include, but may not be limited to, EuroSAT, MLSRNet, and SIRI-WHU, to classify coastal areas. The dataset 300, in one aspect, contains 13 classes including Anchorage, Beach, Harbor, Harbor & Port, Island, Lake, Landslide, Red sea fish, River, Snowberg, Swimming pool, Water, and Wetland. Each sample in the dataset 300 has a size of 256×256×3, and the samples are RGB images. The total number of samples in the dataset 300 can be 9206, or greater. As depicted, representative RS images are shown for Beach, Harbor & Port, Harbor, Anchorage, and Swimming pool (e.g., 301-305); for Island, Lake, Landslide, Red sea fish, and Water (e.g., 306-310); and for River, Snowberg, Wetland, Lake, and Harbor (e.g., 311-315). The figure visually highlights that images of coastal areas include similar features, which has not been considered in prior works and which motivates the construction of the dataset 300 for evaluating classification performance. The dataset 300 is used to support training and assessment of a deep learning architecture, referred to as squeeze-excitation multiscale fusion network (SEMSF-Net), which integrates squeeze-and-excitation (SE) mechanisms with Residual, Bottleneck, Inverted Bottleneck, Inception, and Dense blocks to improve accuracy and robustness for LULC classification in the presence of complex spatial patterns and varying scales.

Figure 4:
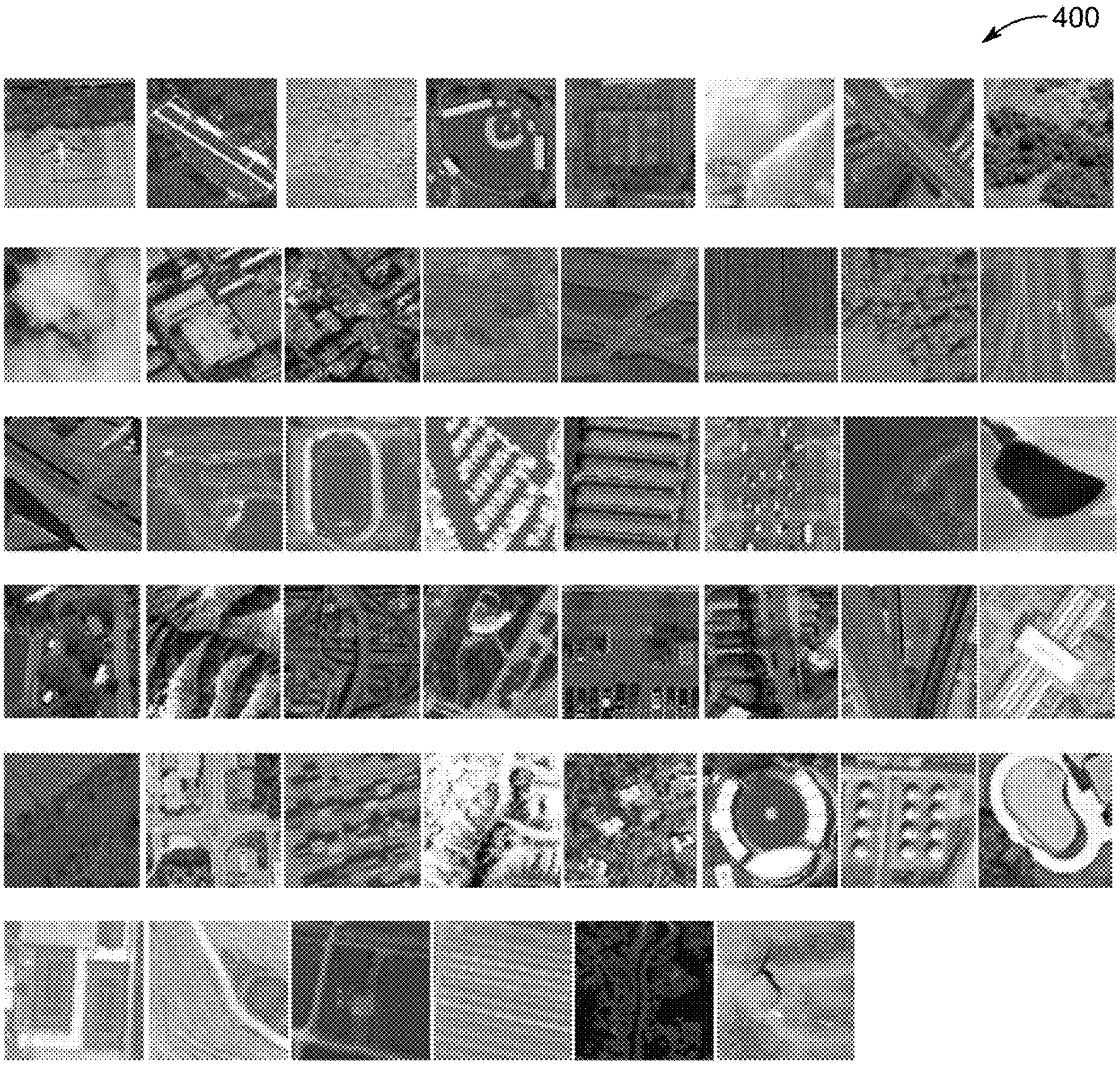
FIG. 4 illustrates an exemplary MLRSNet remote sensing dataset used for evaluation, according to certain embodiments.

FIG. 4 illustrates an MLRSNet remote sensing dataset 400 used for land use and land cover scene understanding. The MLRSNet remote sensing dataset, also referred to as the dataset 400, comprises 109161 high-resolution images divided into 46 categories, with approximately 1500 to 3000 images per category. Each image has a fixed pixel size of 256×256 and a spatial ground sampling resolution ranging from 10 m to 0.1 m. Each image in the dataset 400 is annotated with a predefined vocabulary of 60 class labels, and the number of labels per image varies from 1 to 13, thereby enabling multi-label learning and evaluation.

The panels depicted in FIG. 4 present representative examples across the breadth of categories included in the dataset 400, such as airplane, airport, bare land, baseball diamond, basketball court, beach, bridge, chaparral, cloud, commercial area, dense residential area, desert, eroded farmland, farmland, forest, freeway, meadow, golf course, ground track field, harbor and port, industrial area, intersection, island, lake, mobile home park, mountain, overpass, park, parking lot, parkway, railway, railway station, river, roundabout, shipping yard, snow-covered terrain, sparse residential area, stadium, storage tank, swimming pool, tennis court, terrace, transmission tower, vegetable greenhouse, wetland, and wind turbine. These exemplars show pronounced intra-class diversity and inter-class similarity expected in high-resolution aerial scenes, and they visually substantiate the multi-label nature of the dataset 400. The disclosure describes that the dataset 400 supports training, validation, and benchmarking by providing consistent pixel dimensions, controlled spatial resolution ranges, and standardized label vocabularies. Where provided in the specification, tables enumerate the 46 categories, the 60 label definitions, and per-category image counts for the dataset 400; those tables are to be consulted for exact tallies and label semantics.

Figure 5:
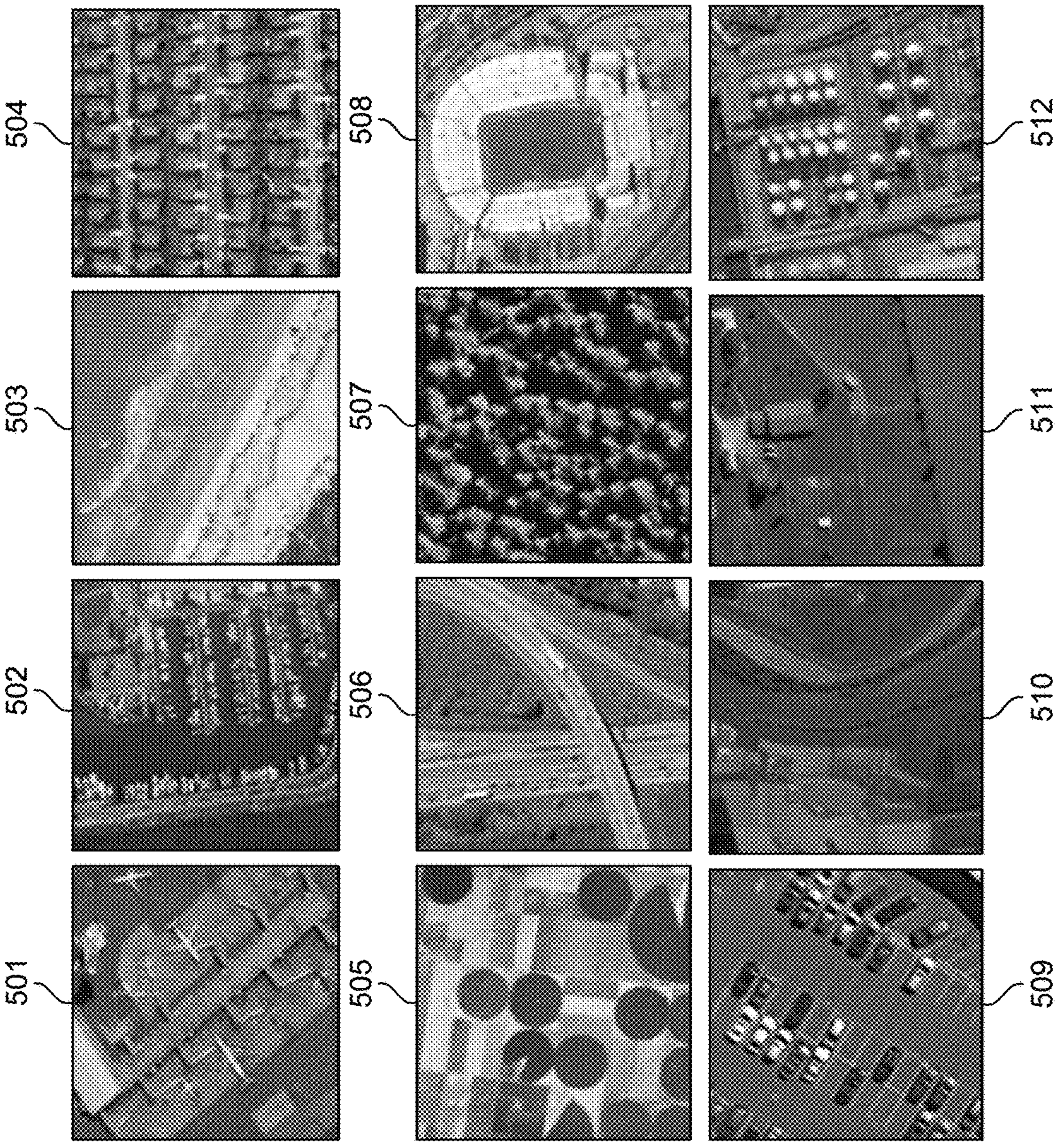
FIG. 5 illustrates an exemplary NWPU RESISC45 remote sensing dataset used for evaluation, according to certain embodiments.

FIG. 5 illustrates an NWPU-RESISC45 dataset subset 500 used for land use and land cover scene categorization. The NWPU-RESISC45 dataset subset, also referred to as the dataset 500, is composed of 10500 images separated into 12 classes, namely Airfield 501, Anchorage 502, Beach 503, Dense residential 504, Farm 505, Overpass 506, Forest, Game space 508, Parking space 509, River, Sparse residential, and Storage tanks 512. Each image has a pixel size of 256×256×3 with 96×96 dpi.

The class Airfield 501 depicts aircraft parking aprons, taxiways, and runway markings present in aviation facilities. The class Anchorage 502 depicts vessel mooring zones and marina berths, representative of coastal harbor scenes identified in a class list that includes harbor-type locations. The class Beach 503 depicts sandy or mixed-sediment foreshore regions adjacent to coastal waters. The class Dense residential 504 depicts high-density housing blocks and road grids indicative of compact urban neighborhoods. The class Farm 505 depicts cultivated plots, center-pivot circles, or rectilinear field parcels that evidence agricultural land use. The class Overpass 506 depicts grade-separated roadway junctions and flyovers, providing distinctive linear and curvilinear patterns. The class Forest depicts closed-canopy tree stands with textured foliage distributions characteristic of natural vegetation cover. The class Game space 508 depicts stadiums and sports arenas with elliptical or circular footprints and interior playing fields. The class Parking space 509 depicts paved lots with delineated parking stalls and vehicular arrangements. The class River depicts fluvial corridors and associated riparian zones that exhibit sinuous water bodies. The class Sparse residential depicts low-density settlements with detached structures and intervening vegetation or bare soil. The class Storage tanks 512 depicts cylindrical tank farms and industrial storage facilities with repetitive circular features.

Figure 6:
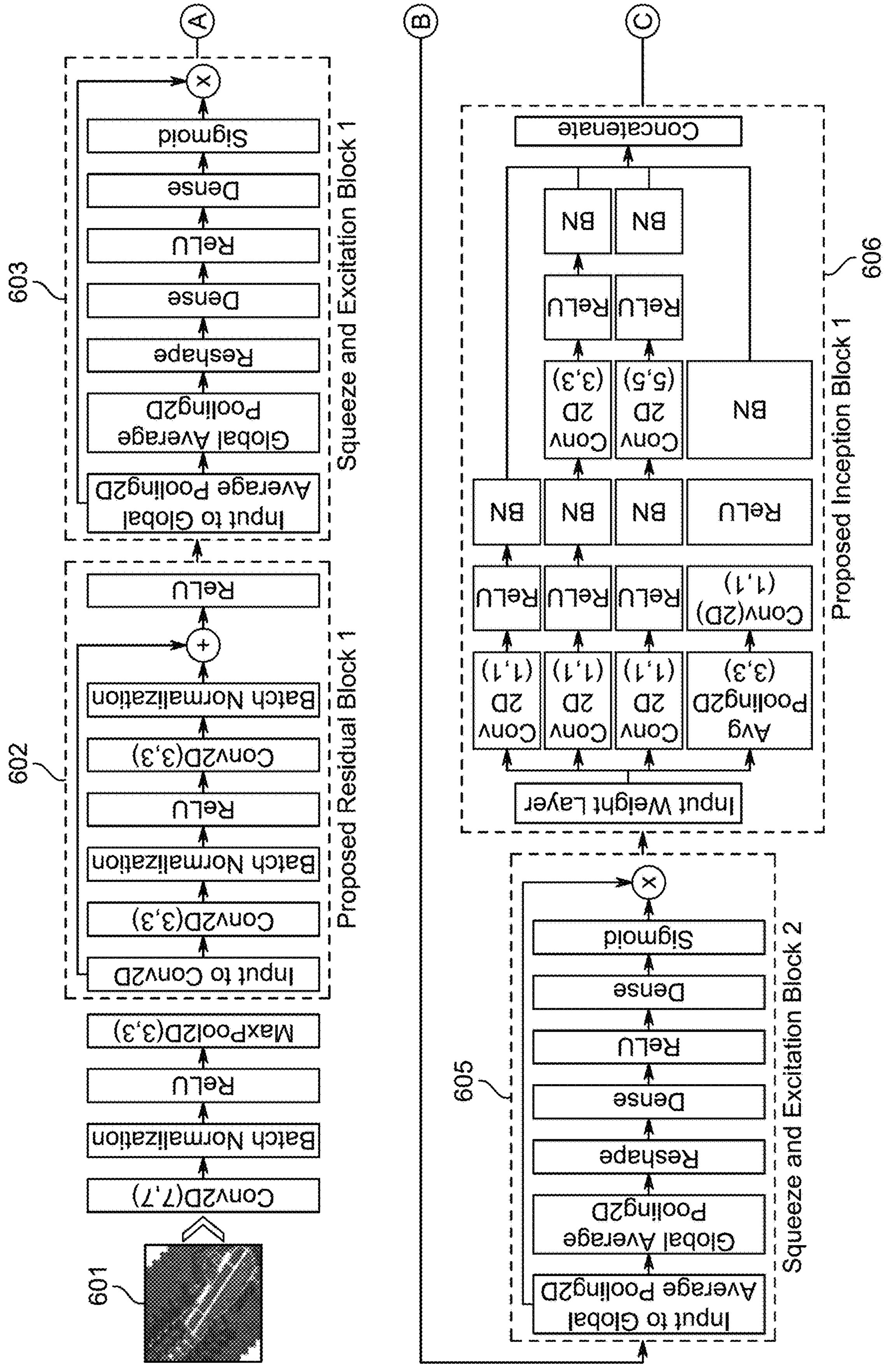
FIG. 6 illustrates an exemplary deep learning network configured for automatic classification of land use and land cover, according to certain embodiments.
Figure 6:
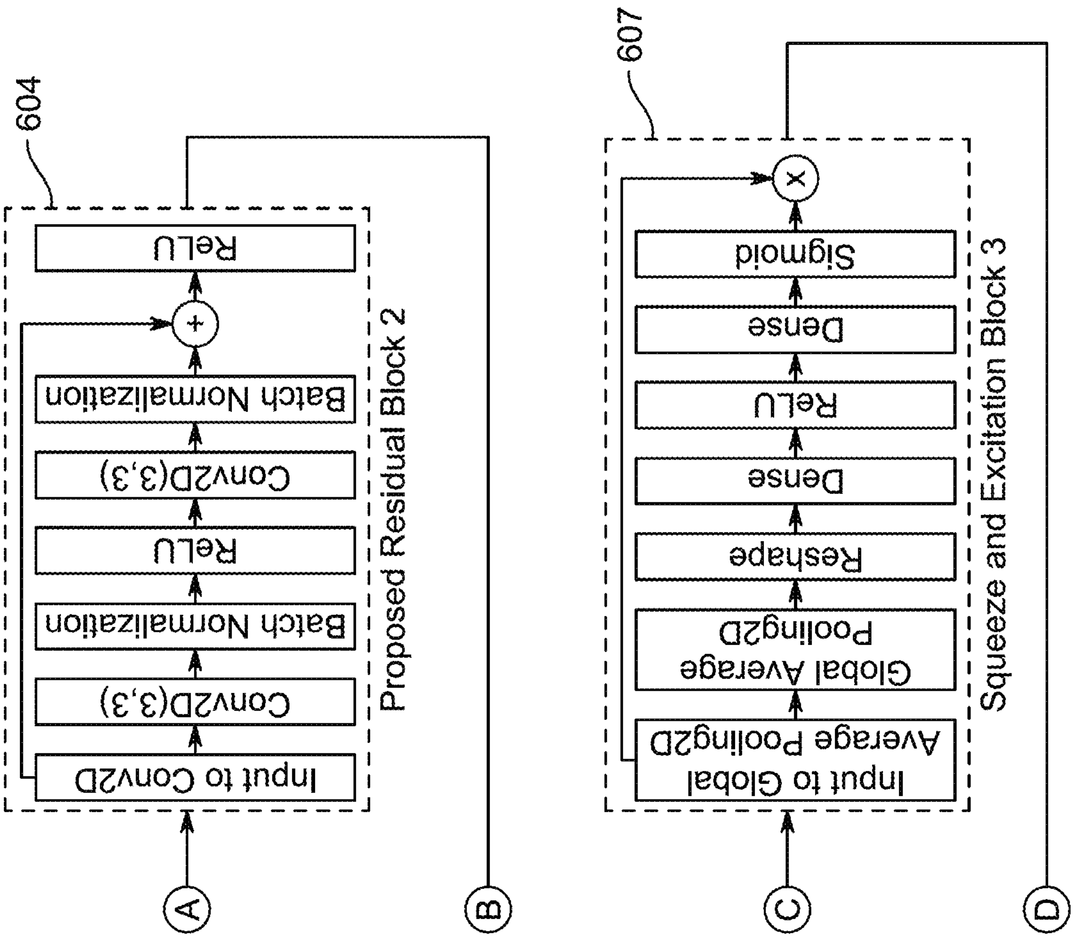
Figure 6:
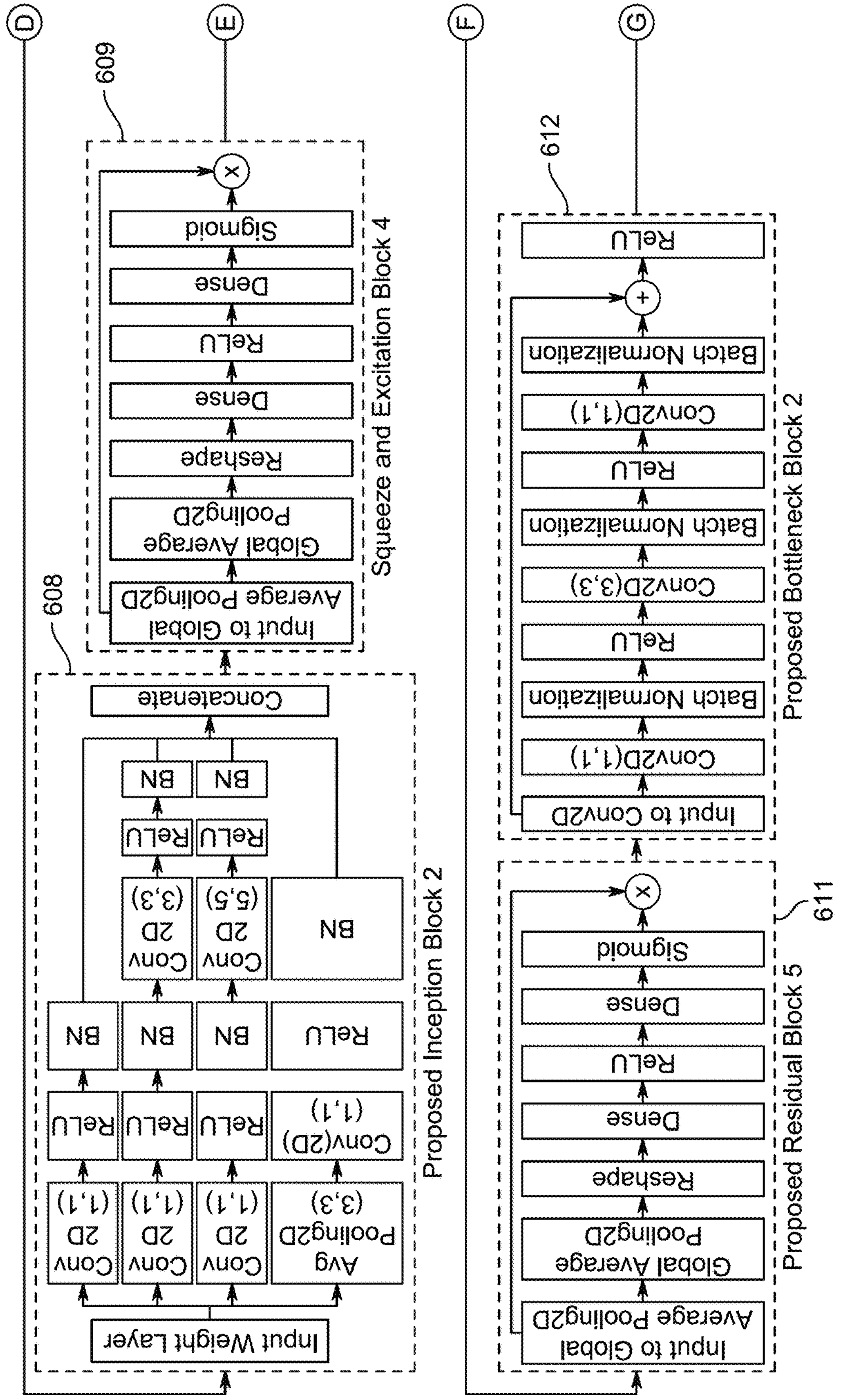
Figure 6:
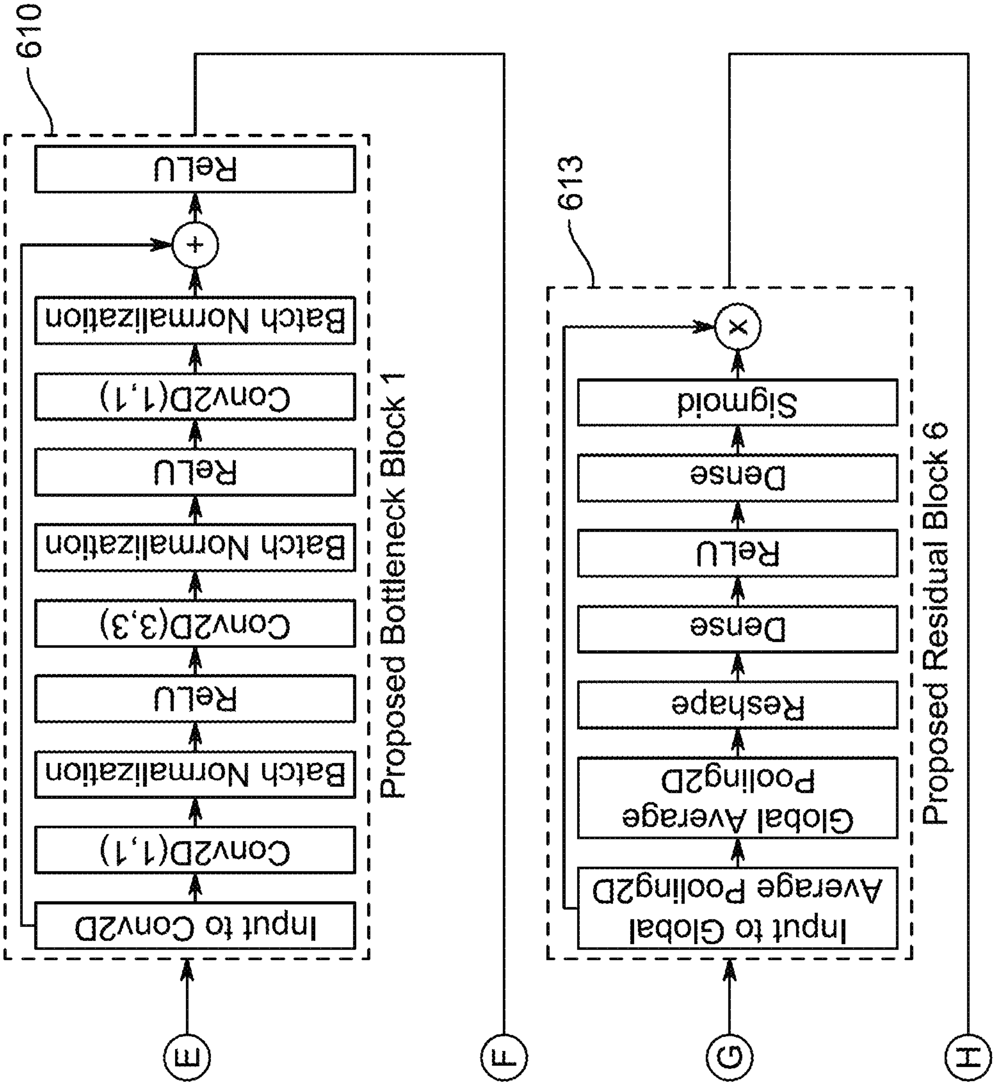
Figure 6:
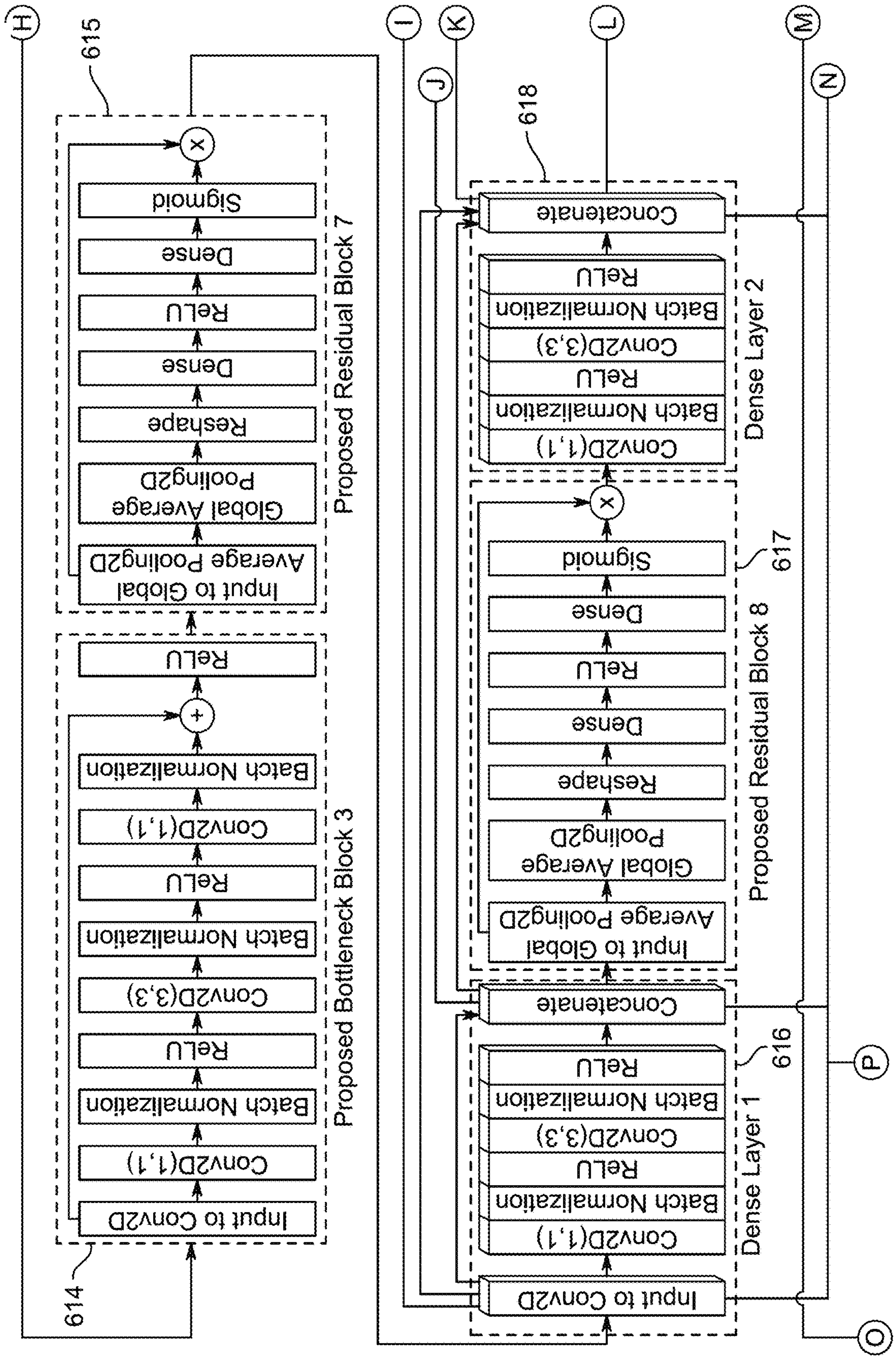
Figure 6:
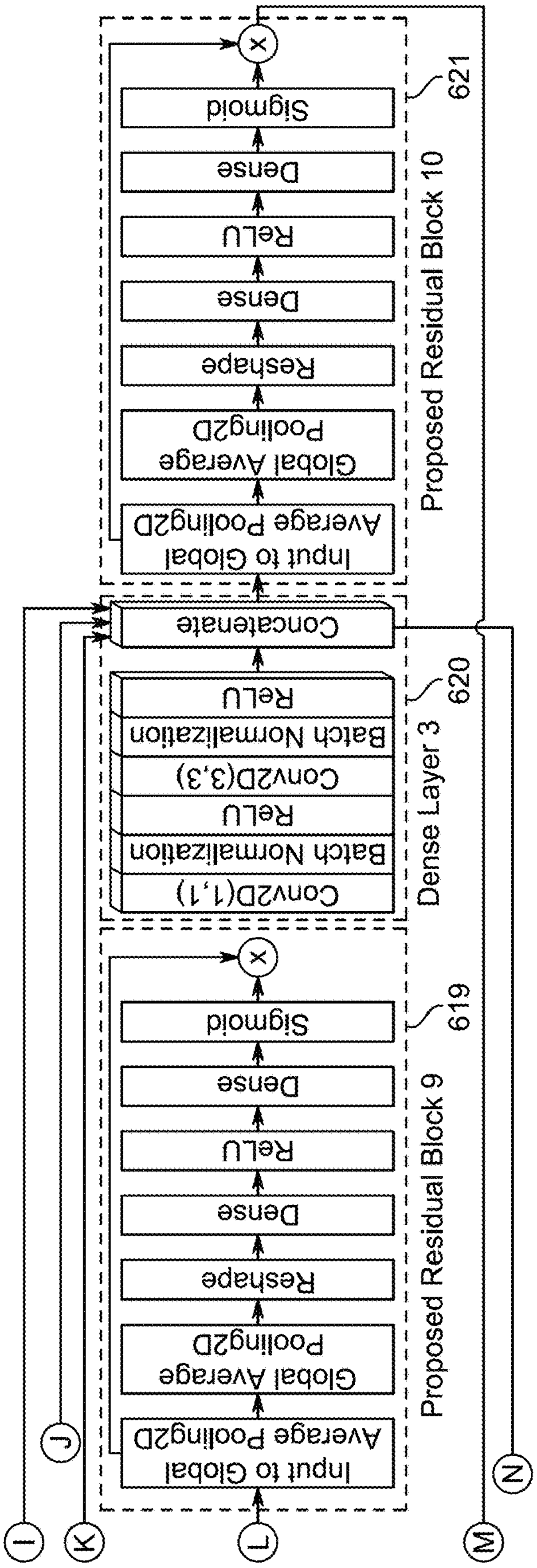
Figure 6:
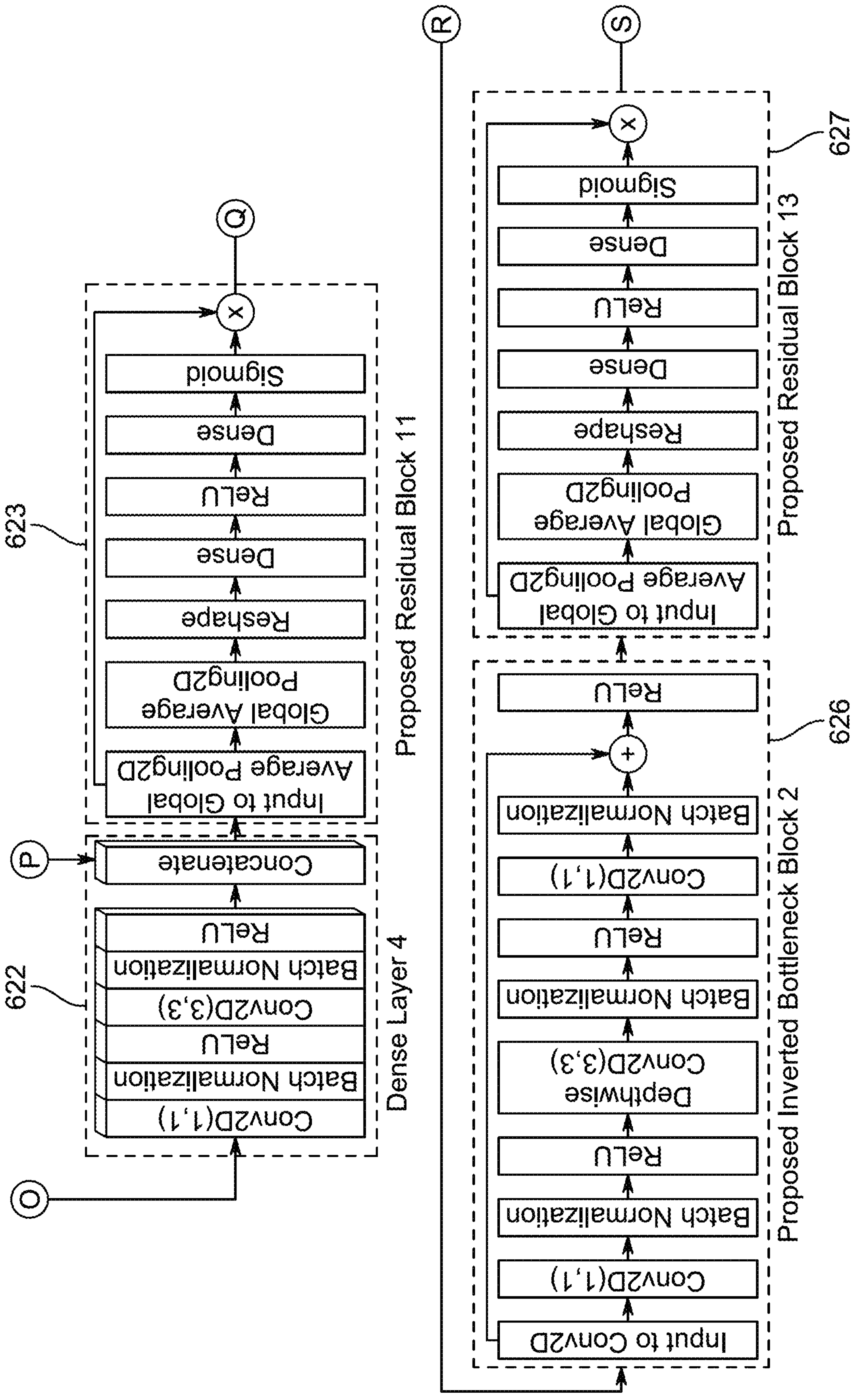
Figure 6:
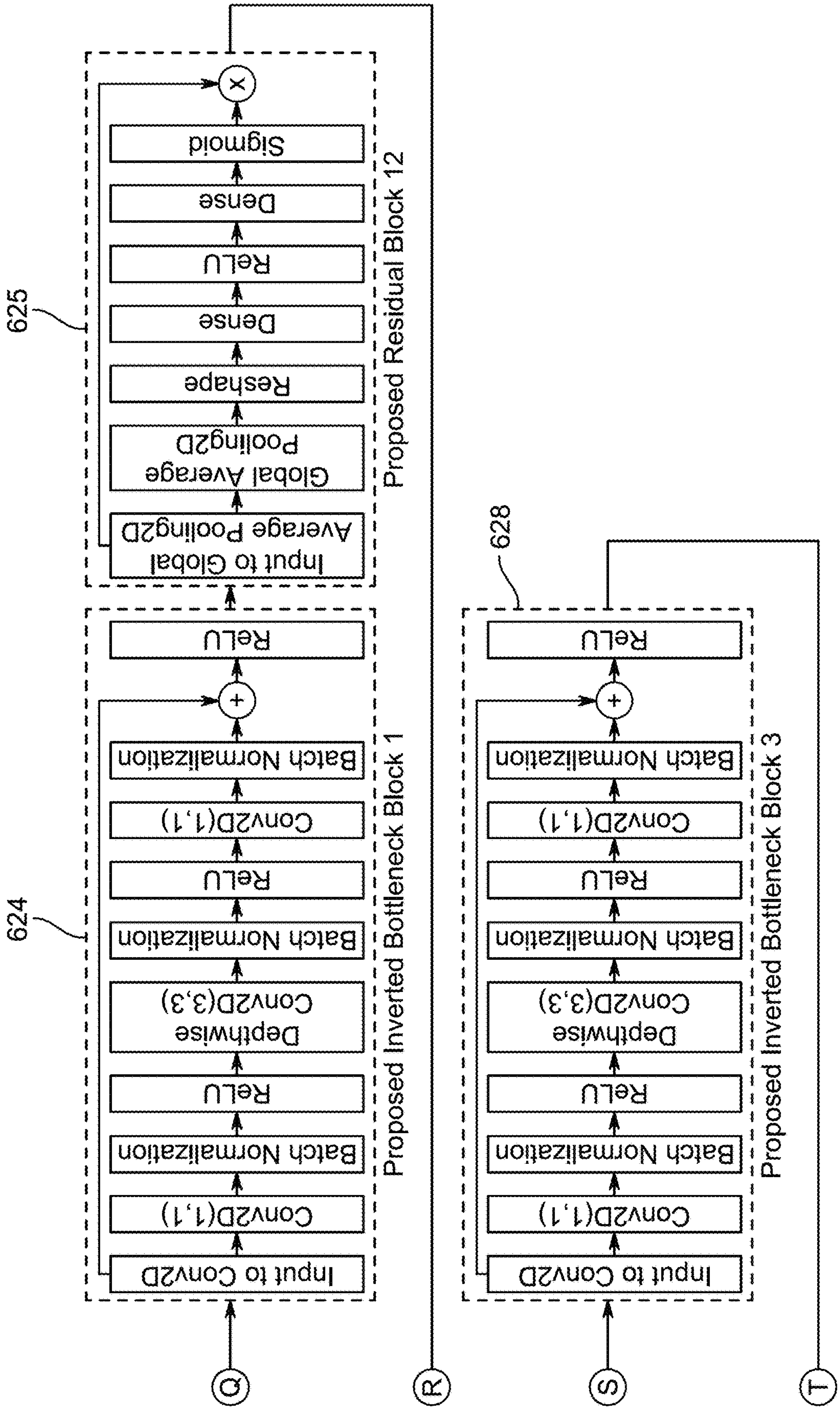
Figure 6:
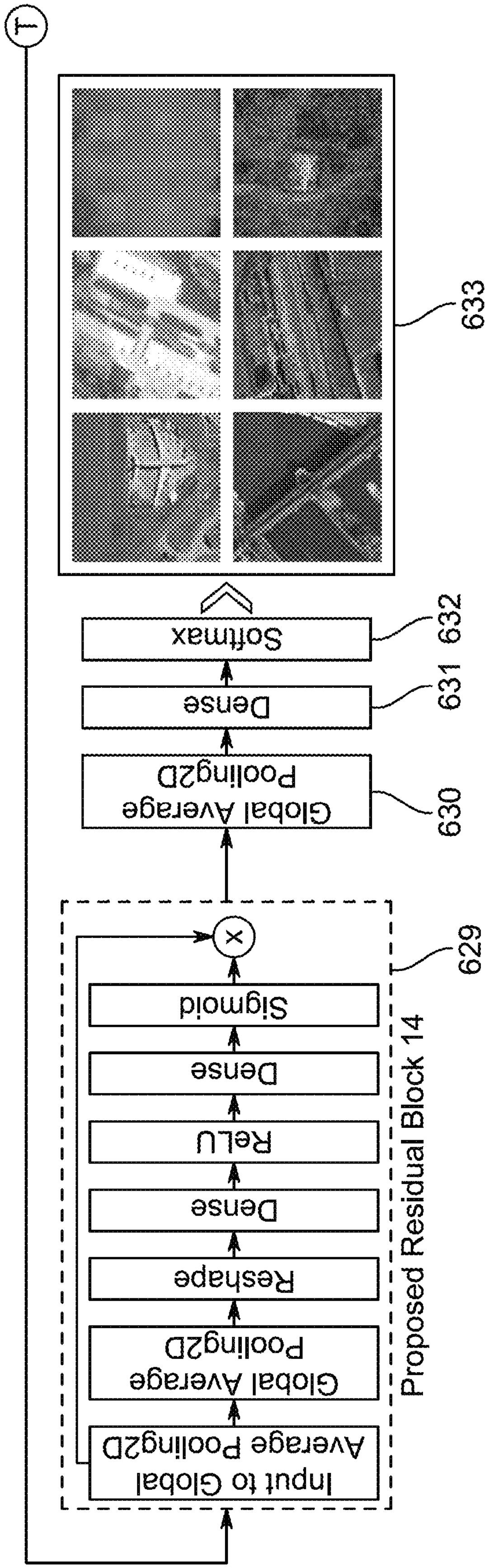

In FIG. 6, the present disclosure provides an exemplary diagram of a deep learning network 600 configured for automatic classification of land use and land cover (LULC), according to certain embodiments. The deep learning network 600 is the network that the machine learning engine in the computing device 102 of the system 100 trains and deploys, and that produces the classifications ultimately displayed on the display 110 of the I/O unit 108. The network 600 operates on remote sensing images received from the unmanned aerial vehicle through the server 112 over the network 116 as described with reference to FIG. 1, and implements the sequence of functional blocks and recalibration stages identified by reference numerals 601 through 633.

An input image 601 represents a 3-channel tensor provided by the memory 104 to the machine learning engine. A stem module receives the input image 601 and performs a two-dimensional convolution with 64 filters of size 7×7 and stride of 2 to form an initial response map. A 3-D input tensor of size 224×224×3 is fed to this convolutional layer, which is followed by a batch normalization layer, and the convolution uses same padding. Batch normalization is immediately applied to stabilize activation statistics, after which a rectified linear unit (ReLU) introduces nonlinearity. A max-pooling operation with a pool size of 3×3 and stride of 2 reduces the spatial resolution while retaining salient patterns that are propagated to downstream stages. In the disclosed architecture, two residual blocks are added one after other, each having 64 filters.

A residual block 602 follows to prevent a training gradient from vanishing. The block 602 first accepts the stem feature map X and applies a 3×3 convolution to compute local features. Batch normalization standardizes the channel responses and ReLU activates them to produce V. A second 3×3 convolution further composes spatial cues; batch normalization again normalizes the output. In parallel, when input and output dimensions differ, a projection shortcut performs a 1×1 convolution with batch normalization to align the tensor shape. The block 602 aggregates the normalized second-convolution output with the shortcut by element-wise addition and applies a ReLU to yield the residual feature map, thereby preserving low-level spatial context while maintaining stable gradient flow through the skip pathway. Mathematically, it is formulated as follows:

$$c_1 = \sigma(BN(W_1 * z) \tag{1}$$

where z is an input of this block, $W_1$ denotes the weights of first convolutional layer, BN denotes the batch normalization layer, σ represents the ReLU activation function, * represents the convolutional operation, and $c_1$ is the output of the first convolutional layer. After that, input is passed through the second convolutional layer with same filters again followed by batch normalization layer. Mathematically, BN is defined as follows:

$$c_2 = BN(W_2 * c_1) \tag{2}$$

where $W_2$ represents weights of the second convolutional layer. A shortcut connection is added to the output, and the ReLU activation function is applied to it. Moreover, a projection shortcut is used by employing the following mathematical formulation:

$$z_s = BN(W_p * z) \tag{3}$$

where $z_s$ denotes the shortcut connection, and Wp denotes weights of the projection layer. The final output of the residual block is defined as follows:

$$Y = \sigma(c_2 + z_s). \tag{4}$$

The deep learning network, in one aspect, integrates squeeze-and-excitation block 603 to emphasize a region of a remote sensing image. The block 603 performs a squeeze operation by global average pooling to compute a single descriptor per channel, reshapes the resulting vector to 1×1×C, where C is a number of channels, and applies two dense layers in sequence. A first dense layer reduces the number of channels, a nonlinearity is applied, and a second dense layer restores the original number of channels. A sigmoid gate is produced and multiplied channel-wise with the incoming features so that informative channels are reweighted and less useful responses are suppressed.

A residual block 604 is then applied. The block 604 repeats the two-stage 3×3 convolution→batch normalization→ReLU sequence. After the second 3×3 convolution and batch normalization, a learnable 1×1 projection shortcut with batch normalization is used when the tensor dimensions require alignment; otherwise an identity shortcut is used. The residual addition followed by ReLU refines early hierarchical features while the gradient remains stable for iterative training.

A squeeze-and-excitation block 605 further recalibrates channels in the same manner as the block 603. The squeeze via global average pooling, reshaping to 1×1×C, channel reduction and restoration by two dense layers, and sigmoid-based rescaling strengthen activations that delineate land-cover boundaries and texture cues.

An inception block 606 follows to extract features at multiple scales. The block 606 implements parallel layers. A first parallel layer performs a 1×1 convolution, batch normalization, and ReLU to model pointwise intensity relations. A second parallel layer performs a 1×1 convolution for channel reduction followed by a 3×3 convolution, each with batch normalization and ReLU, to capture mid-scale edges and textures. A third parallel layer performs a 1×1 convolution for channel reduction followed by a 5×5 convolution, each with batch normalization and ReLU, to aggregate wider spatial context. Outputs of the parallel layers are concatenated along the depth dimension to form a multiscale feature tensor for subsequent processing.

A squeeze-and-excitation block 607 recalibrates the multiscale tensor by executing global average pooling, reshaping to 1×1×C, applying two dense layers that first reduce then restore channels, and producing a sigmoid gate that rescales channels associated with coastal and inland patterns. The recalibrated output proceeds to the next stage.

An inception block 608 again branches into the three parallel paths and executes, on each path, the sequence of convolutions, batch normalization, and ReLU just described for the block 606. The depth-wise concatenation at the end of the block 608 merges the multi-receptive-field responses so that the network retains fine to coarse spatial evidence simultaneously.

A squeeze-and-excitation block 609 is applied to the output of the block 608. The block 609 computes global average pooling across spatial positions, reshapes the resulting vector to 1×1× C, applies a first dense layer to reduce channels, applies a nonlinearity, and applies a second dense layer to restore channels. A sigmoid gate is produced and multiplied channel-wise to highlight the discriminative channels yielded by the multi-scale inception paths.

A squeeze-and-excitation block 610 further provides channel-wise emphasis as the signal continues through the scale-progressive portion of the network. The block 610 repeats the squeeze, two-dense-layer excitation, sigmoid gating, and channel-wise rescaling process to maintain attention on land cover cues across varying contexts.

A squeeze-and-excitation block 611 is provided at the entry to the downsampling stage to pre-calibrate channels prior to spatial size changes. The block 611 performs global average pooling, two dense layers for reduction and restoration, applies a sigmoid, and rescales the channels, thereby setting the stage for efficient feature compaction.

A bottleneck block 612 is integrated to balance computational cost. The block 612 first applies a 1×1 convolution to reduce channels, uses batch normalization and ReLU, then applies a 3×3 convolution to extract spatial structure, again followed by batch normalization and ReLU, and finally applies a 1×1 convolution with batch normalization to restore channels. When downsampling is needed in this stage, the 3×3 convolution uses stride 2. In parallel, a projection shortcut uses a 1×1 convolution with stride and batch normalization to align the residual pathway. The main-path output after the third normalization is added element-wise to the shortcut and a ReLU produces the block output, compacting spatial size while preserving power due to computational complexity.

A squeeze-and-excitation block 613 then recalibrates the bottleneck output by global average pooling, dense-layer reduction, nonlinearity, dense-layer restoration, sigmoid gating, and channel-wise scaling so that channels most predictive of LULC classes receive greater emphasis. A bottleneck block 614 maintains the same spatial resolution and deepens the representation. The block 614 performs the 1×1 reduction, 3×3 spatial extraction, and 1×1 restoration sequence, each step followed by batch normalization and ReLU except the last normalization prior to the residual addition. A projection or identity shortcut is selected to match dimensions, residual aggregation is performed, and a ReLU activation yields the output.

A squeeze-and-excitation block 615 repeats the squeeze and excitation operations to emphasize salient channels before the network transitions to a densely connected regime.

A dense stage begins with a dense block 616 configured to promote reuse of the extracted features. Within the dense block 616, each internal layer receives as input the concatenation of all feature maps from the preceding layers in the same block. Each internal layer executes a 1×1 convolution to compress channels, applies batch normalization and ReLU, then executes a 3×3 convolution to extract local patterns followed by batch normalization and ReLU. The layer output is concatenated with the block input to become input for the next internal layer, ensuring that each layer is connected directly to all subsequent layers and that features are reused rather than overwritten.

A transition layer 617 follows the dense block 616 to control model size. The transition layer 617 applies a 1×1 convolution with batch normalization to compress channels, applies ReLU, and then applies average pooling to reduce spatial dimensions, thereby lowering computational cost while maintaining learned information.

A dense block 618 is then employed with the same internal-layer design and direct connections as the block 616. Each internal layer again executes 1×1 convolution→batch normalization→ReLU, followed by 3×3 convolution→batch normalization→ReLU, and concatenates its output to the running set of feature maps. This cumulative growth allows the model to learn complementary descriptors over the already collected features.

A transition layer 619 again compresses channels and reduces spatial size by performing a 1×1 convolution with batch normalization and ReLU, followed by average pooling. This transition preserves discriminative content while keeping the tensor compact.

A dense block 620 further extends the reuse pattern. Its sequence of internal layers repeats the 1×1 and 3×3 convolutions with normalization and ReLU, with each new output concatenated to the preceding ones to expand the representational basis without information loss. A squeeze-and-excitation block 621 is coupled to the output of the dense stage to recalibrate the many concatenated channels. The block 621 computes per-channel descriptors via global average pooling, reshapes to 1×1× C, applies a first dense layer that reduces the channel dimension, applies a nonlinearity, applies a second dense layer that restores the original dimension, and uses a sigmoid to generate gates. Channel-wise multiplication rescales the concatenated features and suppresses redundancy.

An inverted bottleneck block 622 begins a high-level expansion stage to capture complex semantics while keeping the parameter count efficient. The block 622 expands channels with a 1×1 convolution, applies batch normalization and ReLU, performs a depthwise 3×3 convolution across each channel with batch normalization and ReLU to model spatial context at low cost, and finishes with a 1×1 projection convolution and batch normalization to compress channels back to the target width. If the input and output shapes match, a residual addition and activation are applied.

A squeeze-and-excitation block 623 follows to emphasize informative channels produced by the expansion-depthwise-projection sequence. The block 623 executes global average pooling, dense-layer reduction, nonlinearity, dense-layer restoration, sigmoid gating, and channel-wise scaling.

An inverted bottleneck block 624 repeats the expansion pathway: a 1×1 convolution with batch normalization and ReLU for channel expansion, a depthwise 3×3 convolution with batch normalization and ReLU for spatial modeling, and a 1×1 projection with batch normalization for channel compression, followed by residual aggregation where dimensions permit. The calibrated output is presented to a squeeze-and-excitation block 625, which performs global average pooling, two dense layers that first reduce and then restore channels, applies a sigmoid to produce per-channel gates, and rescales the features.

A residual block 626 is then introduced to reinforce gradient stability while refining context. The block 626 takes its input, applies a first 3×3 convolution followed by batch normalization and ReLU, applies a second 3×3 convolution followed by batch normalization, prepares an identity or 1×1 projection shortcut with batch normalization depending on dimensional needs, aggregates the main path with the shortcut by addition, and applies a ReLU to produce the output.

A squeeze-and-excitation block 627 repeats the squeeze-and-excitation process to recalibrate the residual output. An inverted bottleneck block 628 then executes the expansion 1×1 convolution with batch normalization and ReLU, the depthwise 3×3 convolution with batch normalization and ReLU, and the 1×1 projection convolution with batch normalization, with residual addition when shapes match, to finalize high-level semantic features.

A final recalibration stage 629 emphasizes discriminative channels prior to classification. The stage 629 performs a final squeeze by global average pooling, reshapes to 1×1×C, applies two dense layers that reduce and then restore channel dimensionality, computes a sigmoid gate, and rescales the channels so that the most predictive responses dominate the classification input.

For classification, a global average pooling 630 aggregates the spatial responses of each channel into a single descriptor per channel, producing a compact vector that reflects the presence of features irrespective of their spatial position. A dropout unit 631 randomly deactivates a fraction of the descriptors during training to regularize the classifier and reduce overfitting by preventing co-adaptation of features. A fully connected classification layer 632 maps the pooled descriptors to logits and feeds a softmax that determines at least one class label and a respective confidence score for the at least one class label based on the extracted features. The output panel 633 illustrates example classification results corresponding to categories used in evaluation.

In the end-to-end deployment of the system 100 of FIG. 1, the remote sensing device sensor captures, every predetermined time period, a remote sensing image. The communication circuitry transmits the remote sensing images to the server 112. The server communication circuitry receives the remote sensing images, the memory 104 stores the remote sensing images, and the machine learning engine iteratively trains and deploys the deep learning network 600 that includes the blocks 601 through 633 described above. During inference, the trained deep learning network 600 processes each remote sensing image delivered from the remote sensing devices and produces the classification and the confidence score that are rendered for an operator on the display 110.

Figure 7:
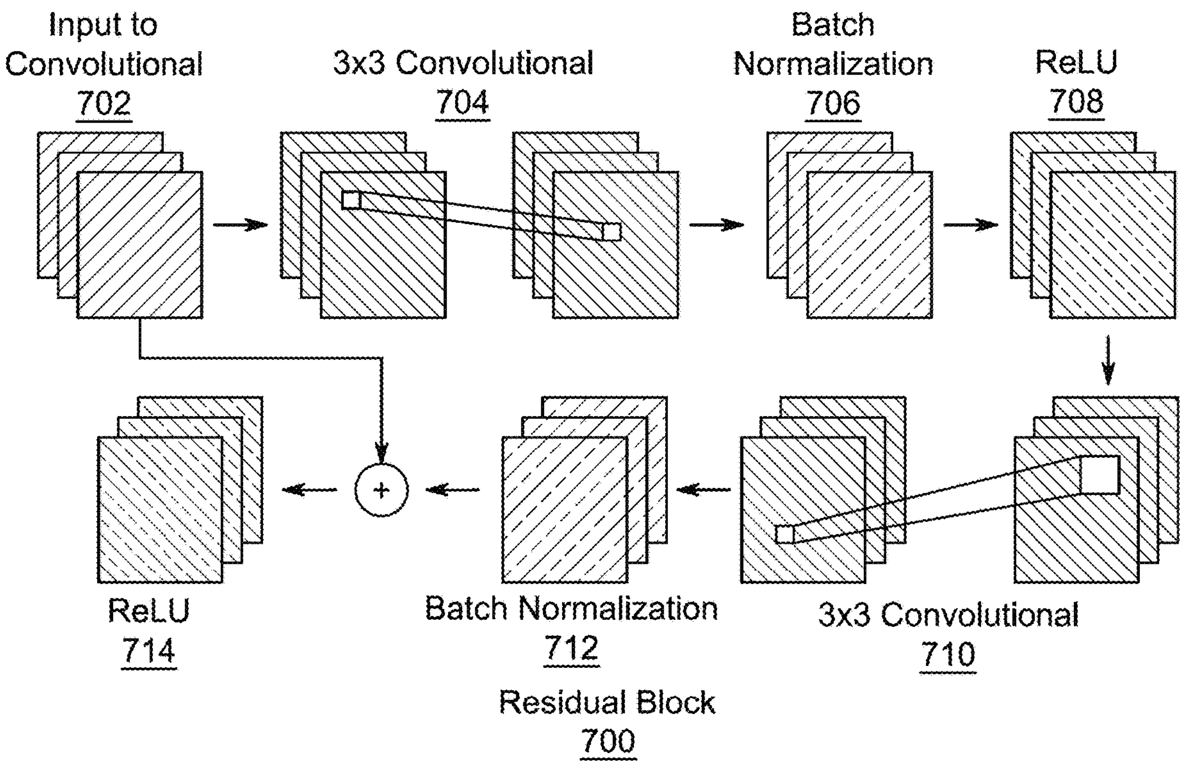
FIG. 7 illustrates an exemplary residual block, according to certain embodiments.

FIG. 7 depicts a residual block 700 tailored for the SEMSF-Net, according to certain embodiments. At the entry to the block, an input feature tensor is received at an input to convolutional unit 702. This tensor carries spatial activations extracted by prior layers and may include edges, textures, and coarse shapes. The tensor is first processed by a two-dimensional 3×3 convolution 704. A 3×3 kernel is selected because it balances locality and computational efficiency: each output activation aggregates evidence from its 3×3 neighborhood while preserving fine spatial detail that would be blurred by larger kernels. Convolution 704 linearly combines the local neighborhood across all input channels with learnable weights, thereby synthesizing new features that are better aligned with land-cover primitives such as shoreline contours, field boundaries, or building edges.

Immediately after 704, the intermediate activations are normalized by batch normalization 706. During iterative training, the distribution of activations tends to drift (internal covariate shift), which can slow or even destabilize learning. Batch normalization 706 counters this by standardizing each channel to zero mean and unit variance based on the current mini-batch, followed by learned affine re-scaling and shifting. This normalization allows a higher, more stable learning rate and reduces sensitivity to weight initialization, making the block train reliably at depth.

A rectified linear unit (ReLU) 708 then introduces nonlinearity. Linear systems cannot model the complex decision surfaces required for LULC classification, ReLU 708 zeroes negative responses while leaving positive responses unchanged, which preserves gradient flow for positive activations and encourages sparse, discriminative features.

The activated map is next refined by a second two-dimensional 3×3 convolution 710. This second convolution increases the effective receptive field (a 5×5 region when combined with 704) without the parameter burden of a single 5×5 kernel, enabling the block to combine nearby structures, e.g., water-vegetation boundaries or road-building junctions, into more informative mid-level features. A subsequent batch normalization 712 again standardizes channel statistics to maintain stable gradients and reduce sensitivity to scale changes introduced by 710.

In parallel with the above transformation, the block forms a shortcut pathway (the "residual" branch). When input and output shapes match, the shortcut is the identity; when they differ, a learnable 1×1 projection with batch normalization (not explicitly shown in the figure but understood in the art) aligns channel count and, if needed, spatial size. This projection is computationally light, each output channel is an affine combination of input channels at the same spatial location, so the shortcut can carry forward essential information without distorting spatial structure. The output of batch normalization 712 is then added to the shortcut signal at the residual summation node. This additive fusion embodies residual learning: rather than learning a full mapping, the block learns only the residual correction that should be applied to the identity (or projected) input. Residual learning is crucial for deep networks because it provides a direct gradient pathway from later layers back to earlier layers, thereby preventing a training gradient from vanishing and mitigating degradation as depth grows. A final ReLU 714 is applied to the summed tensor to inject nonlinearity after the residual merge and to suppress any negative artifacts introduced by the addition. The resulting output Y(=ReLU($c_2$+$z_s$), with $c_2$ the output of 712 and $z_s$ the shortcut) carries richer, more stable representations forward while preserving information that earlier layers already modeled well.

Figure 8:
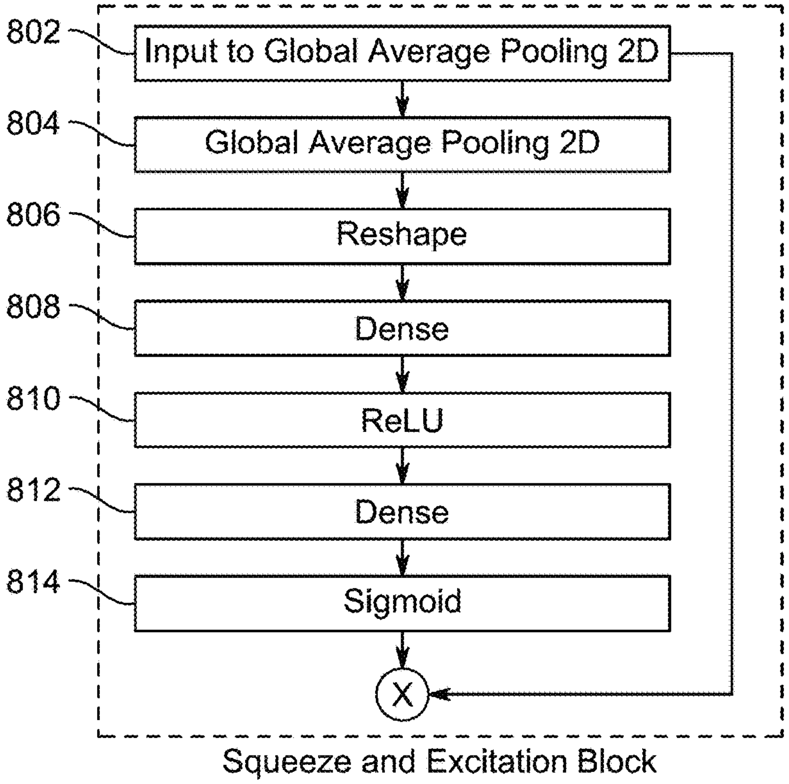
FIG. 8 illustrates an exemplary squeeze-and-excitation block, according to certain embodiments.

FIG. 8 illustrates a squeeze-and-excitation (SE) block integrated in SEMSF-Net, according to certain embodiments. The SE block is designed to recalibrate inter-channel dependencies so that channels carrying discriminative evidence (e.g., water spectral cues versus vegetative texture cues) are emphasized, while less informative or noisy channels are attenuated.

An input tensor produced by the residual block is first passed through a global average pooling layer to perform a squeeze operation through which a scalar value is calculated for each channel. The resulting squeezed vector is reshaped to (1, 1, C), where C is the number of channels. Two dense layers are then applied to this reshaped vector. A first dense layer reduces the number of channels by 16, and a ReLU activation function is applied to introduce nonlinearity; he_normal, selected as a kernel initializer, initializes the weights for a deeper network. A second dense layer restores the original number of channels, and a sigmoid function is applied, normalizing the values in the range of [0, 1] to compute channelwise importance. Finally, the input tensor is multiplied by the channelwise importance to perform channel-wise recalibration.

$$S = GAP(Y) = \frac{1}{h \times w}\sum_{m=1}^{h}\sum_{n=1}^{w} Y(m, n, i) \tag{5}$$

$$E = \sigma(W_2''(\sigma'(W_1''S))) \tag{6}$$

where h and w represent the height and width of the feature map, respectively, and i represents the index of channel. For the excitation block, σ and σ' represent the sigmoid and ReLU activation functions, respectively. Also, $W''_1$ and $W''_2$ represent the weights of dense layers. Hence, $$Y_{SE} = Y \cdot E. \tag{7}$$

After the implementation of the SE block, the final output of the residual block is formulated as follows:

$$Y_f = \sigma(c_2 + z_s) \cdot E. \tag{8}$$

Referring back to FIG. 8, an input tensor enters at 802 and is forwarded to a global average pooling layer 804. This "squeeze" step collapses the spatial dimensions of each channel to a single scalar—the average over height and width. Global averaging is used, rather than a local pooling, because the goal is to summarize global channel presence independent of exact location: if a channel consistently fires across a scene containing, for example, rippled water or bare soil, its average captures that global evidence succinctly and robustly to translation.

The squeeze vector is reshaped at 806 to a 1×1×C tensor so that it can be processed by pointwise operations and later broadcast back to the original channel dimension. An "excitation" subnetwork then learns how much to emphasize or suppress each channel. First, a dense layer 808 reduces dimensionality (e.g., by a factor of 16). This bottleneck compels the subnetwork to learn a compact set of inter-channel patterns—such as "water-like channels tend to co-occur" or "urban-texture channels rarely co-occur with snow-texture channels"—and it lowers computational cost. The reduction layer's weights can be initialized with a variance-preserving scheme (e.g., he_normal) so that early training is stable even in deep stacks.

A ReLU 810 follows to introduce nonlinearity, allowing the excitation subnetwork to model complex, non-linear dependencies between channels rather than simple linear weighting. The signal is then expanded back to the original channel dimension by a second dense layer 812. This restoration step maps the compact dependency code back into a per-channel importance vector: each output neuron corresponds to one original channel. A sigmoid activation 814 is applied to normalize each importance weight to [0, 1]. The sigmoid is chosen because it smoothly maps arbitrary real values to a bounded confidence interpretation (0=suppress, 1=fully pass), making the learned weights naturally interpretable as "how much of this channel should be retained." The resulting excitation vector E is then broadcast over the spatial dimensions and multiplied, channel-by-channel, with the original input tensor (depicted by the multiplication symbol at the right of FIG. 8). This yields a recalibrated feature map in which informative channels are amplified and unhelpful channels are damped. When the SE block follows a residual block, i.e., residual refinement followed by channel-wise attention. By operating purely on channels (not spatial locations), the SE block adds negligible spatial bias yet significantly enhances representational power, particularly for remote-sensing scenes where subtle spectral/texture differences distinguish, for example, water from wetland or snow from bright rooftops.

Figure 9:
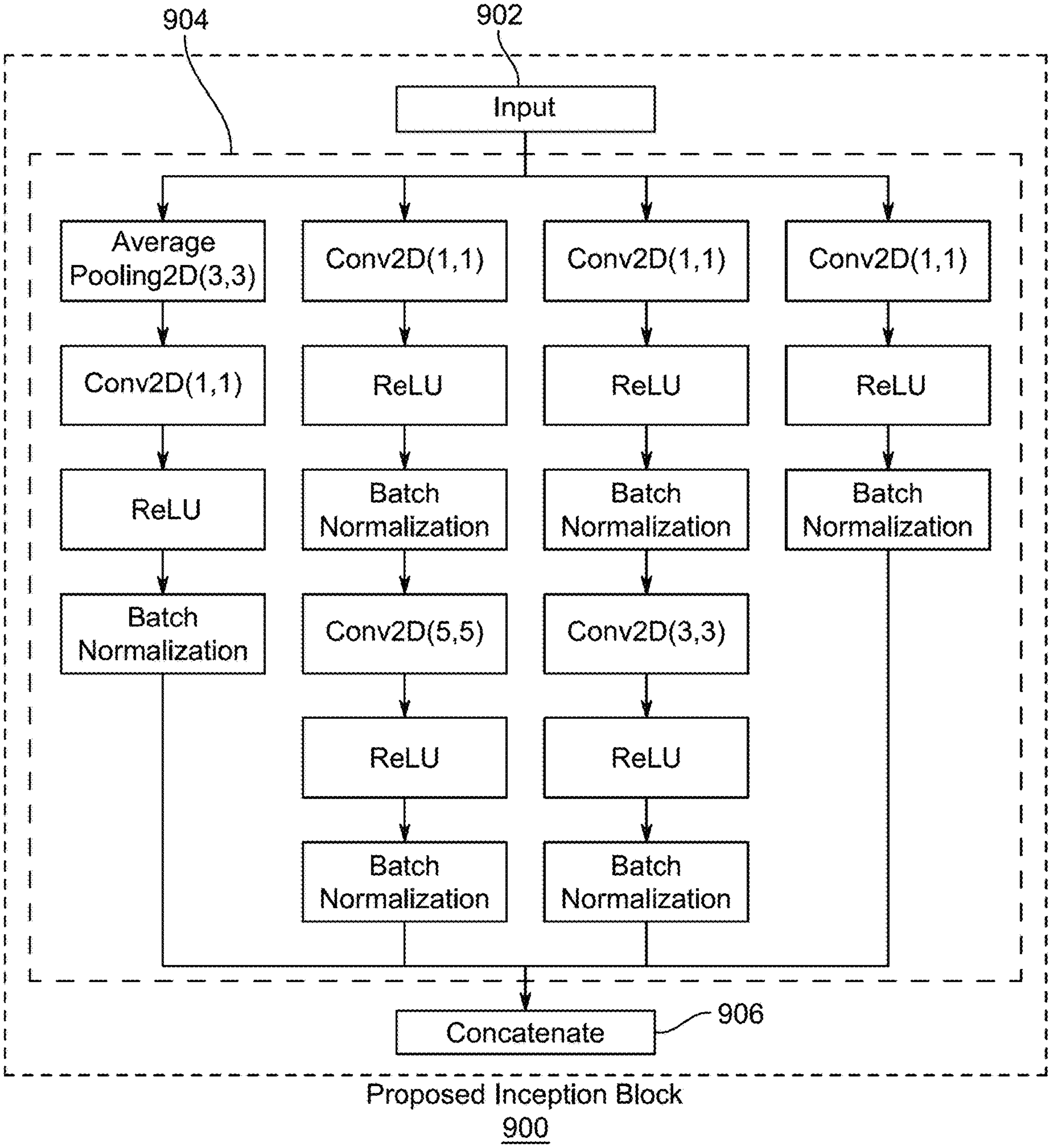
FIG. 9 illustrates an exemplary inception block embedded after a squeeze-and-excitation block, according to certain embodiments.

FIG. 9 provides an exemplary diagram of an inception block 900 embedded with a squeeze-and-excitation mechanism, according to certain embodiments. An input block 902 receives an input feature tensor. The block 904 is engineered to extract features at multiple spatial scales and then to recalibrate the resulting channels before emission of a unified output at 906.

In a first parallel branch of the block 904, a 1×1 convolution is applied with same padding to the input tensor. Such operation performs channel-wise mixing and captures localized, pointwise responses without increasing spatial cost. The convolved features are normalized by a batch normalization operation to stabilize the distribution of activations across the mini-batch. A rectified linear unit (ReLU) activation function is then applied to introduce nonlinearity and to preserve positive responses while zeroing negative values. Formally, this branch produces:

$$z_{1\times1} = BN(\sigma(conv_{1\times1}(z))). \tag{9}$$

In a second parallel branch of the block 904, a 1×1 convolution is performed that reduces channel dimensionality. This reduction limits computation in the next operation while retaining salient content. The reduced features are normalized and activated, and then processed by a 3×3 convolution that expands the receptive field to capture mid-scale edges and textures. The 3×3 output is again batch-normalized and passed through ReLU to yield robust mid-scale descriptors. This sequence is expressed as:

$$z_{3\times3} = BN(\sigma(conv_{3\times3}(BN(\sigma(conv_{1\times1}(z)))))). \tag{10}$$

In a third parallel branch of the block 904, a 1×1 convolution is utilized followed by a 5×5 convolution. The initial 1×1 layer compresses channels to curb cost. The subsequent 5×5 layer aggregates wider contextual structure that is beneficial for scenes with large homogeneous regions or broad boundaries. Batch normalization and ReLU are applied after each convolution so that gradient flow remains stable and discriminative contrast is preserved. This branch produces:

$$z_{5\times5} = BN(\sigma(conv_{5\times5}(BN(\sigma(conv_{1\times1}(z)))))). \tag{11}$$

In a fourth parallel branch of the block 904, spatial smoothing is introduced by an average-pooling layer with a 3×3 pool size and same padding. Pooling attenuates high-frequency noise and summarizes local neighborhoods. The pooled map is refined by a 1×1 convolution to recover channel selectivity, followed by ReLU and batch normalization to generate a clean pooled descriptor. This branch yields:

$$z_p = BN(\sigma(conv_{1\times1}(\mathrm{pool}_{3\times3}(z)))) \tag{12}$$

The outputs from the four branches are concatenated along the channel dimension, forming a multiscale tensor:

$$z_c = concat(|z_{1x1}, z_{3x3}, z_{5,5}, z_p|) \tag{13}$$

To emphasize channels that are most informative for land use and land cover while suppressing less discriminative responses, the block performs a squeeze-and-excitation operation on the concatenated tensor. A global average pooling computes one scalar per channel by averaging spatial responses across height and width, $$X = \frac{1}{h \times w} \sum_{m=1}^{h} \sum_{n=1}^{w} z_c(m, n, i) \quad (14)$$

$$X' = \sigma(W_2''(\sigma'(W_1''X))) \quad (15)$$

$$Z_{SE} = z_c \cdot X'. \quad (16)$$

The pooled vector is reshaped to (1, 1, C) and passed through two dense layers arranged as a reduction followed by a restoration of dimensionality. A ReLU activation in the first dense layer introduces nonlinearity and a sigmoid activation in the second dense layer squashes each element to the [0, 1] interval to produce channel-attention weights X'. The attention vector modulates the multiscale tensor through element-wise multiplication to obtain $Z_{SE}$. The modulated tensor constitutes the inception block output $Z_f$ delivered at 904 as:

$$Z_f = Z_{SE}. \quad (17)$$

By concatenating 1×1, 3×3, and 5×5 receptive fields with pooled context and then recalibrating channels, the block 900 provides a compact unit that captures localized, mid-scale, and wide-area patterns while preserving the most salient information for downstream stages.

Figure 10:
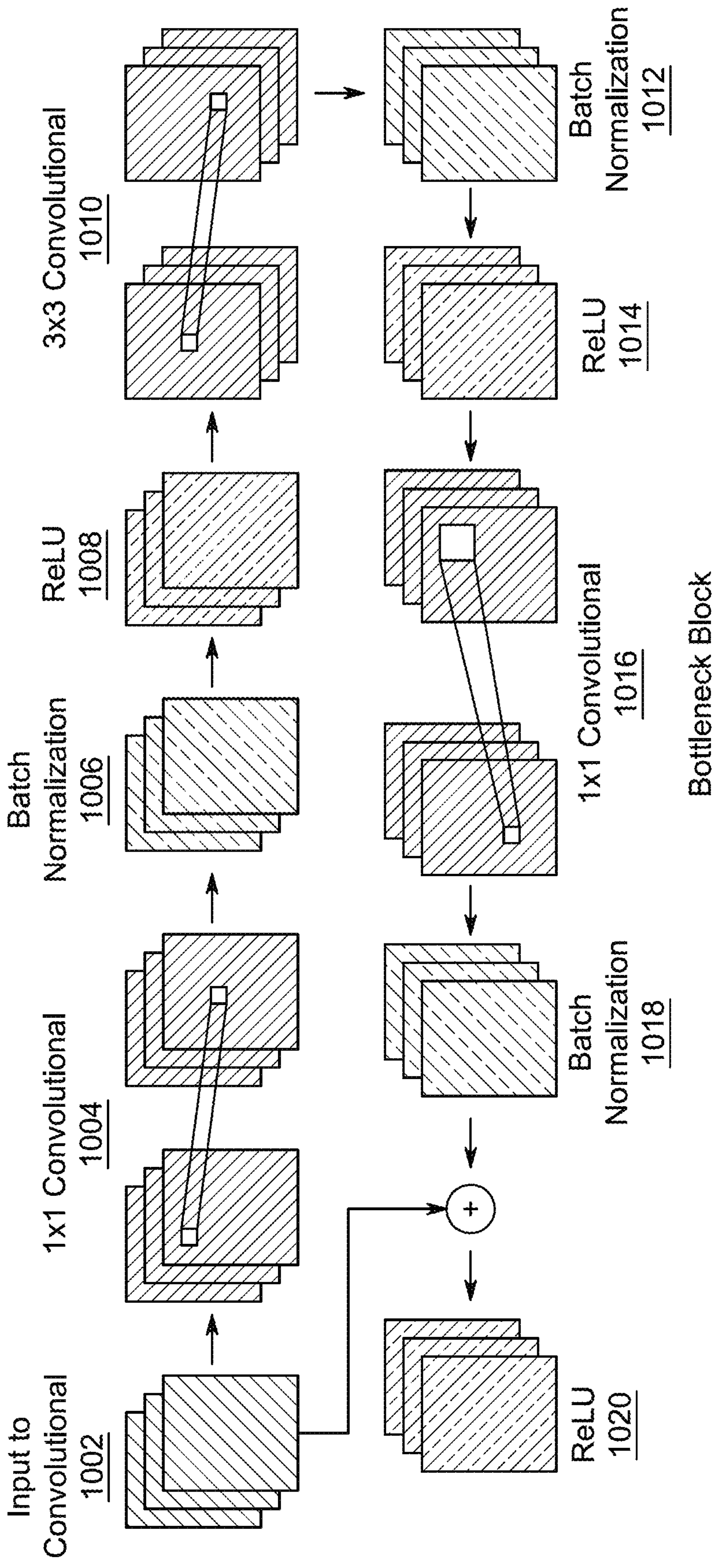
FIG. 10 illustrates an exemplary bottleneck residual block embedded with a squeeze-and-excitation block, according to certain embodiments.

FIG. 10 provides an exemplary diagram of a bottleneck residual block embedded with a squeeze-and-excitation mechanism, according to certain embodiments. An input block 1002 receives an input tensor and processes it through a compute-balanced three-convolution path with a residual shortcut that preserves gradient flow.

A first 1×1 convolution, at block 1004, compresses the input channels to a narrow bottleneck. This compression reduces multiply-accumulate operations in the subsequent spatial convolution while retaining essential channel combinations. The compressed features are normalized by batch normalization, at block 1006, to stabilize activation statistics, and then activated by ReLU, at block 1008, to introduce nonlinearity and mitigate saturation effects.

Mathematically, it is defined as follows:

$$z_1 = \sigma(BN(conv_{1\times1}(z, f_{in}/4))). \quad (18)$$

A 3×3 convolution, at block 1010, then operates in the reduced channel space to extract spatial structure at moderate receptive field. This layer is the principal spatial feature extractor within the block. Its output is normalized by batch normalization, at block 1012, and activated by ReLU, at block 1014, so that informative edges and textures are preserved while noisy responses are attenuated.

Mathematically, it is defined as follows:

$$z_2 = \sigma(BN(conv_{3\times3}, (z_1, f_{in}/4))). \quad (19)$$

The block next restores channel dimensionality by a second 1×1 convolution, at block 1016. This expansion brings the representation back to the target width for compatibility with the residual path and for expressiveness in later stages. Batch normalization, at block 1018, aligns the statistics of the expanded features with those of the shortcut. Mathematically, it is defined as follows:

$$z_3 = BN(conv_{1\times1}(z_2, f_{out})). \quad (20)$$

In parallel with the main path, a residual shortcut carries a transformed or identity copy of the original input. When spatial size or channel count differs between the input and the expanded features, a 1×1 projection with the appropriate stride is used on the shortcut to align dimensions. When sizes already match, the identity serves as the shortcut. The main-path features and the shortcut are summed to form a residual addition that preserves low-frequency content and enables the gradients to propagate across deep stacks without vanishing. A terminal ReLU, at block 1020, produces the residual block response. Mathematically, it is defined as follows:

$$z_s = BN(conv_{1\times1}(z, f_{out}, s)) \quad (21)$$

$$z_s = z \quad (22)$$

$$z_r = \sigma(z_s + z_3) \quad (23)$$

To further emphasize a region or informative channels produced by the residual fusion, the block applies a squeeze-and-excitation recalibration to the residual response.

Mathematically, it is defined as follows:

$$X_{SE} = z_r \cdot X' \quad (24)$$

where X' represents weights calculated by the SE block. Hence, the final output of the residual bottleneck block after passing through the SE block is as follows:

$$X_f = X_{SE}. \quad (25)$$

A global average pooling computes one descriptor per channel. Two dense layers then reduce and restore the channel dimensionality with ReLU and sigmoid activations, respectively, to generate channel weights. Channel-wise multiplication of the residual response by these weights produces the final output of the bottleneck residual unit. In typical usage, the first instance of this unit applies a stride of two in the projection to reduce spatial dimensions, while subsequent instances operate with a stride of one to enrich features at constant resolution. By compressing with 1×1, extracting with 3×3, restoring with 1×1, preserving information through the residual pathway, and recalibrating with squeeze-and-excitation, the structure in FIG. 10 balances computational cost with power based on computational complexity and sustains stable training in deep networks used for automatic classification of land use and land cover.

Figure 11:
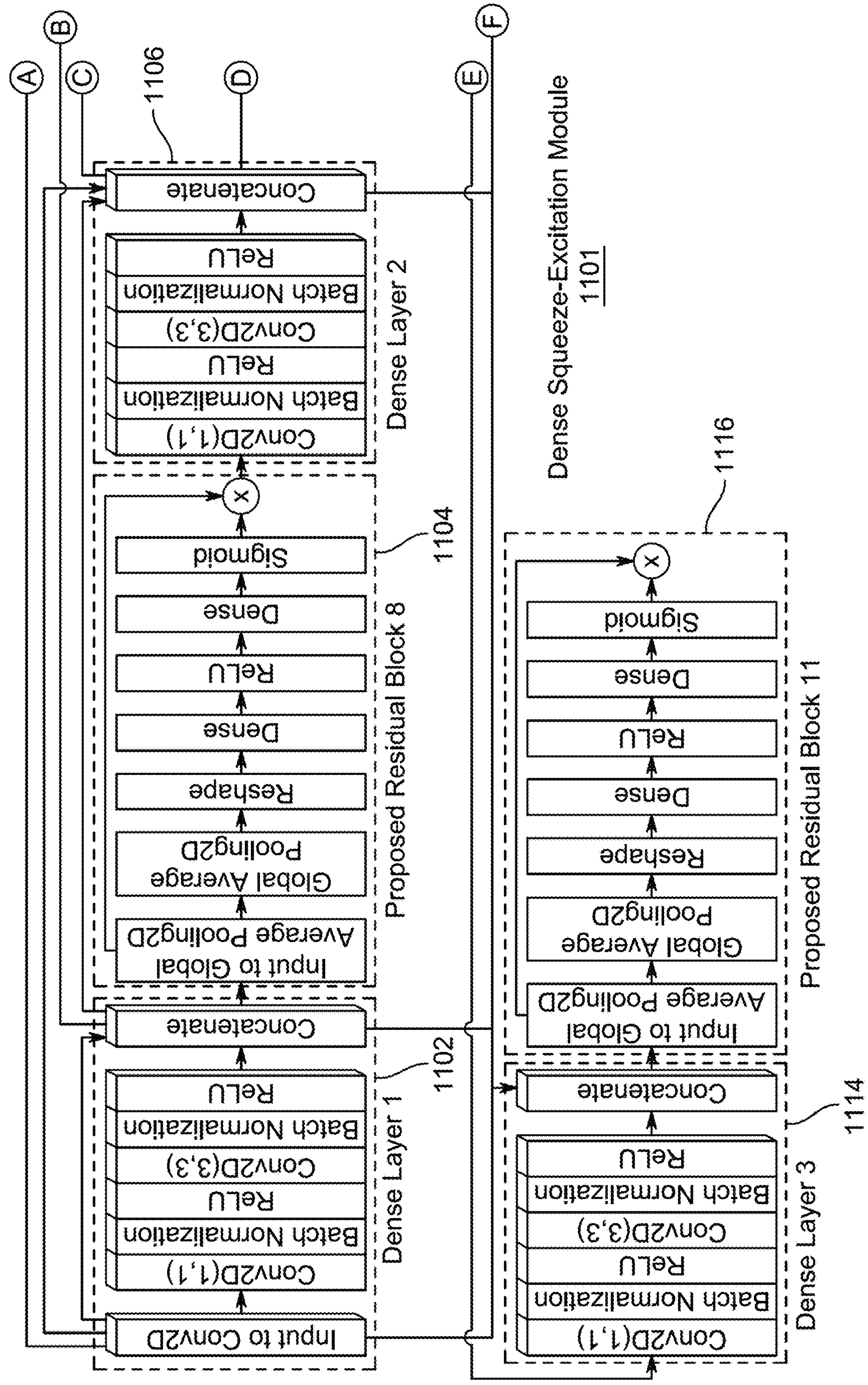
FIG. 11 illustrates an exemplary dense block embedded with a squeeze-and-excitation block and an exemplary inverted bottleneck block, according to certain embodiments.
Figure 11:
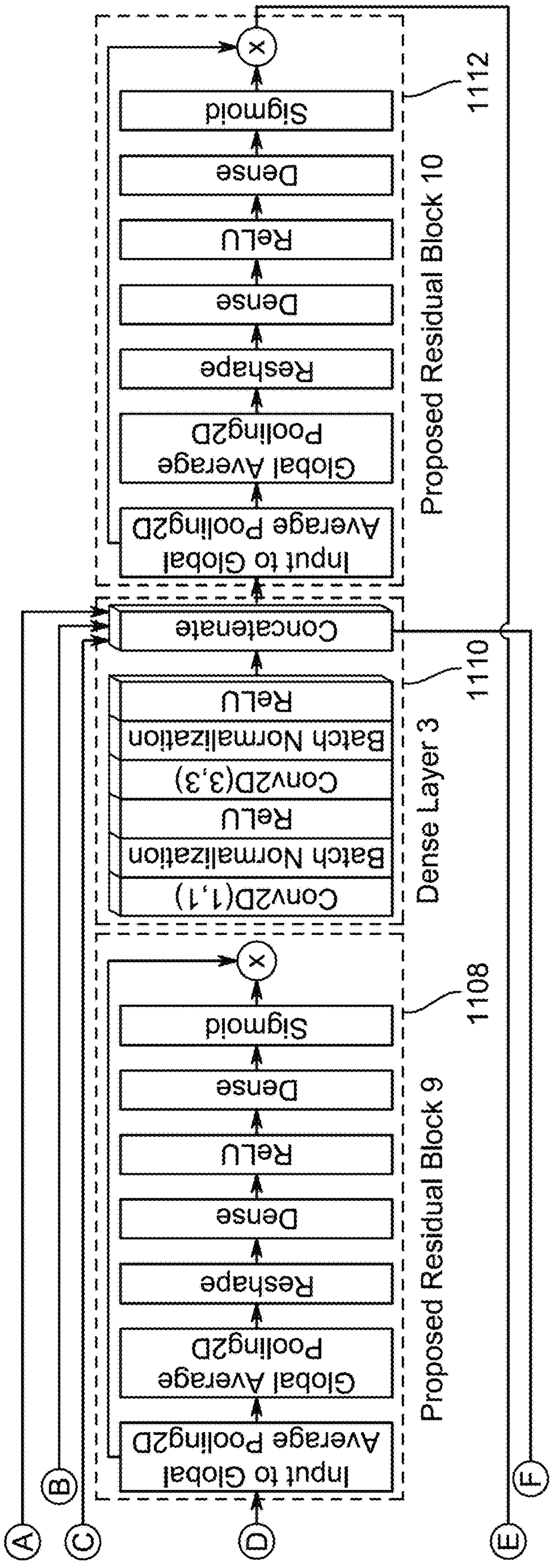
Figure 11:
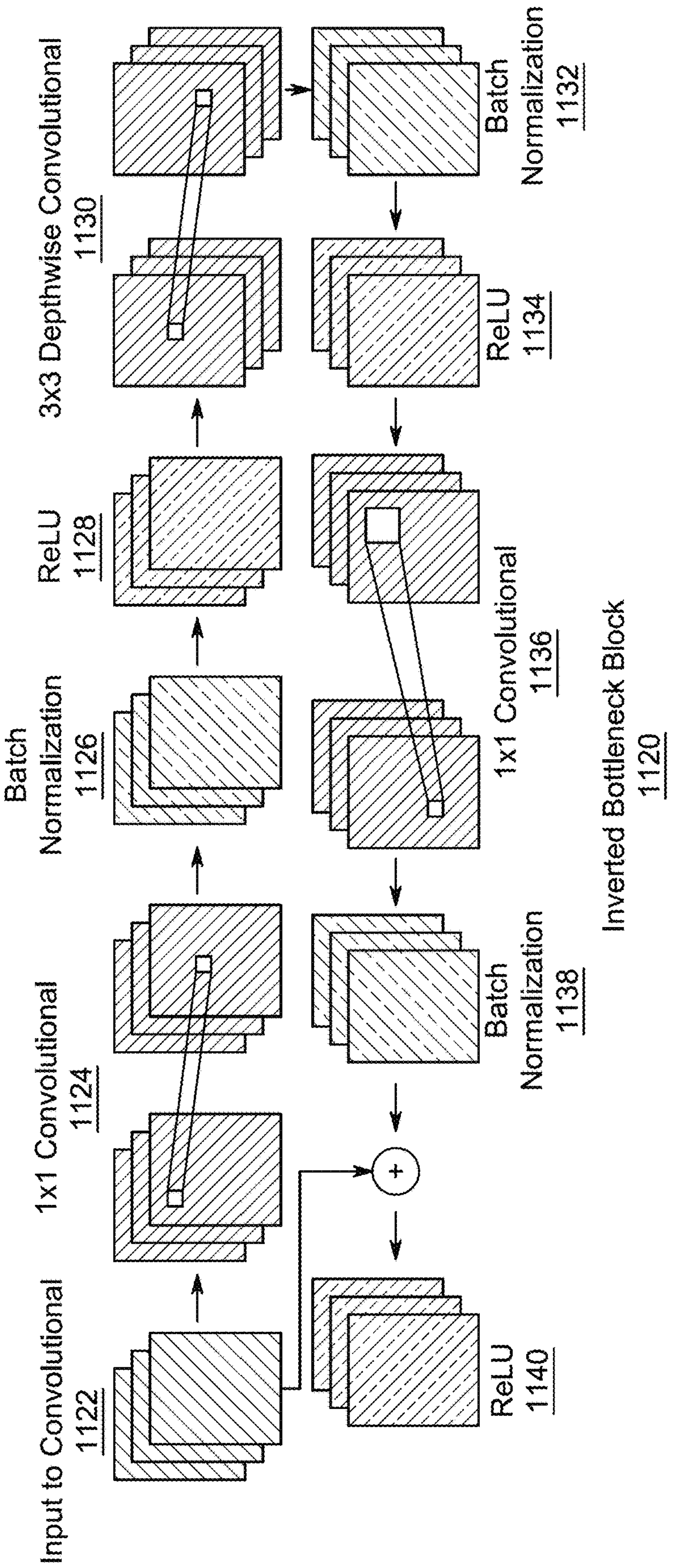

FIG. 11 illustrates a dense block embedded with squeeze-excitation (SE) and a sequence of inverted bottleneck residual blocks that together form a forward-propagating feature extractor. The arrangement incorporates densely connected layers derived from the DenseNet framework in which each layer feeds its output to all subsequent layers through concatenation. This approach preserves the feedforward nature, mitigates vanishing gradients at lower computational cost, and promotes parameter efficiency through explicit feature reuse.

FIG. 11 further depicts a series of dense modules 1101 interconnected across stages 1102, 1104, 1106, 1108, 1110, and 1112. Inter-stage connections route previously computed features to later stages to encourage reuse without loss of information. A secondary stream 1114 and 1116 mirrors this behavior, thereby maintaining a persistent flow of multi-scale features throughout the block. The dense connections are realized by concatenating the current features with the set of all prior outputs available at that point in the block.

Within each dense module the designed dense block comprises four layers. Each layer consists of a 1×1 convolution followed by a 3×3 convolution, a concatenation operation, and an SE block. The input tensor first passes through the 1×1 convolution, where the growth factor, originally 32, is multiplied by a factor of four to produce an intermediate expansion that yields enhanced feature representation while maintaining the computational cost. The output of the 1×1 convolution is then processed by a 3×3 convolution for feature extraction with the growth rate equal to the original. After these two convolutions a concatenation operation merges the features of the current layer with those of all preceding layers according to:

$$z_{j+1} = concat(z_0, z_1, \ldots, z_j, f_3(f_1(z_j))). \tag{26}$$

An SE block follows the concatenation and adaptively recalibrates channel responses to enhance the feature representation. The total number of features after the dense block is given by:

$$F_{out} = F_0 + L \cdot m \tag{27}$$

where L denotes the number of layers, mis the growth factor, and Fdenotes the number of extracted features in the block.

The lower portion of FIG. 11 details a representative inverted bottleneck residual block 1120 and its constituent operations. An input tensor 1122 is first transformed by a 1×1 pointwise convolution 1124 that expands the number of filters, originally 256, by a factor of four. Batch normalization 1126 and a rectified linear activation 1128 are then applied. A 3×3 depthwise convolution 1130 performs spatial feature extraction with substantially fewer parameters than a standard convolution of the same kernel size. Batch normalization 1132 and a rectified linear activation 1134 follow the depthwise operation. A second 1×1 pointwise convolution 1136 restores the original number of channels to make the network computationally efficient. Batch normalization 1138 and a rectified linear activation 1140 complete the residual path, after which an SE unit enhances the feature representation. The sequence of normalization and activation around the depthwise operator may be expressed compactly as:

$$z'' = \sigma(BN(DWconv_{3\times 3}(z'))). \tag{28}$$

Three such inverted bottleneck residual blocks are incorporated downstream of the dense block. The first employs stride two to downsample and increase the receptive field while maintaining computational cost. The remaining two employ stride one to preserve spatial resolution during further feature extraction. After the third inverted bottleneck residual block a global average pooling layer converts the feature map into a one-dimensional feature vector suited for classification.

In one embodiment the global average pooled vector is forwarded to a fully connected layer followed by a SoftMax activation to produce class probabilities, and the training loss is computed using categorical cross-entropy. The overall architecture contains approximately 2.64 million parameters with 6.86 GFLOPs, which yields a computationally inexpensive network with sufficient capacity to capture complex patterns present in the data.

Figure 12:
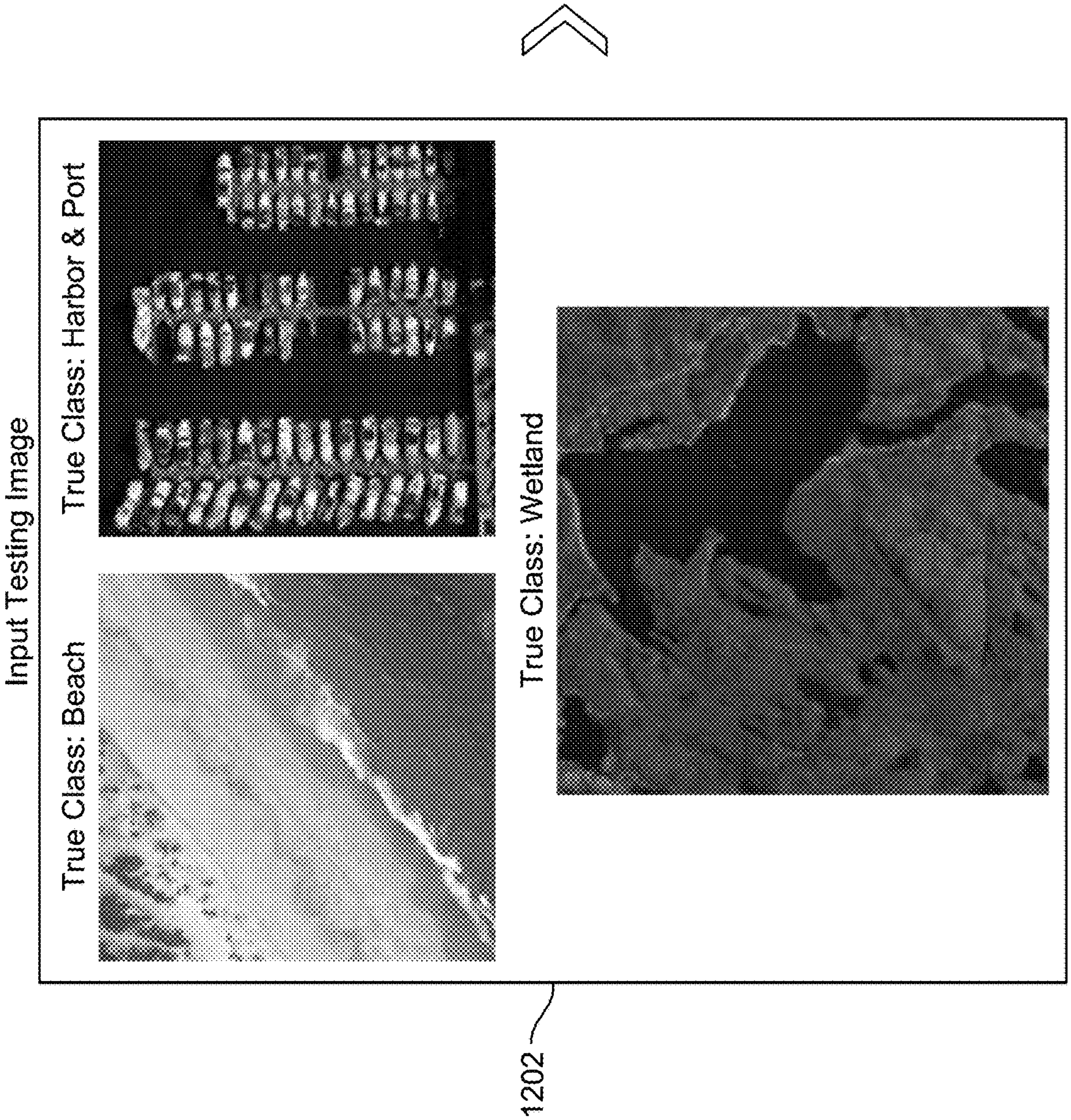
FIG. 12 illustrates an exemplary testing workflow of the deep architecture for coastal and land-use/land-cover classification, according to certain embodiments.
Figure 12:
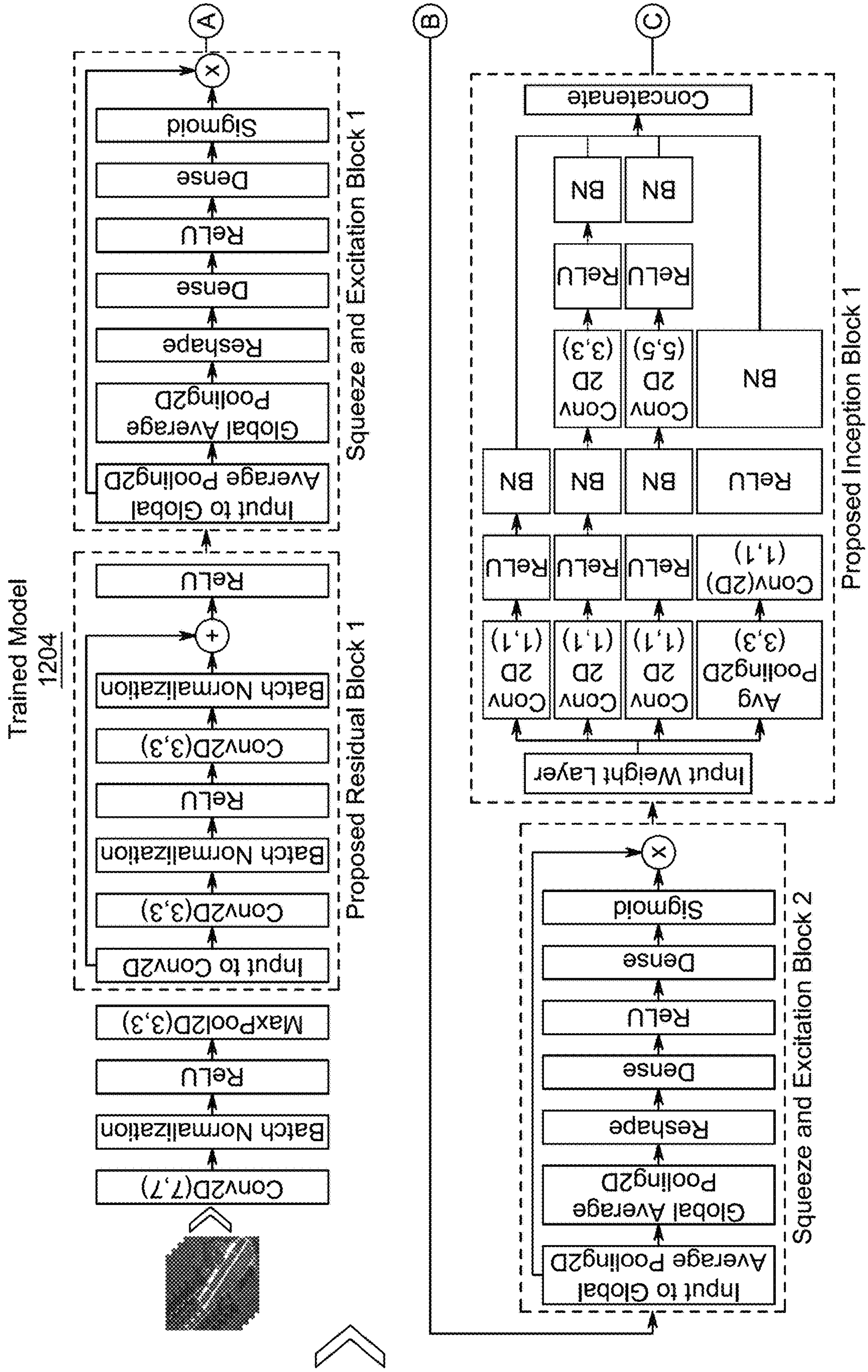
Figure 12:
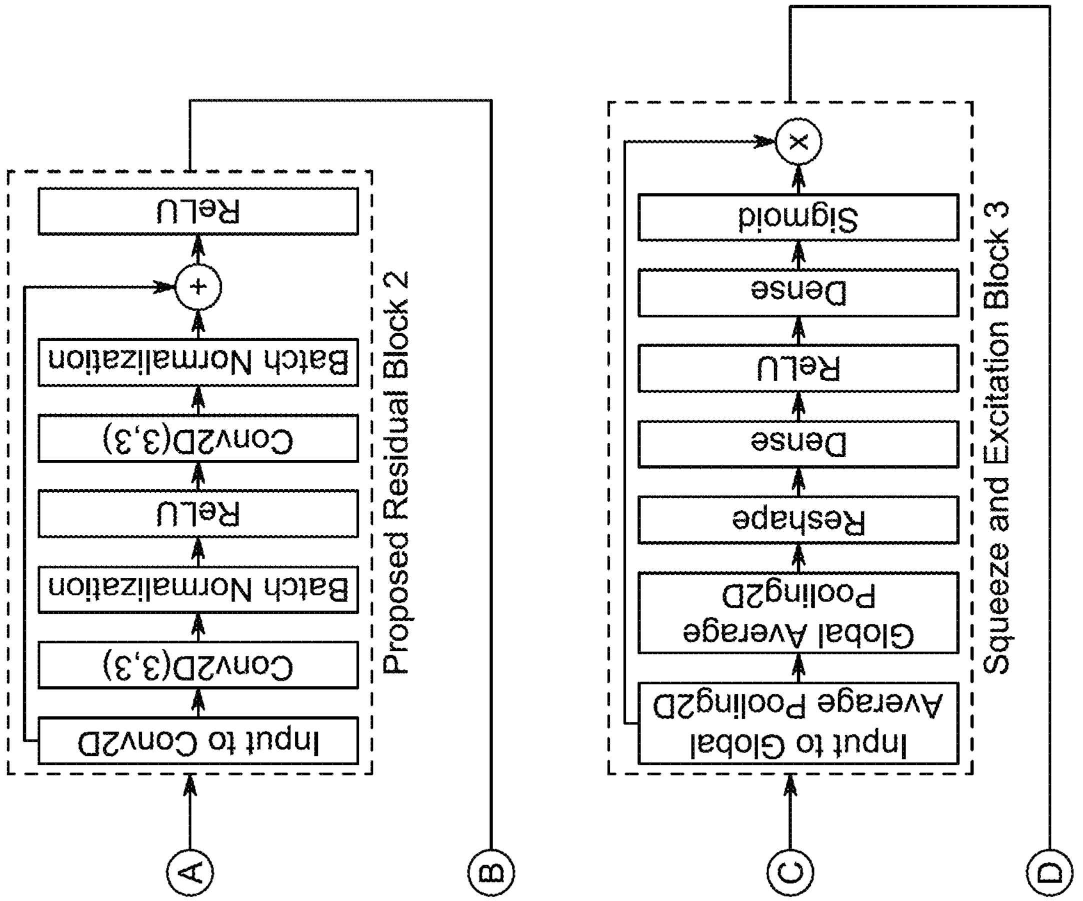
Figure 12:
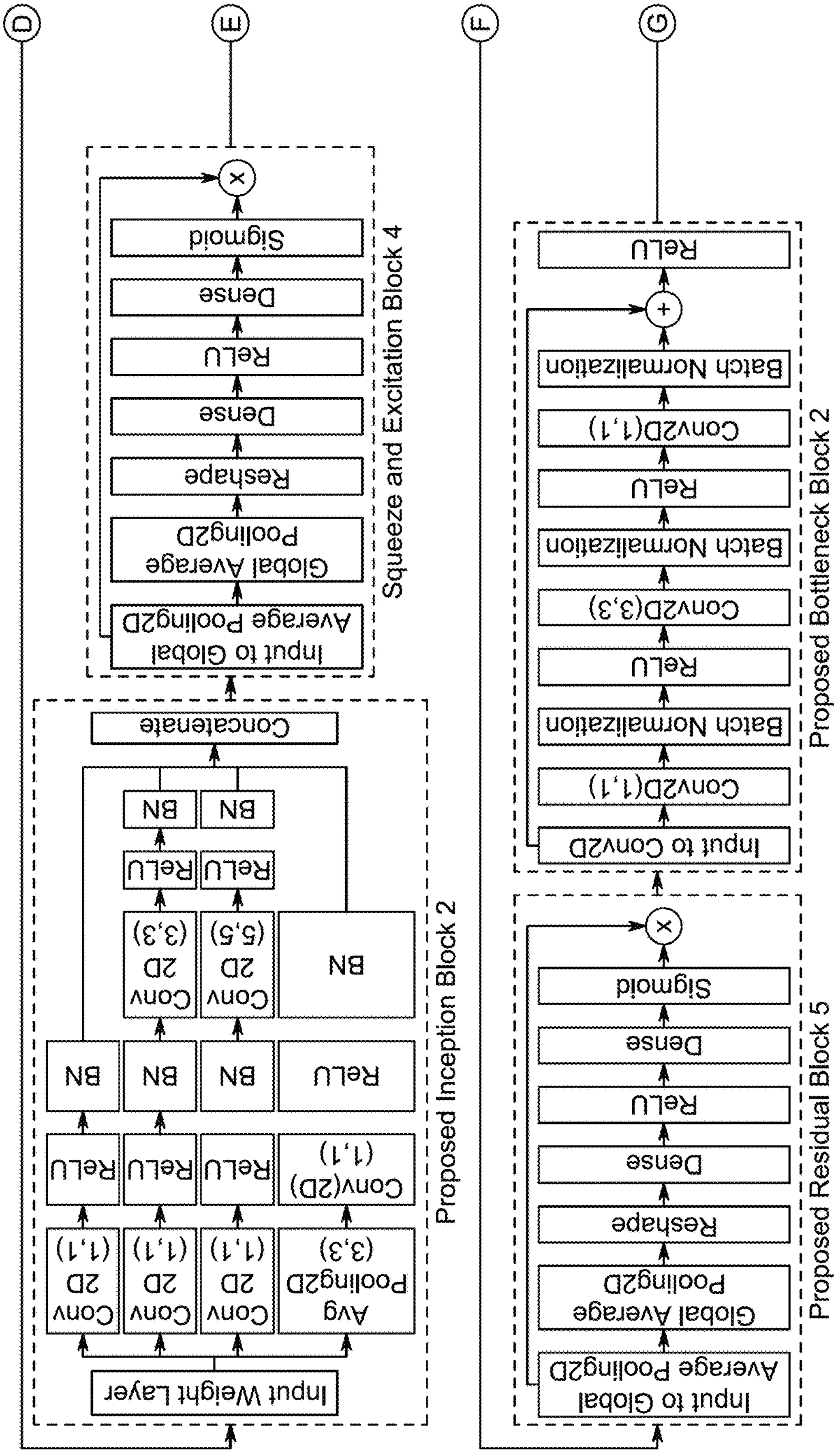
Figure 12:
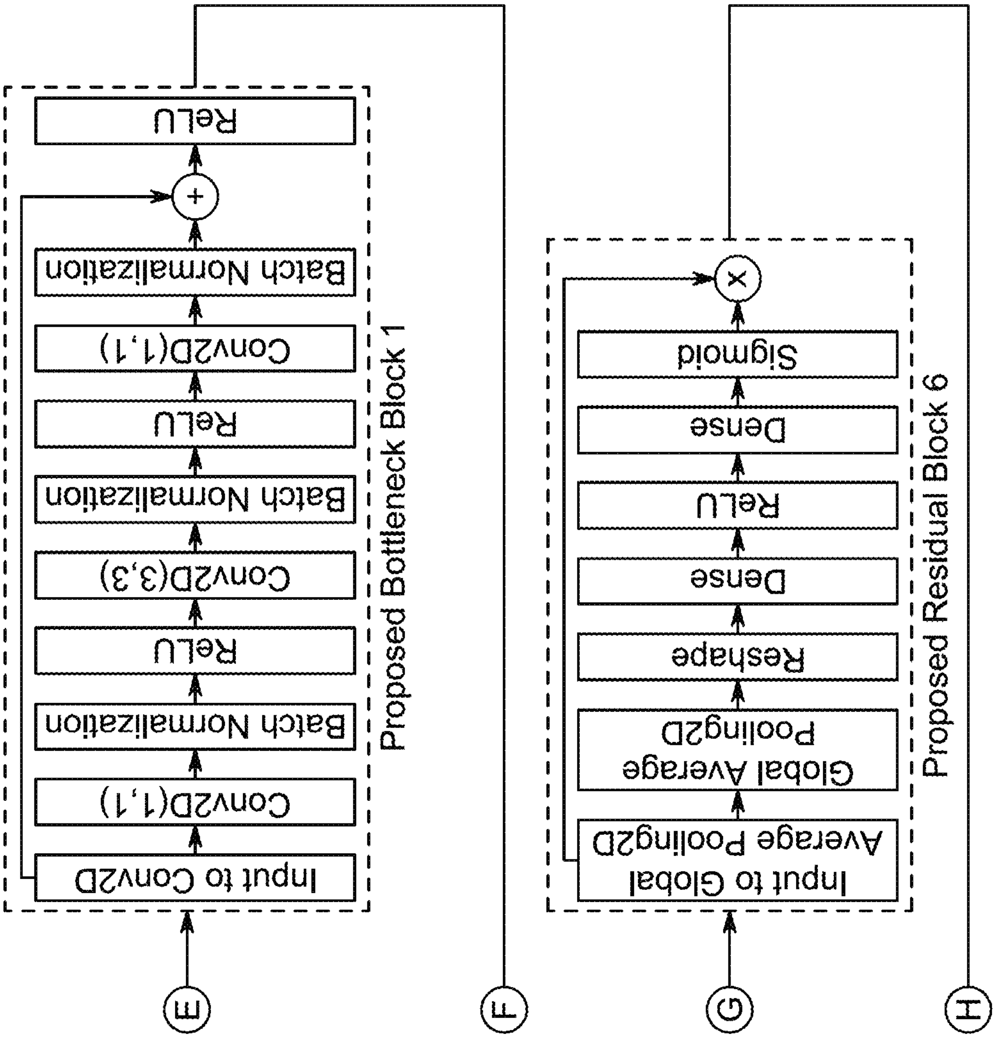
Figure 12:
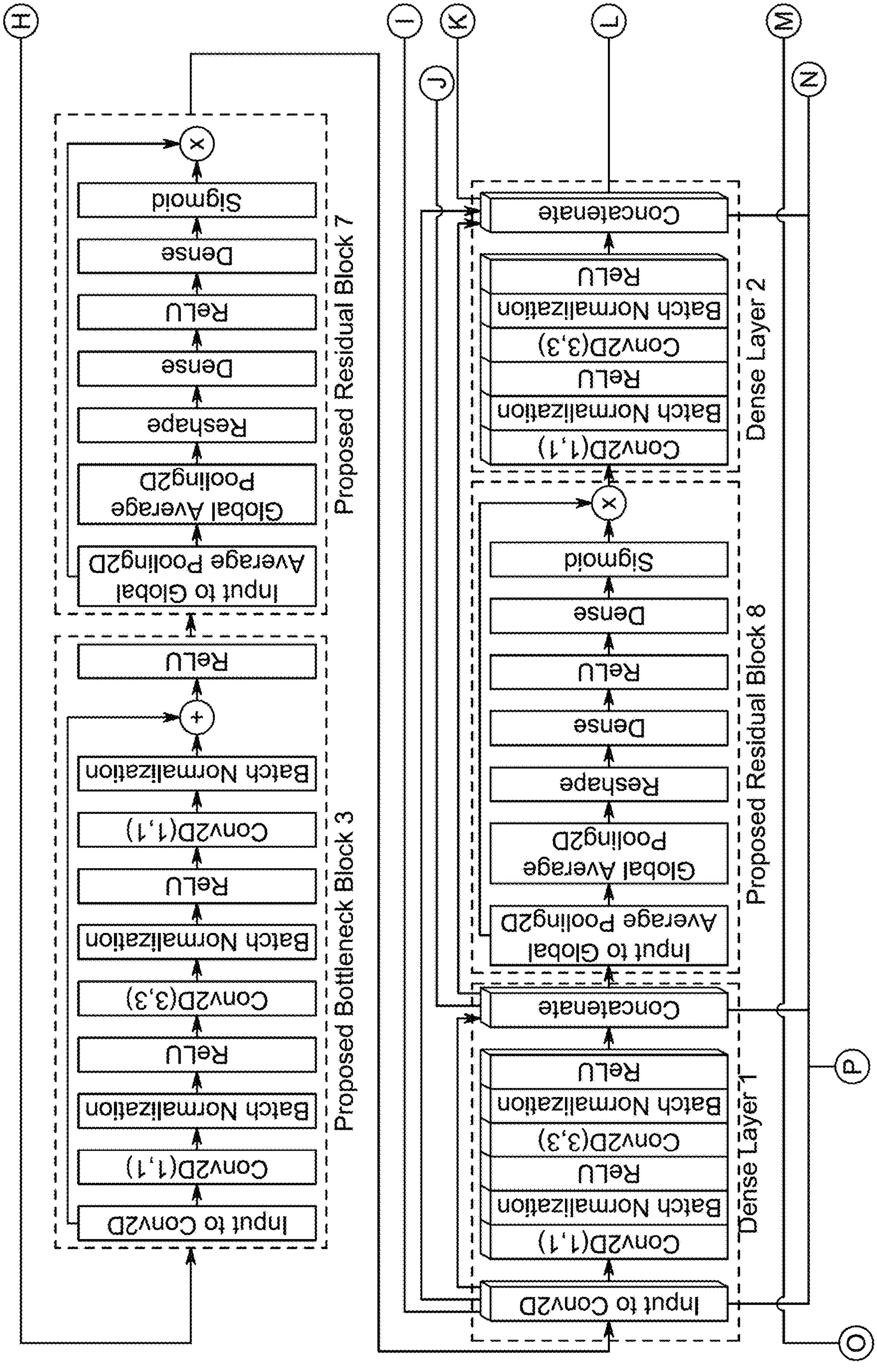
Figure 12:
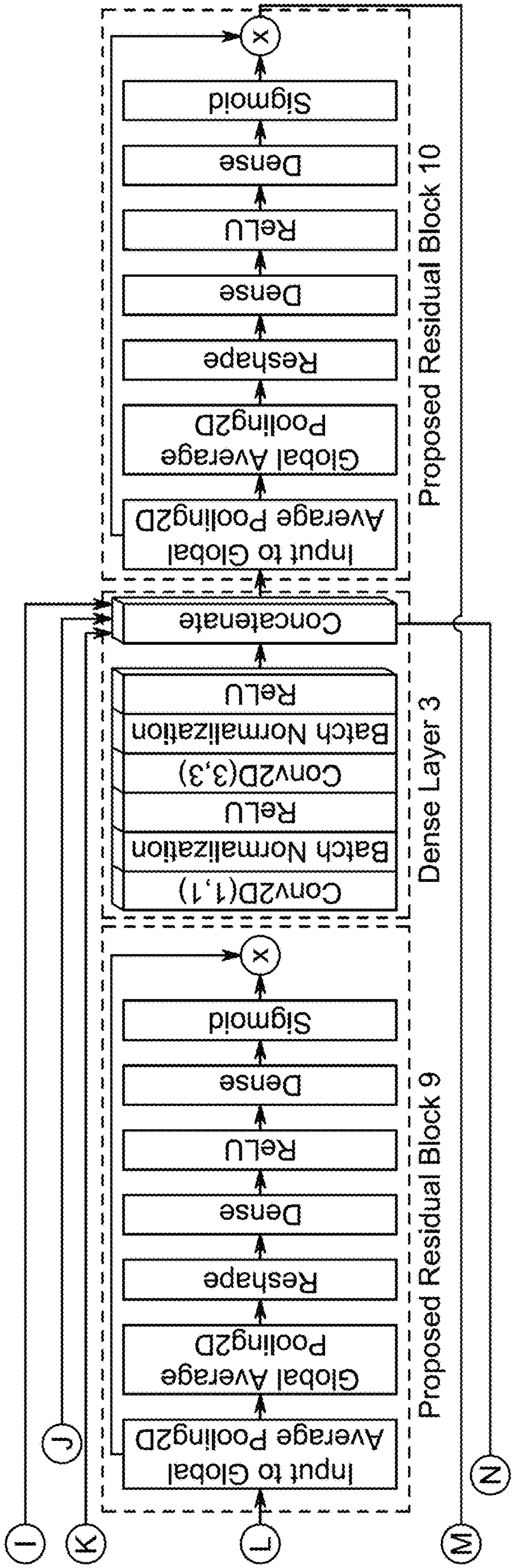
Figure 12:
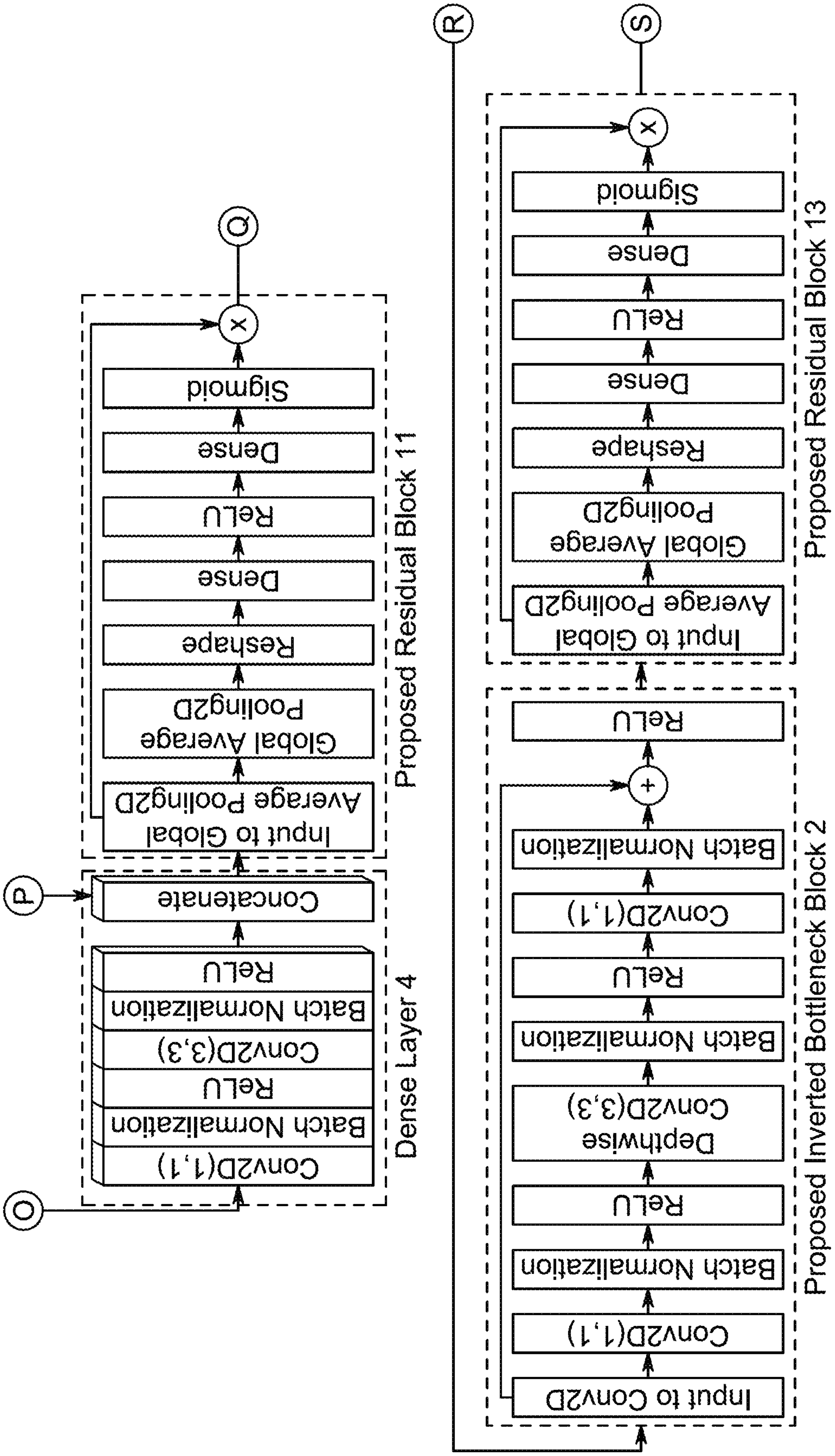
Figure 12:
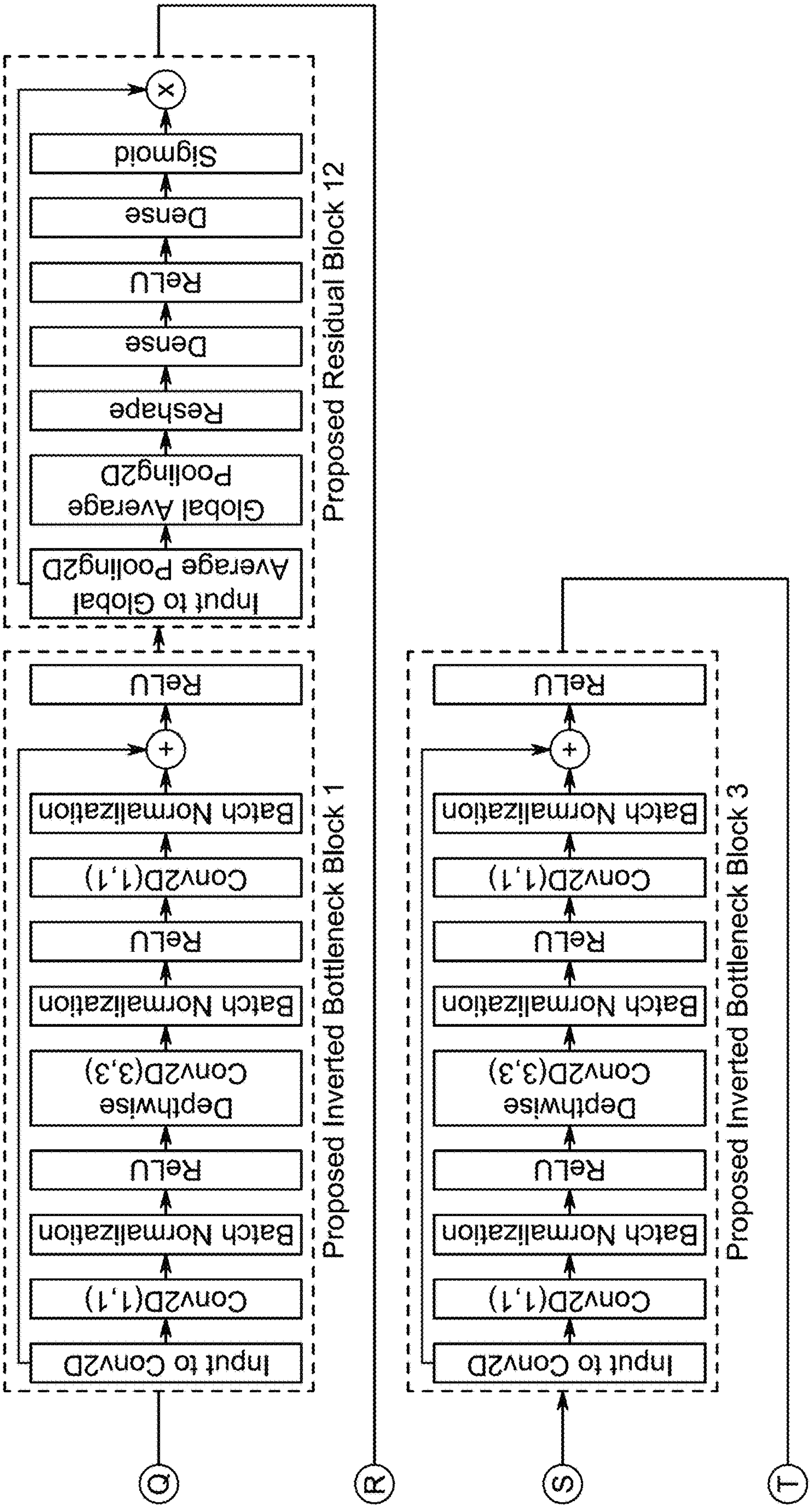
Figure 12:
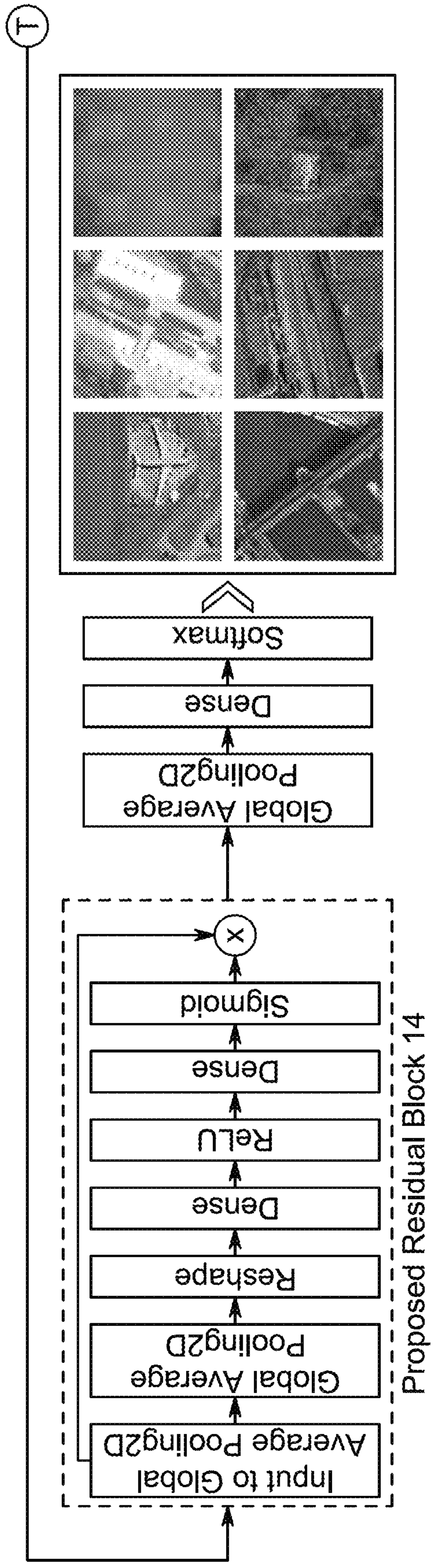
Figure 12:
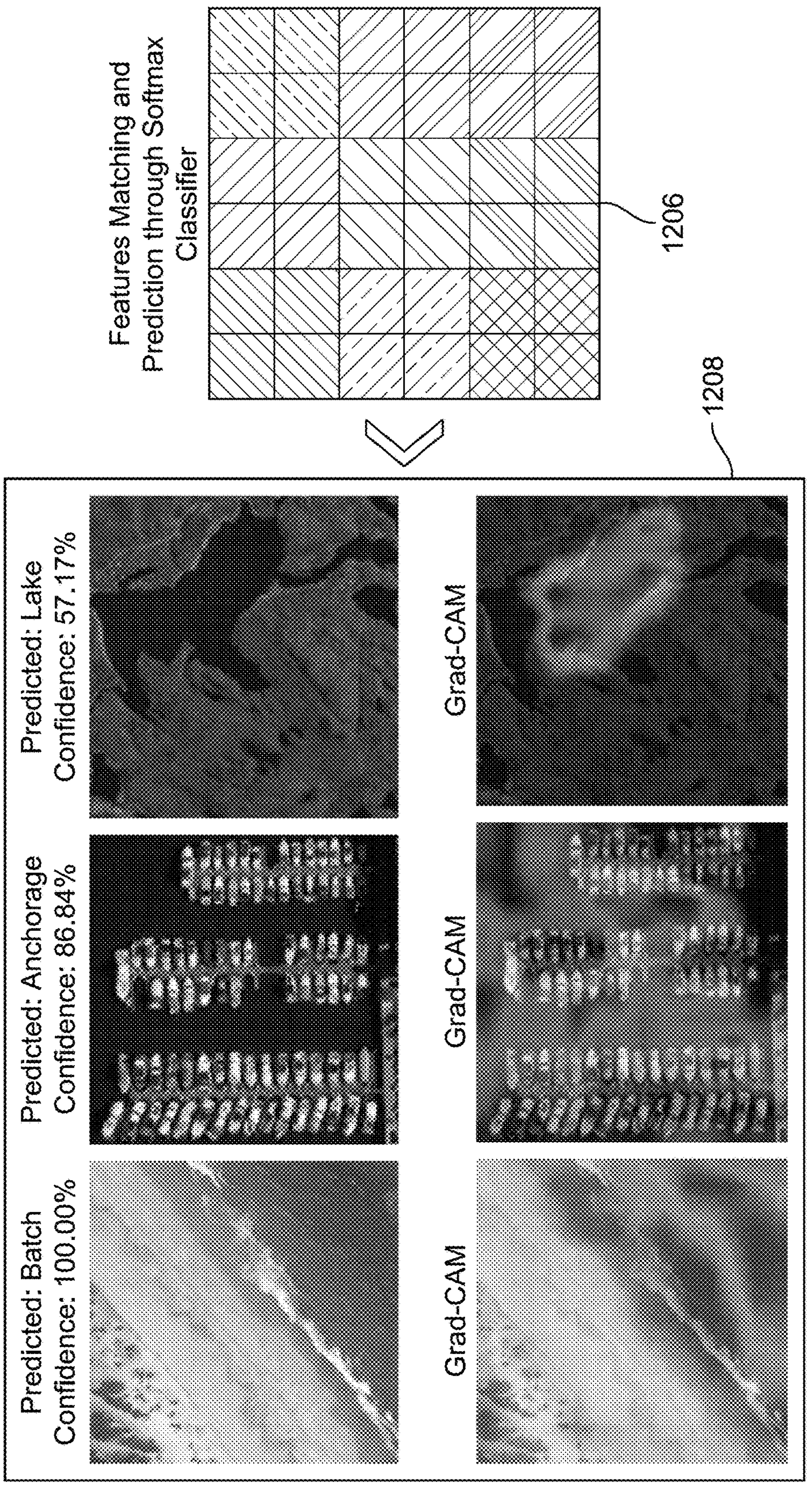

Referring now to FIG. 12, the present disclosure provides a detailed depiction of the training and testing workflow for the SEMSF-Net architecture. In the training of the disclosed model on the selected datasets, three datasets are used and, accordingly, three different models are obtained in the output. In the training process of the SEMSF-Net architecture, several hyperparameters are opted based on random search and different experiments, and the best hyperparameters that are selected in this work are based on the obtained training accuracy. Table I presents the selected hyperparameters of this work. The categorical cross-entropy is used as the loss function for training, whereas seventy percent of the data from each dataset are used for the training.

TABLE I

Hyperparameters Selected by Various Experiments of the Disclosed Architecture

| Hyperparameters | Values |
|---|---|
| Epochs | 25 |
| Learning Rate | 0.001 |
| Optimizer | Adam |
| Mini Batch Size | 32 |
| Dropout | 0.5 |
| Momentum | 0.688 |

The testing process of the disclosed architecture is also illustrated in FIG. 12. In the testing phase, the testing image set of the selected datasets is passed to the trained model which outputs the classification result. Moreover, the trained models are visually tested through an explainable AI technique referred to as Grad-CAM. FIG. 12 visually illustrates the testing process and shows that the test image is passed to the trained model, where features are extracted and matched for the final prediction.

The experimental setup used to obtain these results is summarized as follows. Three publicly available datasets are utilized for the experimental process of a classification challenge, with the datasets above. Each dataset is split into a ratio of 70:30, from which seventy percent of the data are used for training purposes and the remaining thirty percent for testing purposes. Through detailed ablation studies, Adam is selected as an optimizer with a learning rate of 0.001. The number of epochs is twenty-five and the batch size is thirty-two, which are also selected through detailed ablation studies. During the testing phase, a SoftMax classifier is used for classification, and Grad-CAM is implemented for model interpretability and transparency. Accuracy, precision, recall, and F1-score are used as evaluation metrics. The experiments are conducted using the Python programming language with the TensorFlow/Keras framework. The simulation environment includes a computer workstation with twenty-four gigabytes of RAM and a twelve-gigabyte NVIDIA Graphics Card RTX 4090.

In certain embodiments, experiments have been conducted to validate the systems described through FIG. 3 to FIG. 11. The results are presented separately for each dataset, and the detailed discussion and ablation studies are provided in the following.

Table II presents an obtained average accuracy of 93.07% on this dataset. Moreover, a precision rate of 0.9381 emphasizes that the approach minimizes false positives to the maximum extent. The model recall rate is 0.9275, indicating that the model captures the most relevant positive cases. An F1-score of 0.9321 reflects a robust balance between precision and recall. Taken together, these metrics highlight the model's robust performance and show that it delivers precise and reliable predictions over the MLRSNET dataset.

Table II shows the classwise performance metrics for the MLRSNet dataset, demonstrating the model's effectiveness in classifying RS images across different categories. High precision, recall, and F1-scores are observed for most classes, such as airplane, beach, cloud, and dense residential area, which indicates that the model correctly predicts these categories with fewer errors. However, some classes, such as railway stations, overpasses, and parks, tend to have relatively lower F1-scores due to interclass similarities or fewer discriminative features for such classes. Macro average scores (94% precision, 93% recall, and 93% F1 score) confirm that the model is balanced across all classes, while micro average and weighted average metrics show excellent overall accuracy on this dataset. Although the model faces some challenges in a subset of confusing categories, the overall results remain strong.

TABLE II

Classification Results of the MLRSNet Dataset Using the Disclosed Architecture

| Class | Precision (%) | Recall (%) | F1 Score (%) | Support |
|---|---|---|---|---|
| Airplane | 97 | 97 | 97 | 503 |
| Airport | 92 | 88 | 90 | 673 |
| Bareland | 88 | 95 | 92 | 463 |
| baseball_diamond | 97 | 99 | 98 | 617 |
| basketball_court | 87 | 92 | 89 | 910 |
| Beach | 99 | 98 | 98 | 780 |
| Bridge | 89 | 94 | 92 | 711 |
| Chaparral | 97 | 97 | 97 | 771 |
| Cloud | 98 | 99 | 99 | 536 |
| commercial_area | 92 | 91 | 92 | 725 |
| dense_residential_area | 96 | 98 | 97 | 867 |
| Desert | 97 | 97 | 97 | 763 |
| eroded_farmland | 89 | 87 | 88 | 726 |
| Farmland | 94 | 95 | 94 | 746 |
| Forest | 94 | 95 | 95 | 731 |
| Freeway | 96 | 94 | 95 | 753 |
| golf_course | 95 | 97 | 96 | 780 |
| ground_track_field | 96 | 91 | 94 | 754 |
| harbor_port | 97 | 96 | 97 | 766 |
| industrial area | 98 | 88 | 93 | 699 |
| Intersection | 95 | 91 | 93 | 733 |
| Island | 98 | 98 | 98 | 717 |
| Lake | 97 | 97 | 97 | 743 |
| Meadow | 97 | 82 | 89 | 773 |
| mobile_home_park | 97 | 98 | 97 | 753 |
| Mountain | 91 | 85 | 88 | 741 |
| Overpass | 81 | 89 | 85 | 769 |
| Park | 90 | 76 | 82 | 509 |
| parking_lot | 96 | 98 | 97 | 726 |
| parkway | 90 | 93 | 92 | 742 |
| railway | 84 | 77 | 81 | 743 |

TABLE II-continued

Classification Results of the MLRSNet Dataset Using the Disclosed Architecture

| Class | Precision (%) | Recall (%) | F1 Score (%) | Support |
|---|---|---|---|---|
| railway_station | 74 | 79 | 76 | 653 |
| river | 92 | 93 | 93 | 769 |
| roundabout | 92 | 85 | 89 | 599 |
| shipping_yard | 99 | 99 | 99 | 760 |
| snowberg | 94 | 97 | 96 | 768 |
| sparse_residential_area | 93 | 95 | 94 | 544 |
| stadium | 93 | 90 | 91 | 701 |
| storage_tank | 95 | 96 | 96 | 745 |
| swimming_pool | 99 | 100 | 99 | 591 |
| tennis_court | 92 | 92 | 92 | 759 |
| terrace | 95 | 91 | 93 | 732 |
| transmission_tower | 98 | 93 | 96 | 752 |
| vegetable_greenhouse | 98 | 97 | 98 | 773 |
| wetland | 95 | 81 | 87 | 758 |
| wind_turbine | 99 | 100 | 99 | 609 |
| — | — | — | — | — |
| micro average | 94% | 93% | 93% | 32736 |
| macro average | 94% | 93% | 93% | 32736 |
| weighted average | 94% | 93% | 93% | 32736 |
| samples average | 93% | 93% | 93% | 32736 |

Figure 13:
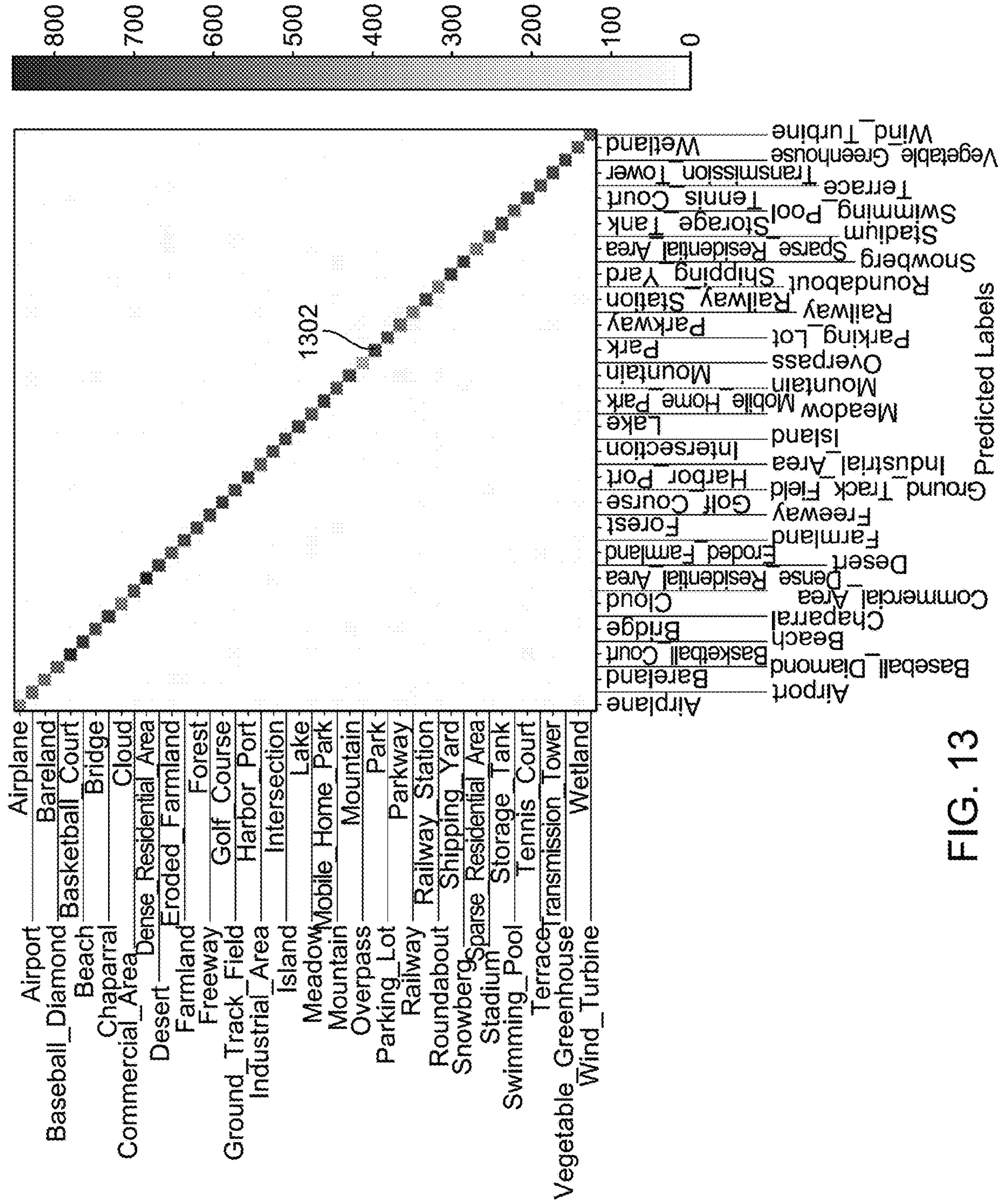
FIG. 13 illustrates an exemplary confusion matrix of the MLRSNet dataset using the architecture, according to certain embodiments.

Referring now to FIG. 13, the present disclosure provides an illustration of a confusion matrix 1302 of the MLRSNet dataset using the disclosed architecture. The confusion matrix visually depicts the model's classification performance across all classes. It shows strong diagonal dominance, meaning that most categories are predicted accurately. Misclassifications are sparse, showing that the model can effectively handle diverse RS categories with minimal confusion between similar classes.

Figure 14A:
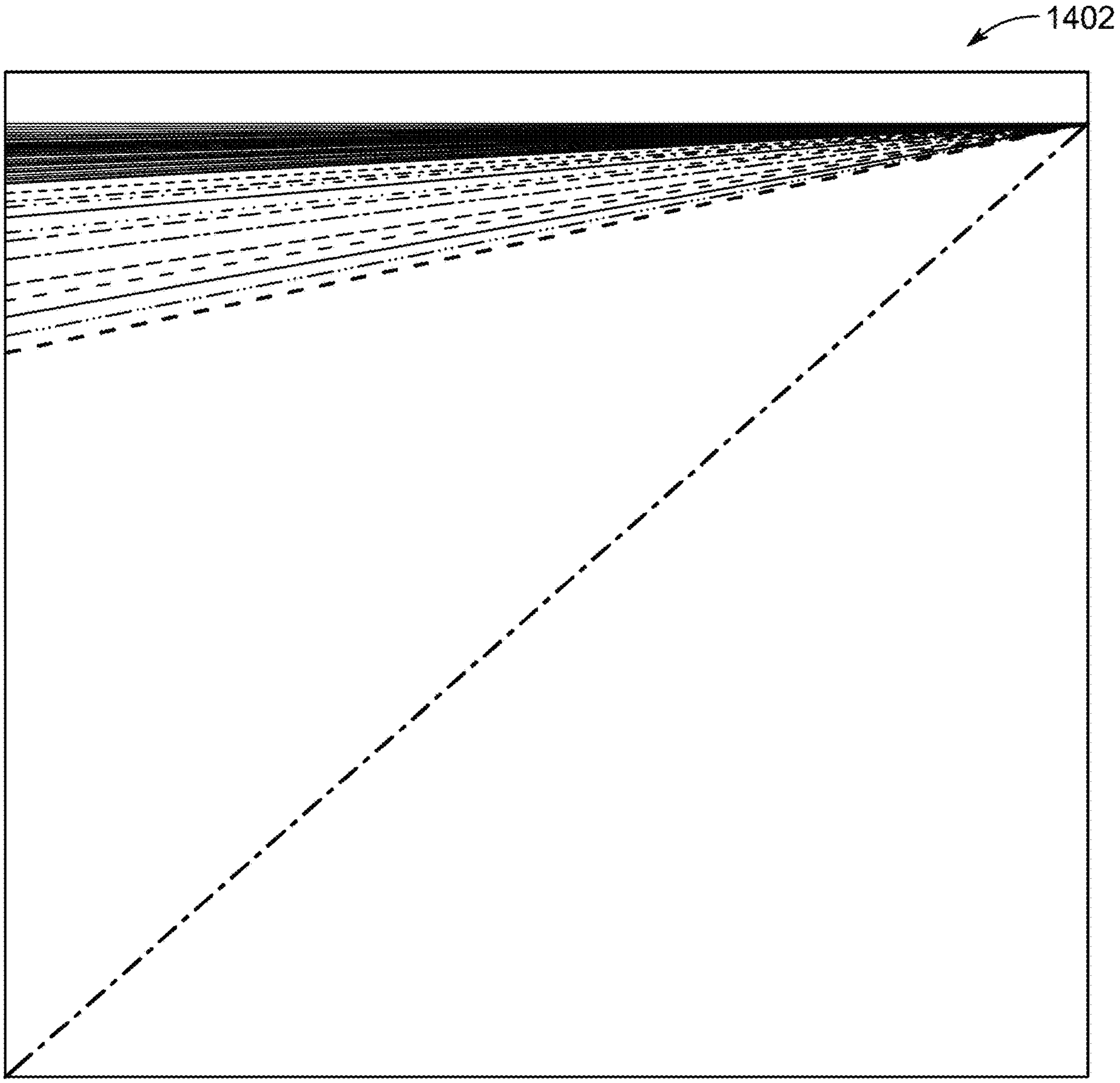
FIG. 14A illustrates exemplary receiver-operating-characteristic curves of the MLRSNet dataset using the disclosed architecture, according to certain embodiments.
Figure 14B:
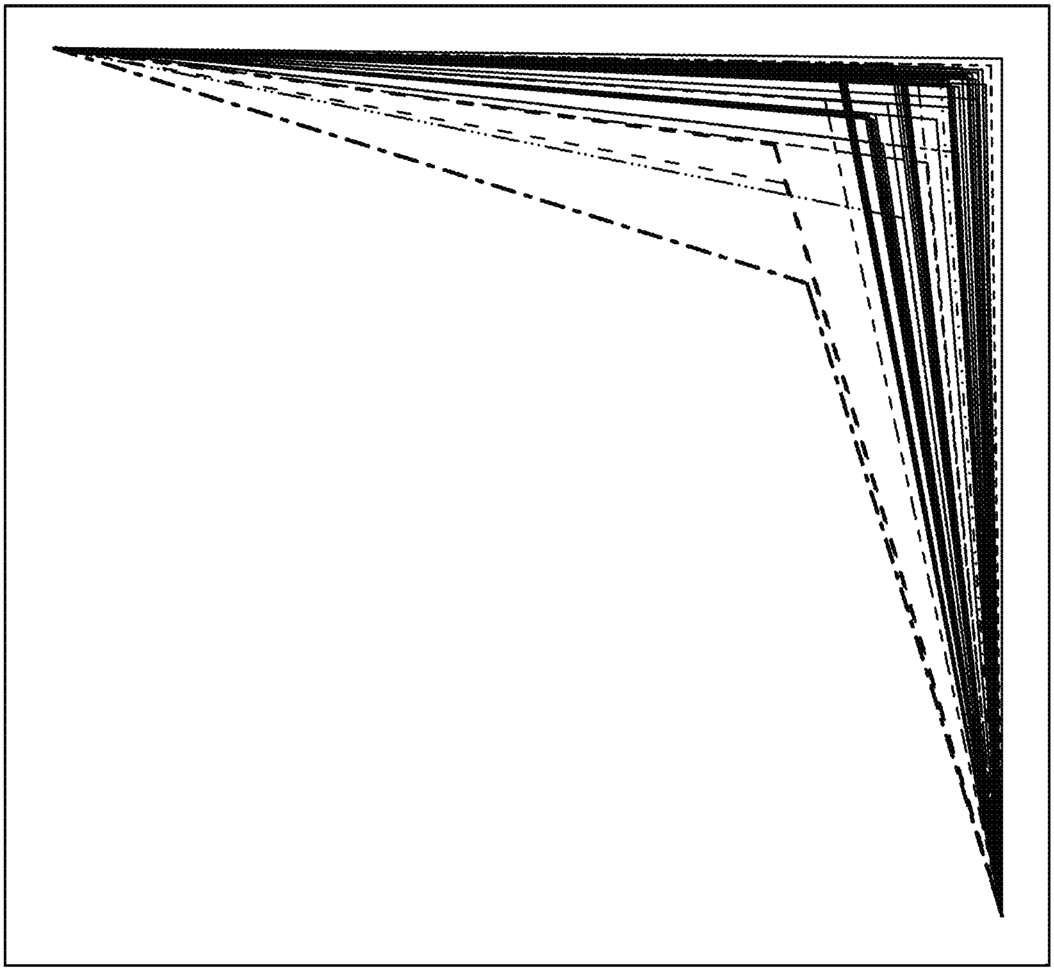
FIG. 14B illustrates an exemplary precision-recall curve set of the MLRSNet dataset using the disclosed architecture, according to certain embodiments.

Referring now to FIGS. 14A and 14B, the present disclosure provides receiver-operating-characteristic (ROC) curves 1402 and precision-recall curves 1404 of the MLRSNet dataset obtained by the disclosed architecture. The left ROC curve depicts the tradeoff between the true and false positive rates at different thresholds, with curves closer to the top-left indicating better performance. The precision-recall curve emphasizes the relationship between precision and recall, which is useful for imbalanced datasets, where curves closer to the top-right indicate superior performance. In this figure, all the classes are plotted based on their precision and recall values. Bold denotes the most highest accuracy.

For the in-depth analysis of the disclosed model for this dataset, ablation studies are performed. These ablation studies systematically evaluate the effect of several hyperparameters, including epochs, optimizers, batch size, and learning rate, on model accuracy. All the results of this ablation study are noted in Table III. This table shows that 25 epochs consistently produce the highest accuracy of 93%, thus being a preferred number of epochs for convergence. In the case of optimizers, ADAM performed best, making high accuracy across configurations, whereas other alternatives, such as SGDM, POP, and NADAM, did not significantly contribute to achieving high accuracy. For batch size, the highest is the 32 instances that facilitate multiple repetitions with high accuracy, and more than that, such as 64 and 128, cause underperformance. For a learning rate, the rate of 0.001 facilitates the best, with 93% of best accuracy, whereas a tremendous rate (0.1) and minimal rates (0.0001) bring suboptimal performance. This study shows that fine-tuning hyperparameters enhance performance, and it is essential to balance factors like training iterations, choices of optimization algorithms, and data batch handling to achieve robust model results.

TABLE III

Ablation Study 1 on the MLRSNet Dataset for the Evaluation of the Disclosed DL Model

| | | | | | | | | | | | | | | | | |
|---|---|---|---|---|---|---|---|---|---|---|---|---|---|---|---|---|
| **Epochs** | | | | | | | | | | | | | | | | |
| 10 | ✓ | | | | | | | | | | | | | | | |
| 15 | | ✓ | | | | | | | | | | | | | | |
| 20 | | | ✓ | | | | | | | | | | | | | |
| 25 | | | | ✓ | ✓ | ✓ | ✓ | ✓ | ✓ | ✓ | ✓ | ✓ | ✓ | ✓ | ✓ | ✓ |
| **Optimizers** | | | | | | | | | | | | | | | | |
| ADAM | ✓ | ✓ | ✓ | ✓ | ✓ | | | | ✓ | ✓ | ✓ | ✓ | ✓ | ✓ | ✓ | ✓ |
| SGDM | | | | | | ✓ | | | | | | | | | | |
| POP | | | | | | | ✓ | | | | | | | | | |
| NADAM | | | | | | | | ✓ | | | | | | | | |
| **Batch Size** | | | | | | | | | | | | | | | | |
| 16 | | | | | | | | | ✓ | | | | | | | |
| 32 | ✓ | ✓ | ✓ | ✓ | ✓ | ✓ | ✓ | ✓ | | ✓ | | | ✓ | ✓ | ✓ | ✓ |
| 64 | | | | | | | | | | | ✓ | | | | | |
| 128 | | | | | | | | | | | | ✓ | | | | |
| **Learning Rate** | | | | | | | | | | | | | | | | |
| 0.1 | | | | | | | | | | | | | ✓ | | | |
| 0.01 | | | | | | | | | | | | | | ✓ | | |
| 0.001 | ✓ | ✓ | ✓ | ✓ | ✓ | ✓ | ✓ | ✓ | ✓ | ✓ | ✓ | ✓ | | | ✓ | |
| 0.0001 | | | | | | | | | | | | | | | | |
| Accuracy | 88 | 89 | 91 | 93 | 80 | 90 | 90 | 93 | 89 | 93 | 87 | 89 | 67 | 87 | 93 | 89 |

In the second ablation study, the baseline model's performance is compared with and without including the SE module across four metrics: accuracy, precision, recall, and F1-score, and the results are provided in Table IV. The baseline model achieves an accuracy of 92.74%, precision of 93.51%, recall of 92.27%, and F1-score of 92.85%. Adding the SE module improves every metric by a small extent, and accuracy increases to 93.07%, precision up to 93.81%, and recall up to 92.75% while increasing the F1-score to 93.21%. These indicate that the SE module improves the model's capability to target relevant features, contributing to marginal but consistent gain in all evaluation metrics. Moreover, the CNN architecture is compared with pretrained models, which shows that the model improves accuracy with the least parameter count and is the most efficient. The disclosed architecture achieves a maximum accuracy of 93.07% with a minimum number of parameters, i.e., 2.64 million parameters, as summarized in Table V.

TABLE IV

Ablation Study 2 for the MLRSNet Dataset to Analyze the Performance of Baseline Models

| Variants | Accuracy | Precision | Recall | F1-Score |
|---|---|---|---|---|
| Baseline | 92.74% | 93.51% | 92.27% | 92.85% |
| Baseline + SE | 93.07% | 93.81% | 92.75% | 93.21% |

TABLE V

Comparative Analysis With Pretrained Models for the MLRSNet Dataset

| Model Name | Accuracy | Parameters (Million) | Model size (MB) | Model Layers |
|---|---|---|---|---|
| Alexnet | 61.32 | 60 | 240 | 8 |
| VGG16 | 72.44 | 138 | 528 | 16 |
| VGG19 | 67.10 | 143.7 | 550 | 19 |

TABLE V-continued

Comparative Analysis With Pretrained Models for the MLRSNet Dataset

| Model Name | Accuracy | Parameters (Million) | Model size (MB) | Model Layers |
|---|---|---|---|---|
| GoogleNet | 84.36 | 6.8 | 27 | 22 |
| ResNet50 | 85.68 | 25.6 | 98 | 50 |
| ResNet101 | 86.05 | 44.5 | 170 | 101 |
| Disclosed | 93.07 | 2.64 | 10 | 211 |

Figure 15:
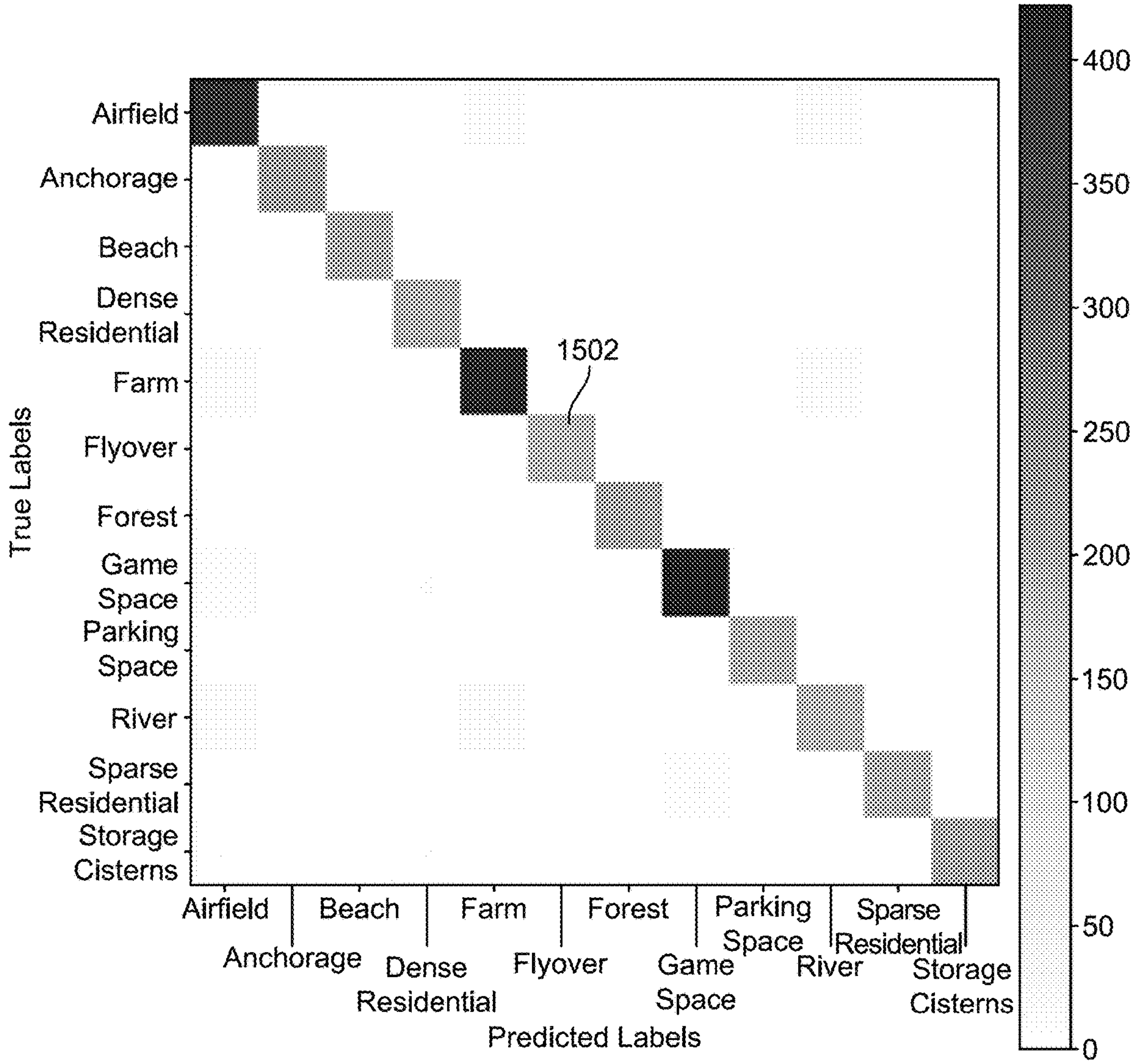
FIG. 15 illustrates an exemplary confusion matrix of the NWPU dataset using the disclosed architecture, according to certain embodiments.

Referring now to FIG. 15, the present disclosure provides a confusion matrix 1502 of the NWPU dataset using the CNN model. Table VI presents the results of the NWPU dataset that achieved overall improved performance of the model compared to all the key metrics of evaluation. The model has obtained an accuracy of 95.70%, expressing its ability to classify most cases with correctness. It has also achieved a precision of 96.04%, stating that the positive predictions are solidly reliable, and the recall of 95.41%, which portrays its efficiency in identifying those relevant instances. The F1-score of 95.72% confirms the balanced performance between precision and recall. These metrics highlight the model's robustness and reliability for classification tasks on the NWPU dataset. The classwise performance metrics that highlight the model's effectiveness across various classes are also computed in Table VI. The precision, recall, and F1-scores for most classes are remarkably high, while some classes, such as Anchorage and Storage Cisterns, perform with perfect precision at 100% and high F1-scores of 98% and 97%, respectively. Other classes, such as Beach, Forest, and Parking Space, have a remarkable balance in their metrics. On the other hand, the class River scored relatively less, with 90% precision, 89% recall, and 90% F1-score, which may denote difficulty with differentiating features for this particular class. A micro, macro, and weighted average value of 96% could be found for precision, recall, and F1-score, denoting consistency across all classes. The confusion matrix shows a strong diagonal, which signifies that the model's prediction is quite accurate for most classes. There are off-diagonal cells representing minor misclassifications, and such occurrences are noticeable for classes similar to "River." In summary, the confusion matrix further ascertains that the model is accurate with strong robustness performance on the diversified categories.

TABLE VI

Classification Results of the NWPU Dataset Using the Disclosed Architecture

| Class | Precision (%) | Recall (%) | F1-Score (%) | Support |
|---|---|---|---|---|
| Airfield | 94 | 92 | 93 | 422 |
| Anchorage | 100 | 97 | 98 | 224 |
| Beach | 97 | 99 | 98 | 202 |
| Dense Residential | 94 | 99 | 96 | 194 |
| Farm | 96 | 96 | 96 | 428 |
| Flyover | 95 | 98 | 97 | 189 |
| Forest | 98 | 99 | 98 | 207 |
| Game Space | 97 | 96 | 96 | 440 |
| Parking Space | 97 | 96 | 97 | 195 |
| River | 90 | 89 | 90 | 207 |
| Sparse Residential | 98 | 93 | 95 | 210 |
| Storage Cisterns | 100 | 94 | 97 | 218 |
| — | — | — | — | — |
| Micro Avg | 96% | 95% | 96% | 3136 |
| Macro Avg | 96% | 96% | 96% | 3136 |
| Weighted Avg | 96% | 95% | 96% | 3136 |
| Samples Avg | 95% | 95% | 95% | 3136 |

Figure 16A:
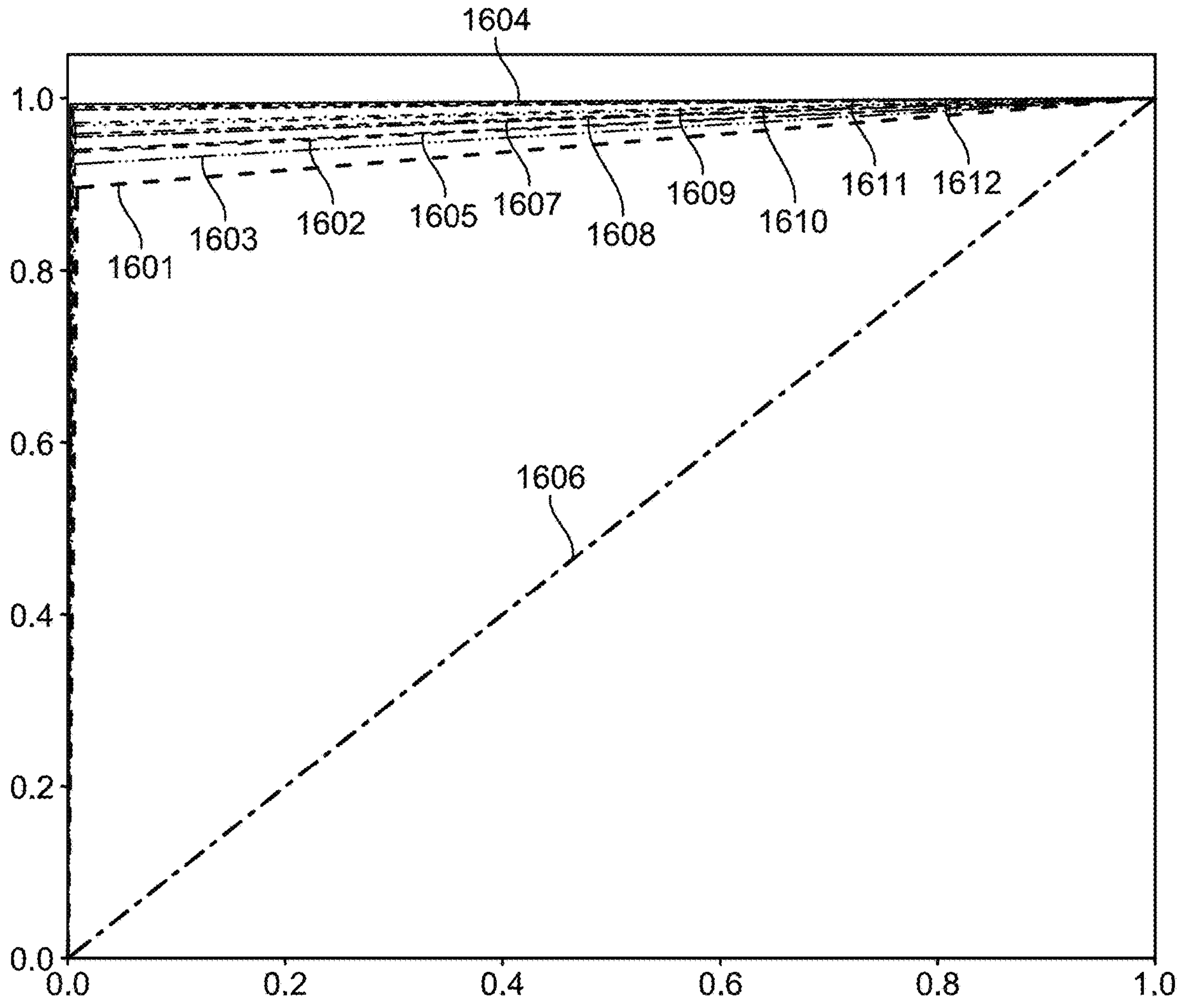
FIG. 16A illustrates exemplary receiver-operating-characteristic curves of the NWPU dataset, according to certain embodiments.
Figure 16B:
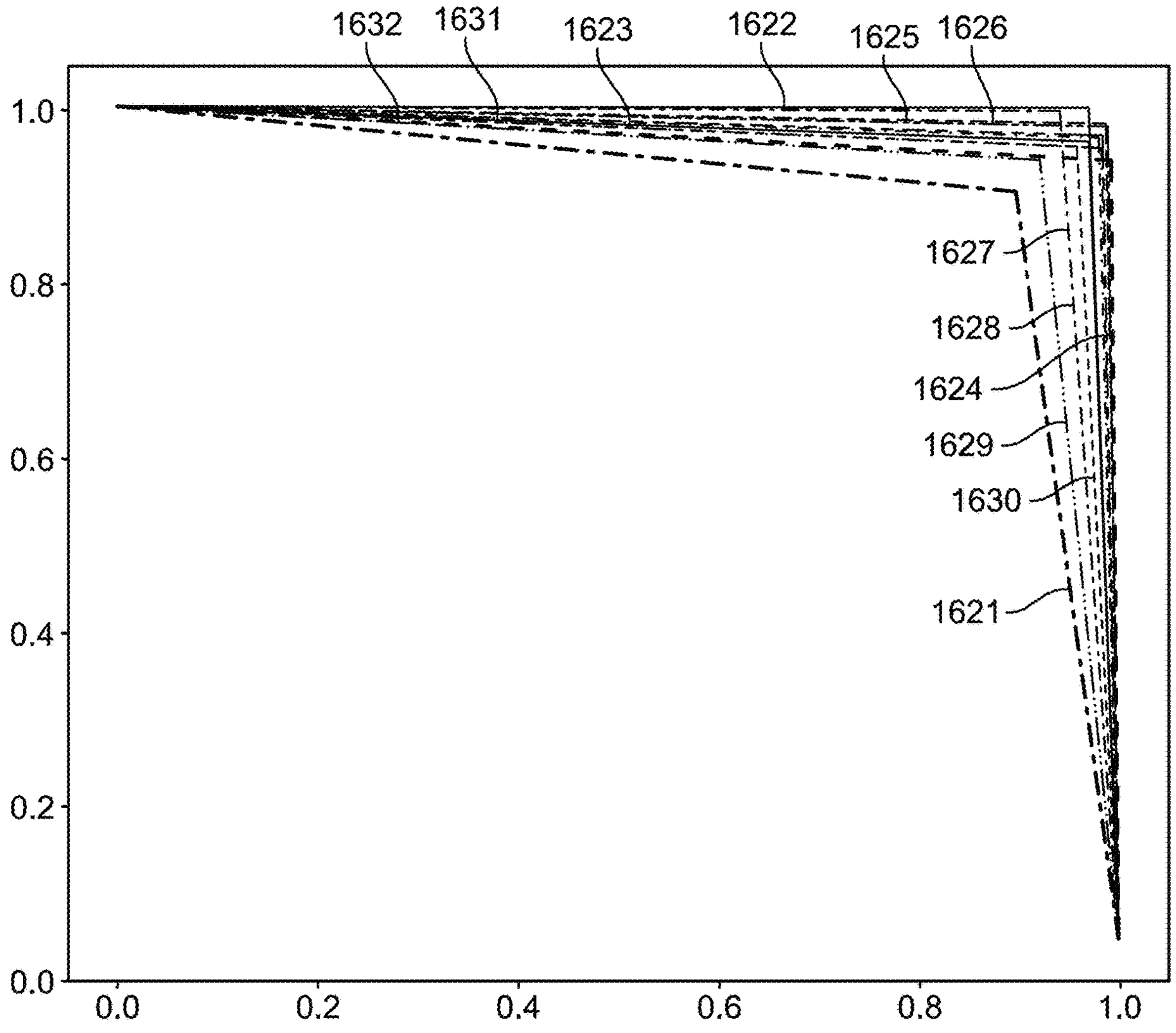
FIG. 16B illustrates an exemplary precision-recall curve set of the NWPU dataset, according to certain embodiments.

Referring now to FIGS. 16A and 16B, receiver-operating characteristic (ROC) and precision-recall (PR) curves are presented for the multiclass classification performance of the disclosed architecture on the NWPU dataset. The ROC visualization in FIG. 16A depicts the tradeoff between the true positive rate and the false positive rate at different score thresholds, with curves that are closer to the top-left indicating better performance. As observed, the area-under-the-curve (AUC) values are all high and close to 1 for all classes, which means that true positive rates are excellent, while false positive rates are low across the classes. To further analyze the performance under class imbalance settings, FIG. 16B emphasizes the relationship between precision and recall. In the PR plot, curves that are closer to the upper-right region indicate superior performance. In this figure, all the classes are plotted based on their precision and recall values, and the steep curves near the upper-right region illustrate relatively high precision and recall, demonstrating that most classes show good performances. These metrics confirm a strong discriminative ability for the model with good reliability in both balanced and imbalanced scenarios.

For in-depth evaluation on the NWPU dataset, ablation studies and comparisons with pretrained models were conducted and are summarized in the specification's tables. In a first study (Table VII), the effect of several hyperparameters, epochs, optimizers, batch size, and learning rate, on accuracy is systematically evaluated. The accuracy values depict the impact of those configurations on the model's effectiveness. The performance improves by increasing the epochs (from 20 to 80), with a highest consistent result at 80 epochs. Among optimizers, ADAM consistently shows robustness across configurations, while others, such as SGDM, POP, and NADAM, contribute moderately. Batch size variations indicate that 32 achieves the best performance, although results can be competitive with sizes of 16 and 64. The choice of learning rates presents 0.001 as a stable and efficient rate since it achieves high accuracy in most settings; on the other hand, others, such as 0.1 and 0.0001, present high variability. This analysis highlights the role of hyperparameter tuning, which should be used to achieve an optimal model configuration with 95% accuracy.

TABLE VII

Ablation Study 1 on the NWPU Dataset for the Evaluation of the Disclosed DL Model

| | | | | | | | | | | | | | | | | |
|---|---|---|---|---|---|---|---|---|---|---|---|---|---|---|---|---|
| **Epochs** | | | | | | | | | | | | | | | | |
| 20 | ✓ | | | | | | | | | | | | | | | |
| 40 | | ✓ | | | | | | | | | | | | | | |
| 60 | | | ✓ | | | | | | | | | | | | | |
| 80 | | | | ✓ | ✓ | ✓ | ✓ | ✓ | ✓ | ✓ | ✓ | ✓ | ✓ | ✓ | ✓ | ✓ |
| **Optimizers** | | | | | | | | | | | | | | | | |
| ADAM | ✓ | ✓ | ✓ | ✓ | ✓ | | | | ✓ | ✓ | ✓ | ✓ | ✓ | ✓ | ✓ | ✓ |
| SGDM | | | | | | ✓ | | | | | | | | | | |
| POP | | | | | | | ✓ | | | | | | | | | |
| NADAM | | | | | | | | ✓ | | | | | | | | |
| **Batch Size** | | | | | | | | | | | | | | | | |
| 16 | | | | | | | | | | | | | | | | |
| 32 | ✓ | ✓ | ✓ | ✓ | ✓ | ✓ | ✓ | ✓ | | ✓ | | | ✓ | ✓ | ✓ | ✓ |
| 64 | | | | | | | | | | | ✓ | | | | | |
| 128 | | | | | | | | | | | | ✓ | | | | |
| **Learning Rate** | | | | | | | | | | | | | | | | |
| 0.1 | | | | | | | | | | | | | ✓ | | | |
| 0.01 | | | | | | | | | | | | | | ✓ | | |
| 0.001 | ✓ | ✓ | ✓ | ✓ | ✓ | ✓ | ✓ | ✓ | ✓ | ✓ | ✓ | ✓ | | | ✓ | |
| 0.0001 | | | | | | | | | | | | | | | | ✓ |
| Accuracy | 92 | 91 | 93 | 95 | 92 | 91 | 93 | 95 | 93 | 95 | 91 | 94 | 93 | 92 | 95 | 92 |

In a second study (Table VIII), the baseline level is compared with the addition of squeeze-excitation (SE) blocks. The baseline model resulted in an accuracy of 94.96%, a precision rate of 95.33%, a recall rate of 94.67%, and an F1-score of 94.97%. The addition of the SE block further improved all the metrics, yielding an accuracy of 95.70%, a precision rate of 96.04%, a recall rate of 95.41%, and an F1-score value of 95.72%. This result shows that SE blocks improve feature representation and enhance the model's overall performance in classification tasks. Finally, a comparative analysis with standard pretrained models (Table IX) indicates that the disclosed model attains the highest accuracy of 95.70% while having only 2.64 million parameters, making it the most accurate and lightweight compared to benchmarked architectures. This highlights an exceptional balance between performance and computational efficiency, making it a practical choice for deployment in real-world applications, especially in environments with limited computational resources.

TABLE VIII

Ablation Study 2 for NWPU Dataset, Where Base Models are Compared

| Model | Accuracy (%) | Precision (%) | Recall (%) | F1-Score (%) |
|---|---|---|---|---|
| Baseline | 94.96 | 95.33 | 94.67 | 94.97 |
| Baseline + SE | 95.70 | 96.04 | 95.41 | 95.72 |

TABLE IX

Comparative Analysis with Pretrained Models for the NWPU Dataset

| Model Name | Accuracy | Parameters (Million) | Model size (MB) | Model Layers |
|---|---|---|---|---|
| Alexnet | 84.66 | 60 | 240 | 8 |
| VGG16 | 86.25 | 138 | 528 | 16 |
| VGG19 | 85.92 | 143.7 | 550 | 19 |
| GoogleNet | 83.41 | 6.8 | 27 | 22 |
| ResNet50 | 90.14 | 25.6 | 98 | 50 |
| ResNet101 | 91.78 | 44.5 | 170 | 101 |
| Disclosed | 95.70 | 2.64 | 10 | 211 |

Figure 17:
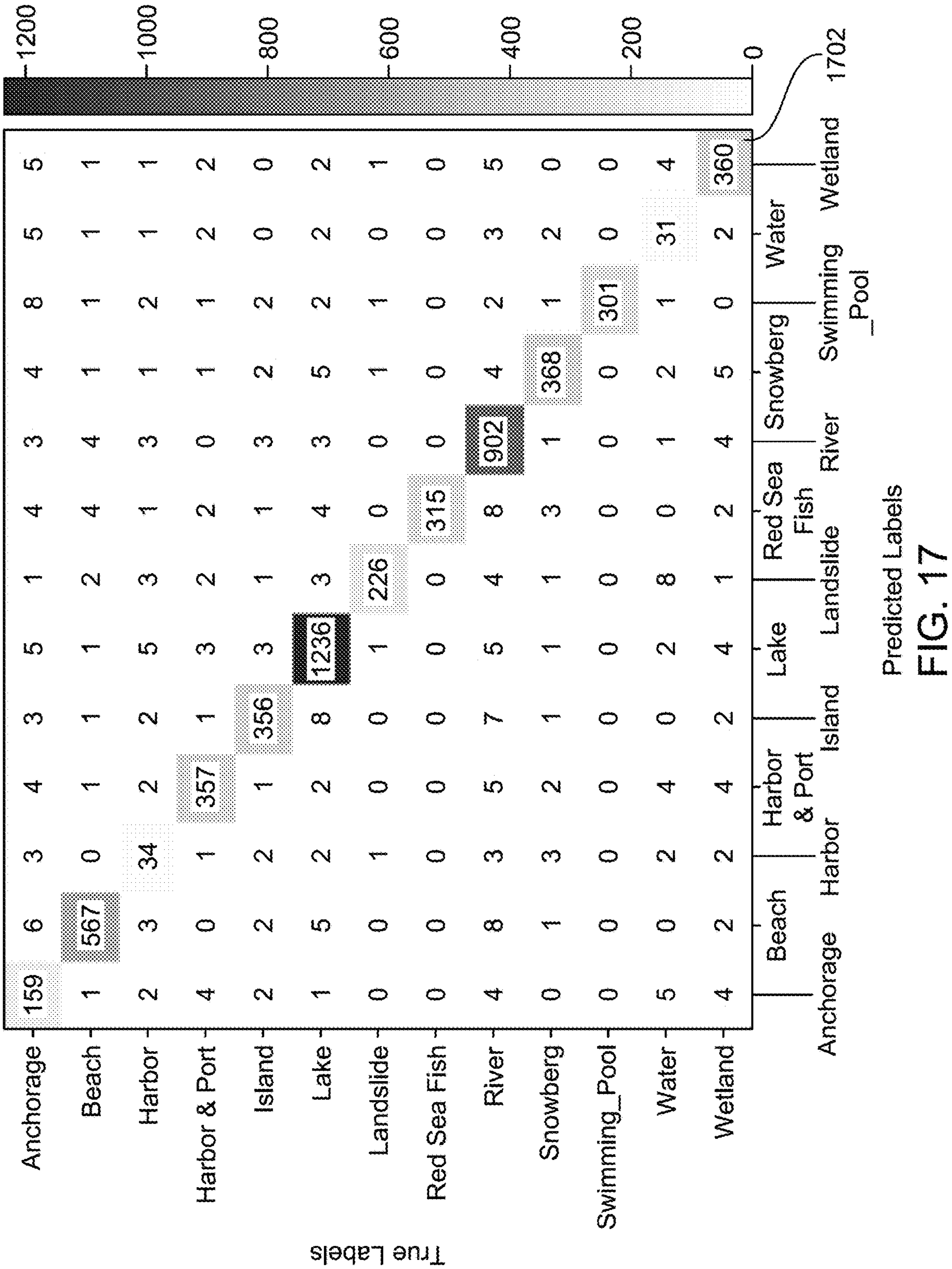
FIG. 17 illustrates an exemplary confusion matrix of the Coastal dataset using the disclosed architecture, according to certain embodiments.

FIG. 17 illustrates a confusion matrix for the Coastal dataset using the disclosed architecture. The matrix visualizes the model's classification performance across all classes and shows each class's improved correct prediction rate. Overall performance on this dataset is summarized as follows: the disclosed model obtained 94.94% accuracy; the precision rate is 95.36; the recall rate is 94.81; and the F1-score value is 94.94%. Classwise results are provided in Table X and indicate that the precision rates of Anchorage, Harbor, and Water are 0.76, 0.58, and 0.53, respectively, which are not good compared to other classes presented in this dataset. This dataset's micro average precision rate is 0.95, the macro average precision rate is 0.81, the weighted average precision rate is 0.95, and the sample average value is 0.95. Similarly, the micro average recall rate is 0.95, the macro average recall rate is 0.79, and the weighted average recall rate is 0.95. Overall, it is observed that the recall rate and precision rates are above 90% for this dataset using the disclosed architecture.

TABLE X

Classification Results of the Coastal Dataset Using the Disclosed Architecture

| Class | Precision | Recall | F1Score | Support |
|---|---|---|---|---|
| Anchorage | 0.76 | 0.93 | 0.84 | 210 |
| Beach | 0.97 | 0.97 | 0.97 | 585 |
| Harbor | 0.58 | 0.47 | 0.52 | 60 |
| Harbor & port | 0.95 | 0.74 | 0.83 | 376 |
| Island | 0.95 | 0.99 | 0.97 | 375 |
| Lake | 0.97 | 0.99 | 0.98 | 1275 |
| Landslide | 0.98 | 0.90 | 0.94 | 231 |
| Red Sea Fish | 1.00 | 1.00 | 1.00 | 315 |
| River | 0.94 | 0.95 | 0.95 | 960 |
| Snowberg | 0.96 | 0.98 | 0.97 | 384 |
| Swimmimg_pool | 1.00 | 0.98 | 0.99 | 301 |
| Water | 0.53 | 0.42 | 0.47 | 60 |
| Wetland | 0.92 | 0.89 | 0.91 | 392 |
| Micro Avg | 0.95 | 0.95 | 0.95 | 5524 |
| Macro Avg | 0.81 | 0.79 | 0.80 | 5524 |
| Weighted Avg | 0.95 | 0.95 | 0.95 | 5524 |
| Samples Avg | 0.95 | 0.95 | 0.95 | 5524 |

Figure 18A:
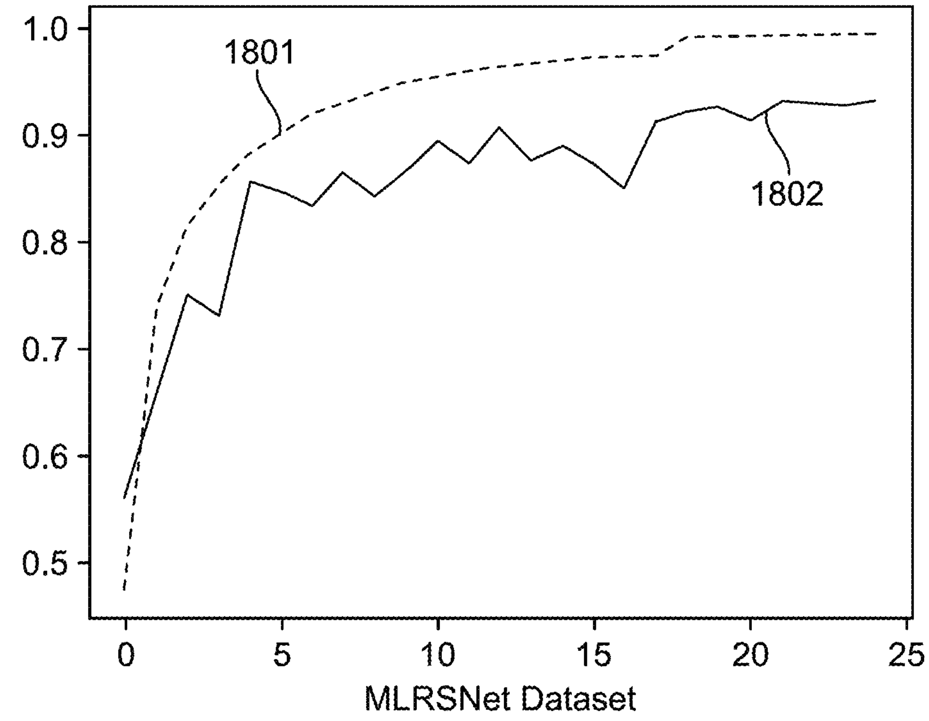
FIGS. 18A-18F illustrate exemplary training and validation accuracy and loss curves of the disclosed architecture on the MLRSNet, NWPU, and Coastal datasets, according to certain embodiments.

FIG. 18A illustrates training plots of the disclosed architecture on the MLRSNet dataset. Curve 1801 denotes the training accuracy trajectory across 25 epochs and exhibits a monotonic increase that proves progressive learning by the network. Curve 1802 denotes the validation accuracy and likewise increases across the same epochs, which indicates generalization on held-out data and supports the convergence behavior described for this dataset.

Figure 18B:
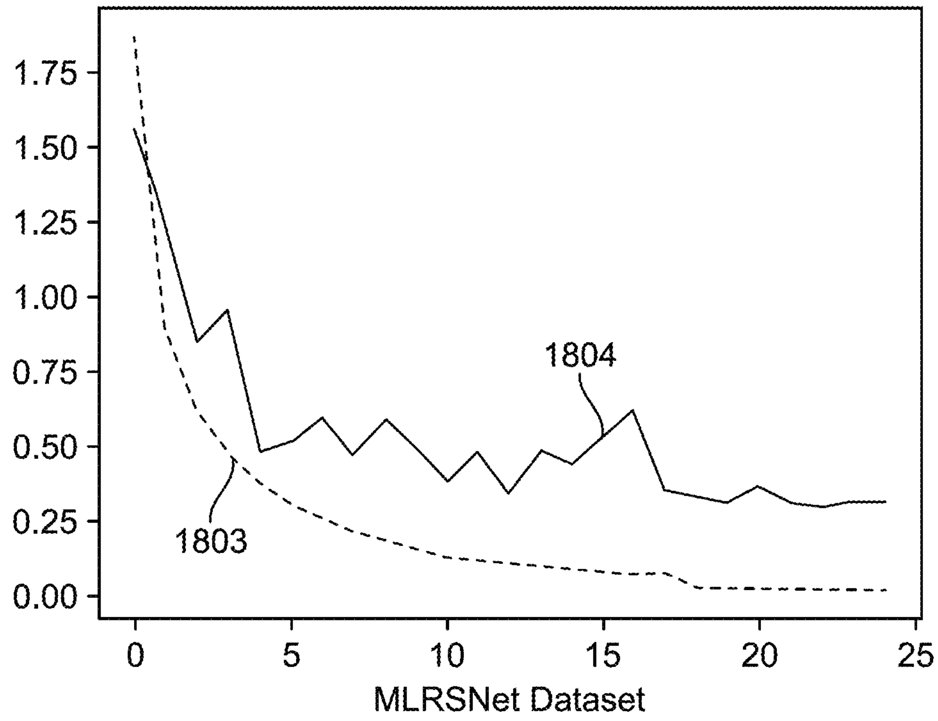

FIG. 18B depicts the corresponding loss characteristics for the MLRSNet dataset over 25 epochs. Curve 1803 denotes the training loss and decreases smoothly throughout the training schedule, which confirms that the optimization procedure is reducing the empirical risk. Curve 1804 denotes the validation loss and also decreases with only slight variations, whose overall downward trend demonstrates that the prediction capacity is improving without instability.

Figure 18C:
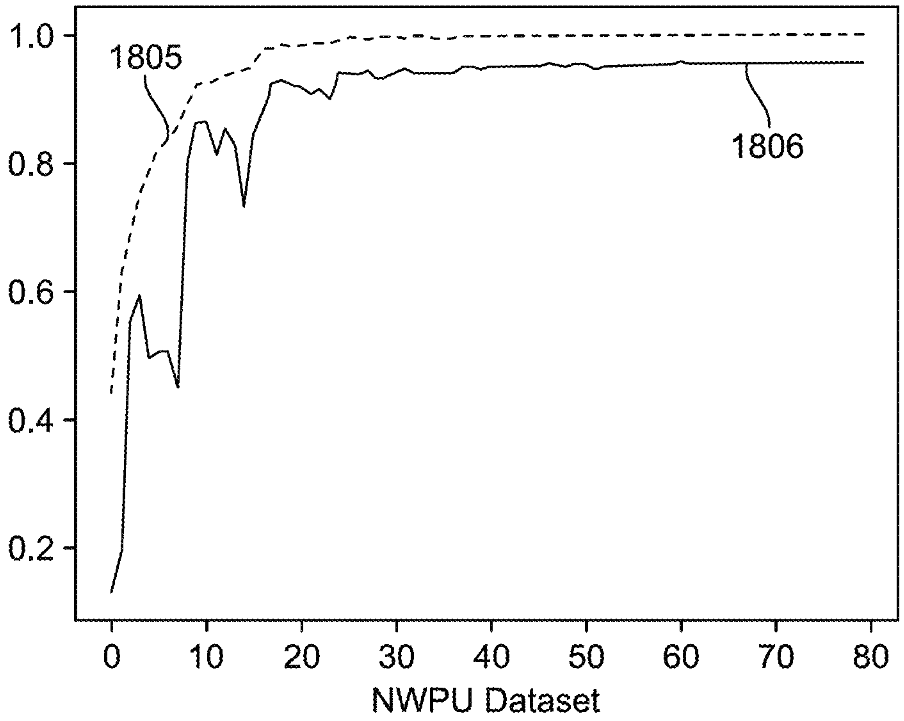

FIG. 18C illustrates training plots of the disclosed architecture on the NWPU dataset over 80 epochs. Curve 1805 denotes the training accuracy and increases steadily to nearly 0.97, indicating that the model learns the target distribution effectively as training proceeds. Curve 1806 denotes the validation accuracy and stabilizes at a high value after initial fluctuations, which indicates that the trained model has generalized well on the NWPU data.

Figure 18D:
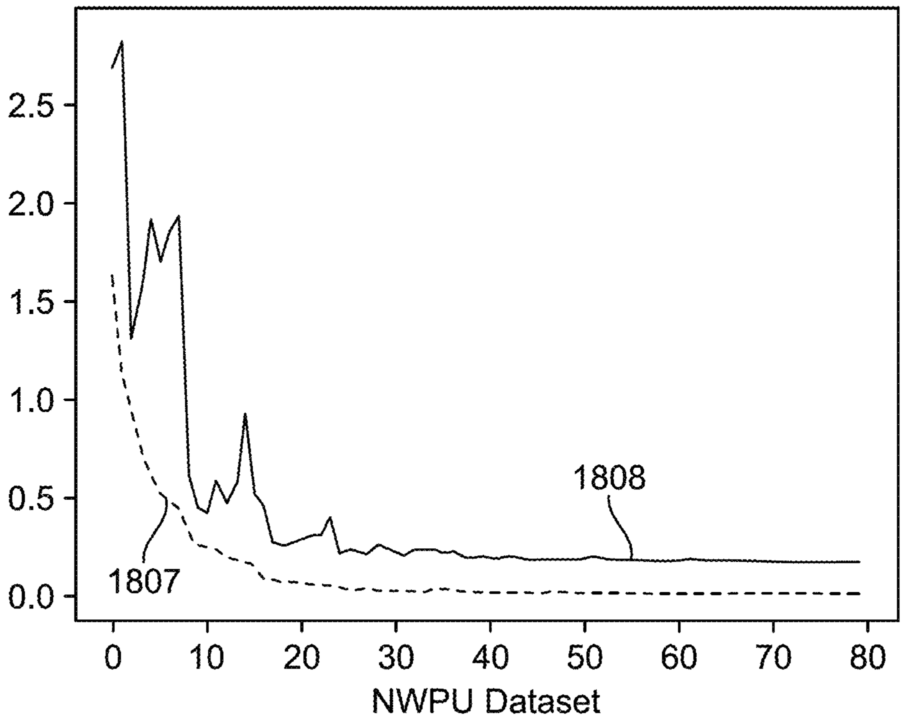

FIG. 18D presents the loss characteristics for the NWPU dataset across 80 epochs. Curve 1807 denotes the training loss and consistently decreases, which accords with effective optimization of the objective. Curve 1808 denotes the validation loss and exhibits a decreasing pattern that corroborates convergence and supports reliable generalization for this dataset.

Figure 18E:
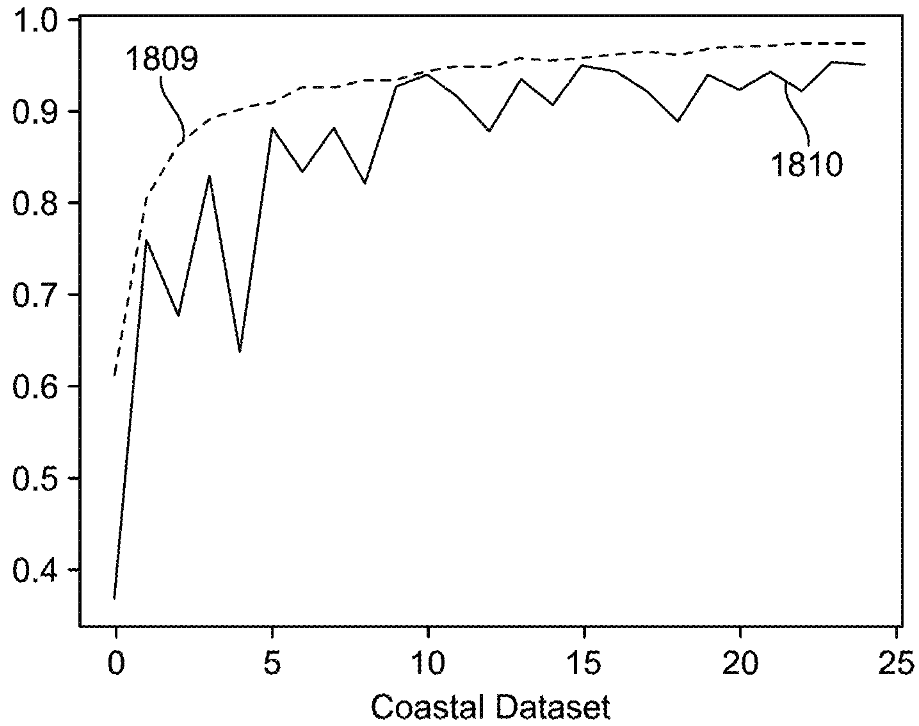

FIG. 18E illustrates training plots of the disclosed architecture on the coastal area dataset. Curve 1809 denotes the training accuracy and approaches a value below 94.6 percent as epochs progress. Curve 1810 denotes the validation accuracy and remains above 90 percent, which collectively indicates that the training procedure achieves high performance on this dataset without divergence.

Figure 18F:
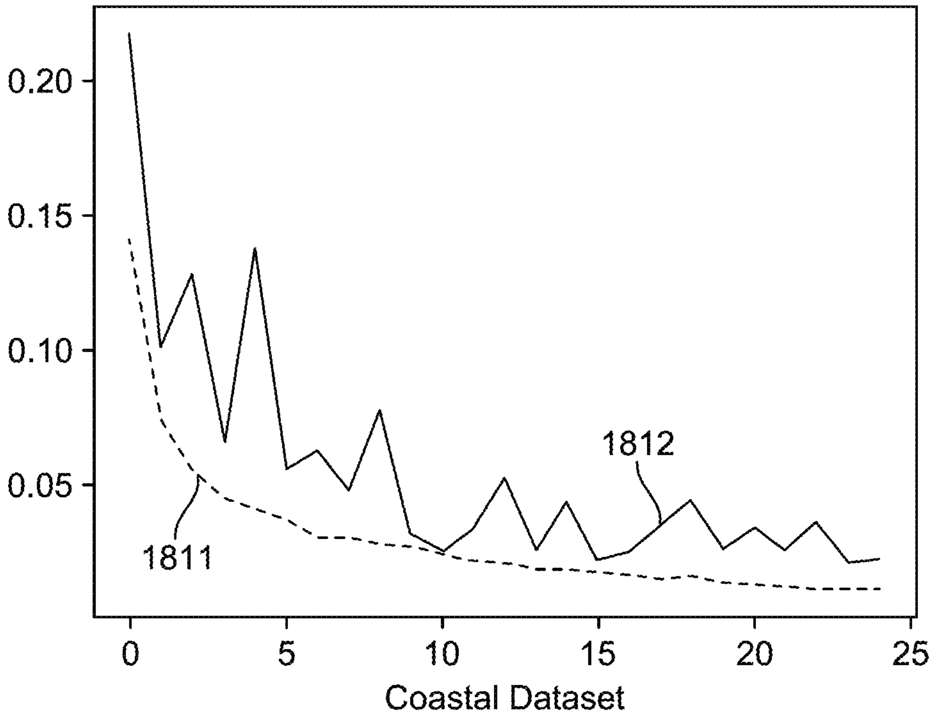

FIG. 18F depicts the loss characteristics for the coastal area dataset. Curve 1811 denotes the training loss and decreases smoothly across the training schedule, while curve 1812 denotes the validation loss and follows a decreasing trajectory that confirms convergence. In combination with the accuracy characteristics of FIGS. 18E and 18F, the overall training of the disclosed model is smooth on the selected datasets without any overfitting.

Figure 19:
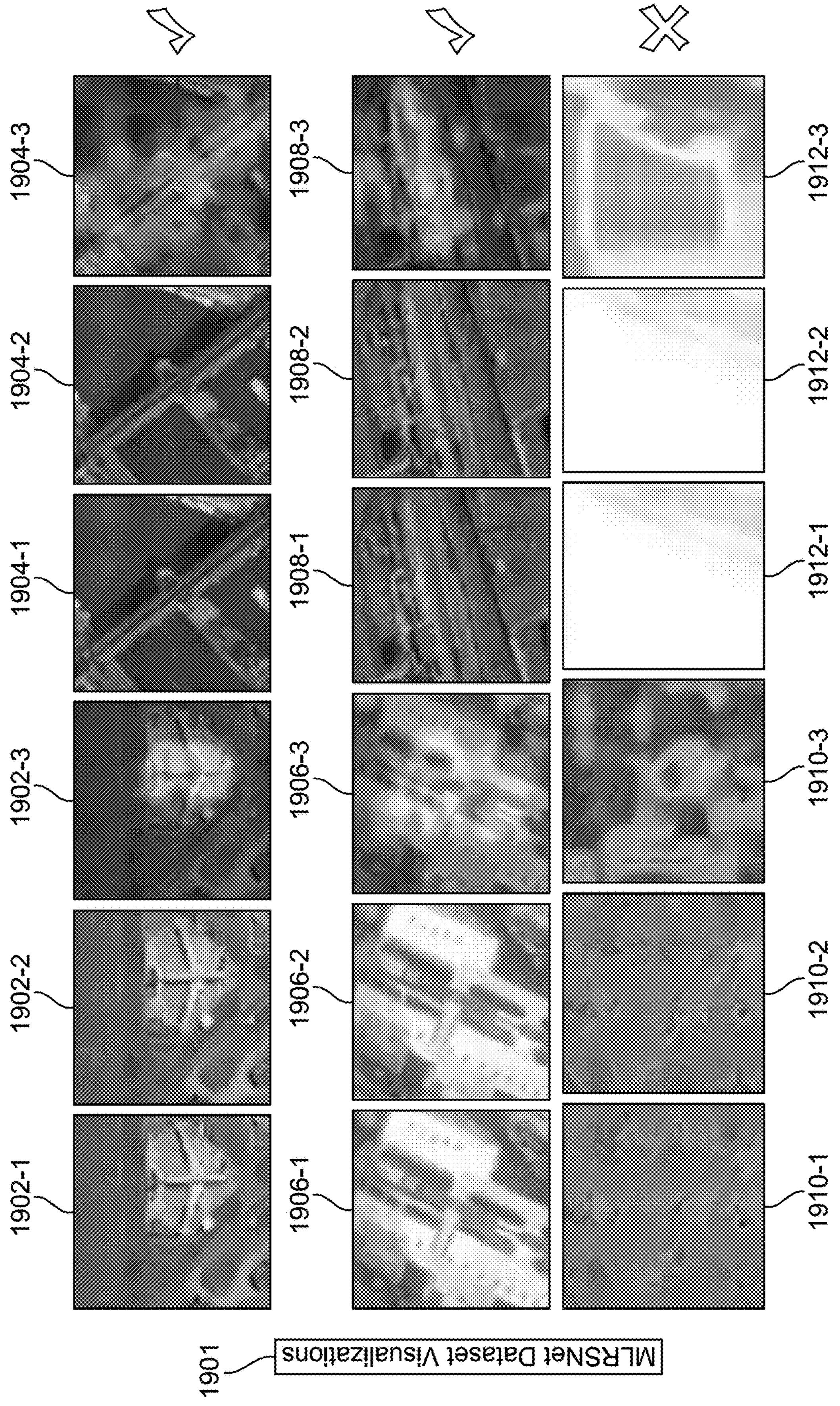
FIG. 19 illustrates exemplary Grad-CAM visualizations of the disclosed SEMSF-Net model on selected datasets, according to certain embodiments.
Figure 19:
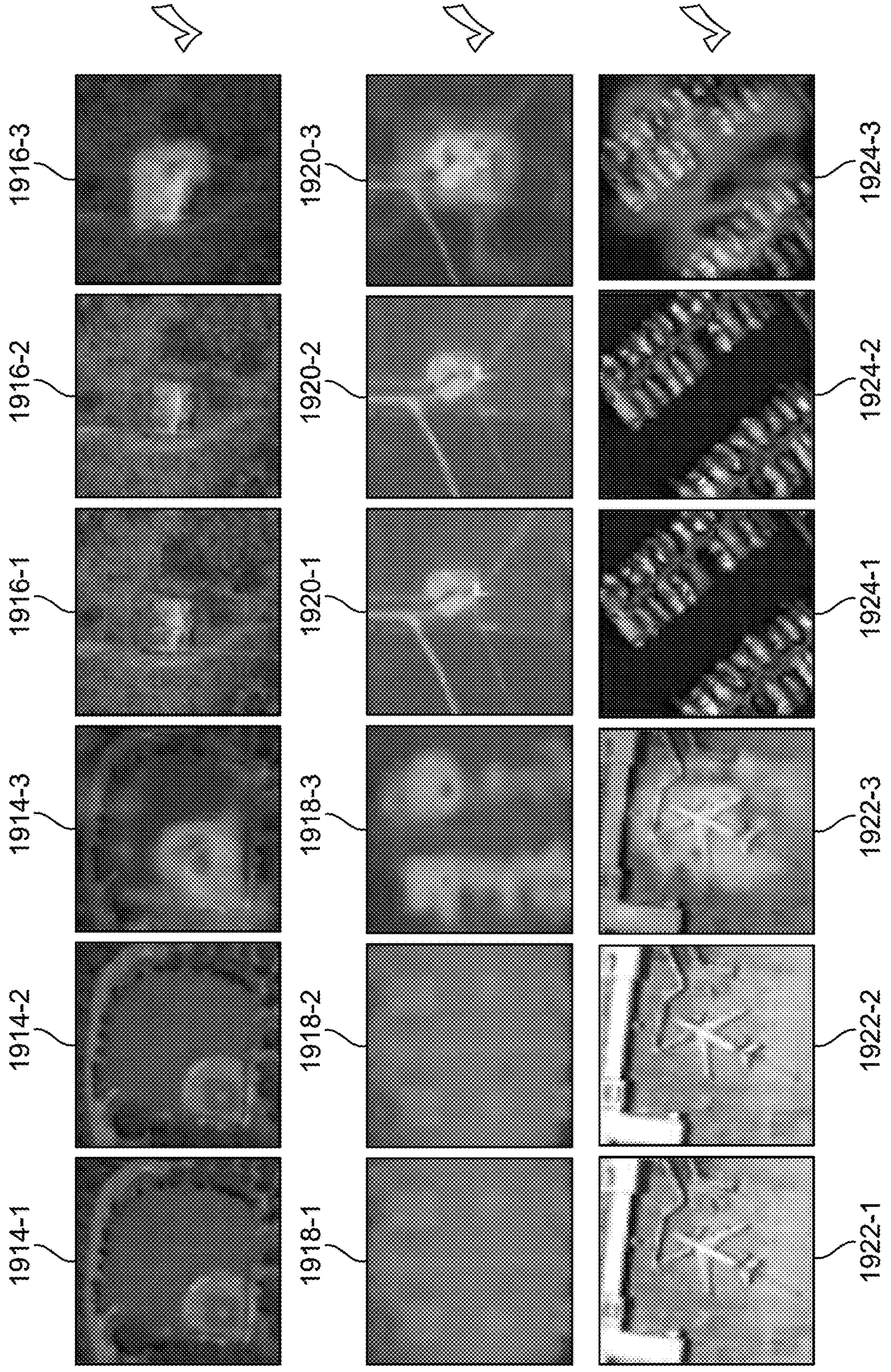
Figure 19:
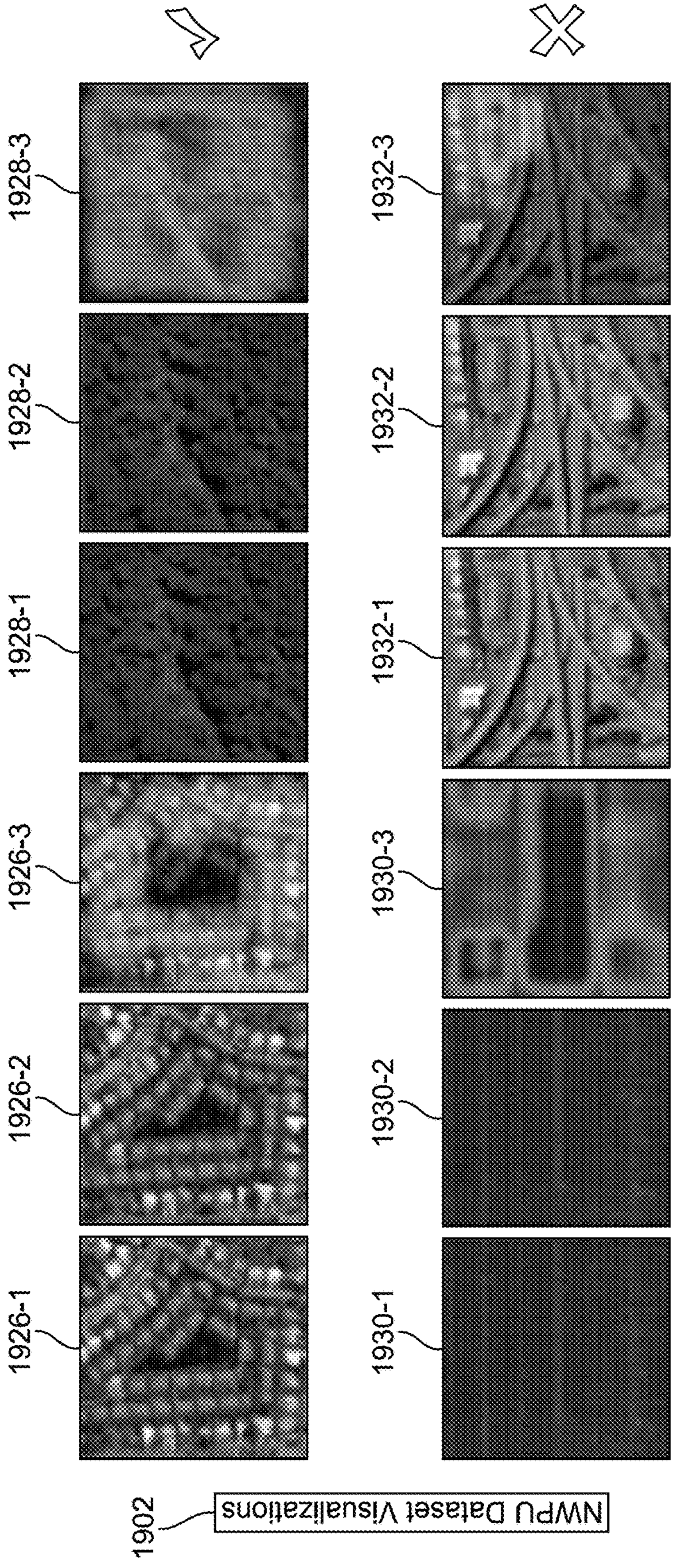
Figure 19:
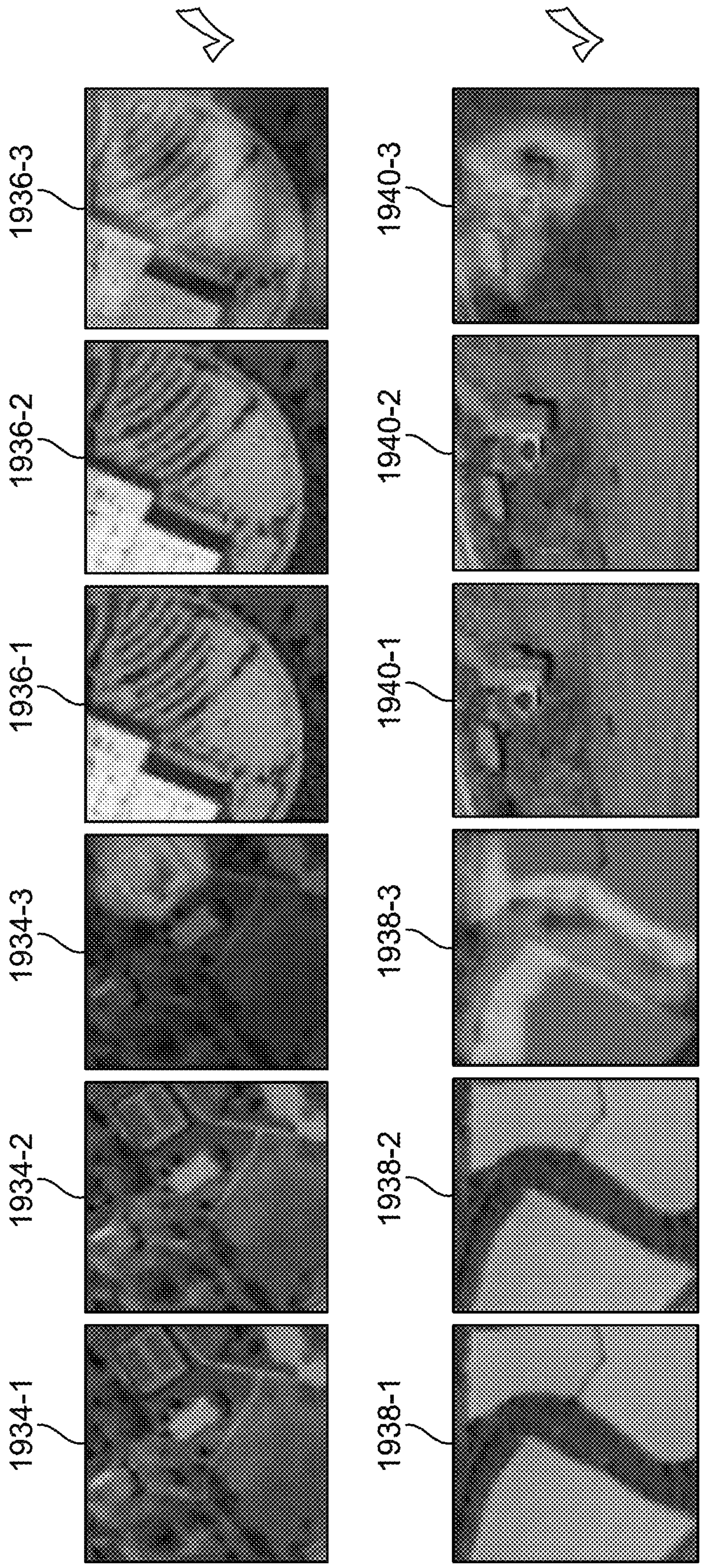
Figure 19:
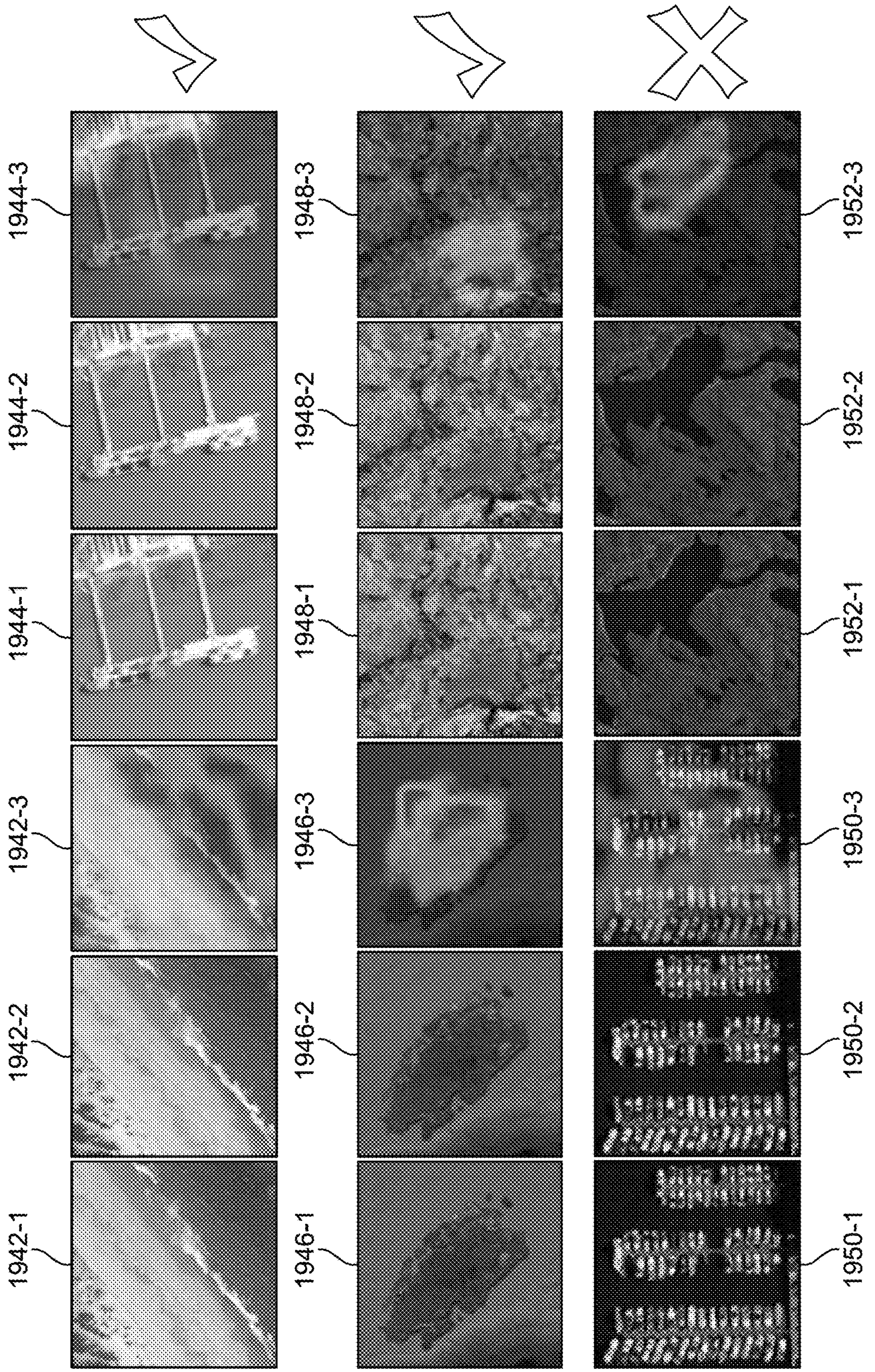
Figure 19:
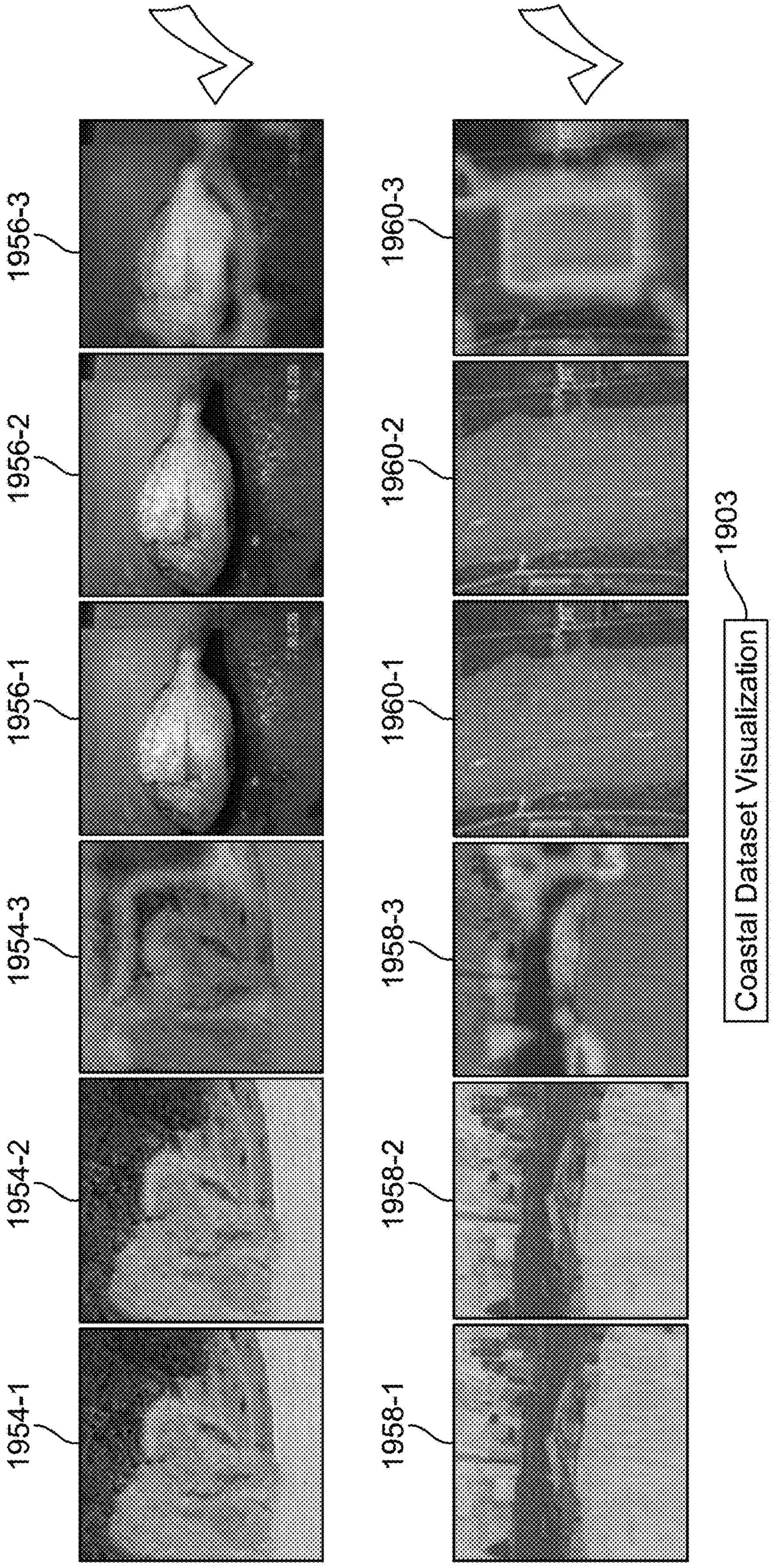

FIG. 19 presents Grad-CAM-based interpretability for the trained architecture on the selected datasets. Panel 1901 shows MLRSNet dataset visualizations, panel 1902 shows NWPU dataset visualizations, and panel 1903 shows coastal dataset visualizations. Grad-CAM highlights different areas of an image with colors whose intensities indicate contribution to the decision. Red regions indicate the most critical and influential evidence used by the classifier. Orange or yellow regions indicate moderate influence on the output. Blue regions indicate little to no influence.

FIG. 19 is read together with the discussion and comparison with state of the art. This section includes a brief discussion based on the disclosed architecture's graphical and tabular form. Tables II-X present detailed results for each dataset of this article. Moreover, the obtained accuracy and precision values are supported through confusion matrices, as seen in FIGS. 13, 15, and 17. Moreover, precision-recall ROC plots are also added to validate the disclosed model performance. The detailed architecture of the disclosed SEMSF-Net, which was trained on three datasets separately, is presented. The training and loss curves are shown in FIG. 18A to FIG. 18F, where the graphs of the MLRSNet dataset depicted the model's training and validation performance over 25 epochs.

According to the present embodiment, the training and validation loss smoothly decrease, confirming convergence. Although the validation loss varies slightly, its overall decreasing pattern indicates that the prediction capacity is improving. The graphs of the NWPU dataset show that the model's training and validation accuracy and loss have been done over 80 epochs. Training accuracy steadily increases to nearly 97%, while validation accuracy stabilizes at a high value after some initial fluctuations, which means that it has learned effectively and generalized well. Similarly, the coastal area dataset training curves show the validation and training accuracy of over 90% and below 94.6%. Hence, the overall training of the disclosed model seems smooth on the selected datasets without any overfitting. Bold denotes the most highest accuracy.

Across the panels, correctly classified examples are marked with green ticks, which include representative categories such as "airplane," "bridge," and "baseball diamond," and the corresponding Grad-CAM heatmaps align with target objects to depict the regions contributing to the predictions. Misclassified examples are marked with red crosses to identify failure modes. A representative error is a "Beach" example in which the model could not successfully localize or interpret the dominant characteristic features, and the heatmap emphasizes non-discriminative characteristics. In panel 1902, each row corresponds to a class from Airfield to Anchorage, Dense Residential, Forest, and others, accompanied by predicted labels and confidence scores alongside the Grad-CAM maps. Most predictions align with the ground truth, which indicates precision of the trained model, while the few misclassifications marked with red crosses indicate areas for improvement. In panel 1903 for the coastal region dataset, the Harbor & Port class is wrongly predicted by the disclosed model, whereas the remaining images are correctly predicted and generate heatmaps that localize the correct regions. FIG. 19 as a whole emphasizes the model's strength in feature localization and classification accuracy, while the occasional errors provide insights for further refinement.

In panel 1901, each three-image set is ordered as a true-class image, a predicted image with the prediction label and its confidence rendered in the figure, and a Grad-CAM heatmap. Accordingly, 1906-1 depicts a true-class image, 1906-2 is a predicted image with its prediction label and confidence score as rendered, and 1906-3 is a Grad-CAM heatmap. 1910-1 depicts a true-class image, 1910-2 is a predicted image with its prediction label and confidence score as rendered, and 1910-3 is a Grad-CAM heatmap. 1914-1 depicts a true-class image, 1914-2 is a predicted image with its prediction label and confidence score as rendered, and 1914-3 is a Grad-CAM heatmap. 1916-1 depicts a true-class image, 1916-2 is a predicted image with its prediction label and confidence score as rendered, and 1916-3 is a Grad-CAM heatmap. 1918-1 depicts a true-class image, 1918-2 is a predicted image with its prediction label and confidence score as rendered, and 1918-3 is a Grad-CAM heatmap. 1920-1 depicts a true-class image, 1920-2 is a predicted image with its prediction label and confidence score as rendered, and 1920-3 is a Grad-CAM heatmap. 1924-1 depicts a true-class image, 1924-2 is a predicted image with its prediction label and confidence score as rendered, and 1924-3 is a Grad-CAM heatmap. 1926-1 depicts a true-class image, 1926-2 is a predicted image with its prediction label and confidence score as rendered, and 1926-3 is a Grad-CAM heatmap. 1930-1 depicts a true-class image, 1930-2 is a predicted image with its prediction label and confidence score as rendered, and 1930-3 is a Grad-CAM heatmap.

In panel 1902, the same three-image ordering applies. 1928-1 depicts a true-class image, 1928-2 is a predicted image with its prediction label and confidence score as rendered, and 1928-3 is a Grad-CAM heatmap. 1932-1 depicts a true-class image, 1932-2 is a predicted image with its prediction label and confidence score as rendered, and 1932-3 is a Grad-CAM heatmap. 1936-1 depicts a true-class image, 1936-2 is a predicted image with its prediction label and confidence score as rendered, and 1936-3 is a Grad-CAM heatmap. 1938-1 depicts a true-class image, 1938-2 is a predicted image with its prediction label and confidence score as rendered, and 1938-3 is a Grad-CAM heatmap. 1940-1 depicts a true-class image, 1940-2 is a predicted image with its prediction label and confidence score as rendered, and 1940-3 is a Grad-CAM heatmap. 1942-1 depicts a true-class image, 1942-2 is a predicted image with its prediction label and confidence score as rendered, and 1942-3 is a Grad-CAM heatmap.

In panel 1903, each triplet is annotated by class and confidence as printed. 1944-1 depicts a true image of Beach, 1944-2 is a predicted image of Beach with a confidence score of 100.00%, and 1944-3 is a Grad-CAM heatmap. 1946-1 depicts a true image of Harbor, 1946-2 is a predicted image of Harbor with a confidence score of 99.27%, and 1946-3 is a Grad-CAM heatmap. 1948-1 depicts a true image of Island, 1948-2 is a predicted image of Island with a confidence score of 100.00%, and 1948-3 is a Grad-CAM heatmap. 1950-1 depicts a true image of Lake, 1950-2 is a predicted image of Lake with a confidence score of 100.00%, and 1950-3 is a Grad-CAM heatmap. 1952-1 depicts a true image of Harbor&port, 1952-2 is a predicted image of Anchorage with a confidence score of 86.84% indicating misclassification, and 1952-3 is a Grad-CAM heatmap. 1954-1 depicts a true image of Wetland, 1956-2 is a predicted image of Lake with a confidence score of 57.17% indicating misclassification, and 1956-3 is a Grad-CAM heatmap. 1958-1 depicts a true image of Landslide, 1958-2 is a predicted image of Landslide with a confidence score of 93.51%, and 1958-3 is a Grad-CAM heatmap. 1960-1 depicts a true image of Red Sea Fish, 1960-2 is a predicted image of Red Sea Fish with a confidence score of 99.95%, and 1960-3 is a Grad-CAM heatmap. 1962-1 depicts a true image of River, 1962-2 is a predicted image of River with a confidence score of 99.14%, and 1962-3 is a Grad-CAM heatmap. 1964-1 depicts a true image of Water, 1964-2 is a predicted image of Water with a confidence score of 97.37%, and 1964-3 is a Grad-CAM heatmap.

The comparative analysis evaluates the disclosed architecture against state-of-the-art (SOTA) models in terms of accuracy, mean F1-score (mF1), and parameter efficiency (see Table XI).

TABLE XI

Comparative Analysis with SOTA for the MLRSNet Dataset

MLRSNET Dataset Comparison

| Architecture | Accuracy | mF1 | Params |
|---|---|---|---|
| FMA-Net | 91.0 | | 11.3M |
| AMEGRF-Net | 91.51 | | 14.8M |
| Yang et al. | 82.59 | | 7.79M |
| VGG16 | — | 68.01 | 134M |
| VGG16 + SSM | — | 72.44 | — |
| VGG16 + SRBM | — | 71.26 | — |
| VGG16 + SR-NET | — | 73.80 | 31M |
| VGG19 | — | 67.10 | 140M |
| VGG19 + SSM | — | 72.91 | — |
| VGG19 + SRBM | — | 70.12 | — |
| VGG19 + SR-Net | — | 73.33 | 36M |
| ResNet50 | — | 85.68 | 24M |
| ResNet50 + SSM | — | 86.58 | — |
| ResNet50 + SRBM | — | 86.07 | — |
| ResNet50 + SR-Net | — | 87.21 | 42M |
| ResNet101 | — | 86.05 | 43M |
| ResNet101 + SSM | — | 86.92 | — |
| ResNet101 + SRBM | — | 87.71 | — |
| ResNet101 + SR-Net | — | 87.55 | 61M |
| DenseNet201 | — | 86.17 | 18M |
| DenseNet201 + SSM | — | 86.56 | — |
| DenseNet201 + SRBM | — | 86.26 | — |
| DenseNet201 + SR-Net | — | 87.36 | 39M |
| Disclosed | 93.07 | 93.21 | 2.64M |

NWPU Dataset

| Architecture | Accuracy | | Params |
|---|---|---|---|
| Khan et al. | 93.3 | 5.7M | |
| EAM | 93.04 | — | |
| WSADAN-ResNet50 | 92.63 | — | |
| BestC | 95.28 | | 43.78M |
| Albarakati et al. | 91.7 | | 18.6M |
| Disclosed | 95.70 | | 2.64M |

GradCAM Visualization of the disclosed SEMSF-Net is discussed here. In one aspect, to analyze the training of the disclosed model on selected datasets, we performed interpretation through GradCAM visualization. GradCAM highlights different areas of the image with different colors, and each color shows the importance of that region in the overall classification. The red color shows that these areas are most critical and influential. The model's decision heavily relies on these regions, whereas orange or yellow colors show that these regions have a moderate influence on model's output, while the blue color shows little to no influence. Overall, the image shows the visual outcome of a model's classifying performance, including Grad-CAM visualizations for interpretability. Correctly classified examples are marked with green ticks, showing accurate predictions that include "airplane," "bridge," and "baseball diamond." The Grad-CAM heatmaps depict regions contributing to the predictions: they align well with target objects. However, an incorrect classification is also obtained and circled by a red cross, such as the "Beach" class, which shows that the model could not successfully localize or interpret the dominant characteristic features and, thus, produced heatmaps on the wrong characteristics. In the samples of the NWPU dataset, each row is a class from Airfield to Anchorage, Dense Residential, Forest, and more, which are represented by the predicted labels and confidence scores accompanying the Grad-CAM heatmaps. Most predictions align well with the actual class, as the green checkmarks indicate; thus, the model is precise. However, there are a few misclassifications, marked by red crosses, which indicate areas for improvement. For the coastal region dataset, the Harbor & Port class is wrongly predicted by the disclosed model. In contrast, the rest of the images are correctly predicted and generated heatmap on the correct region. Hence, the results emphasize the model's strength in feature localization and classification accuracy, but the occasional errors give insights into further refinement.

Figure 20:
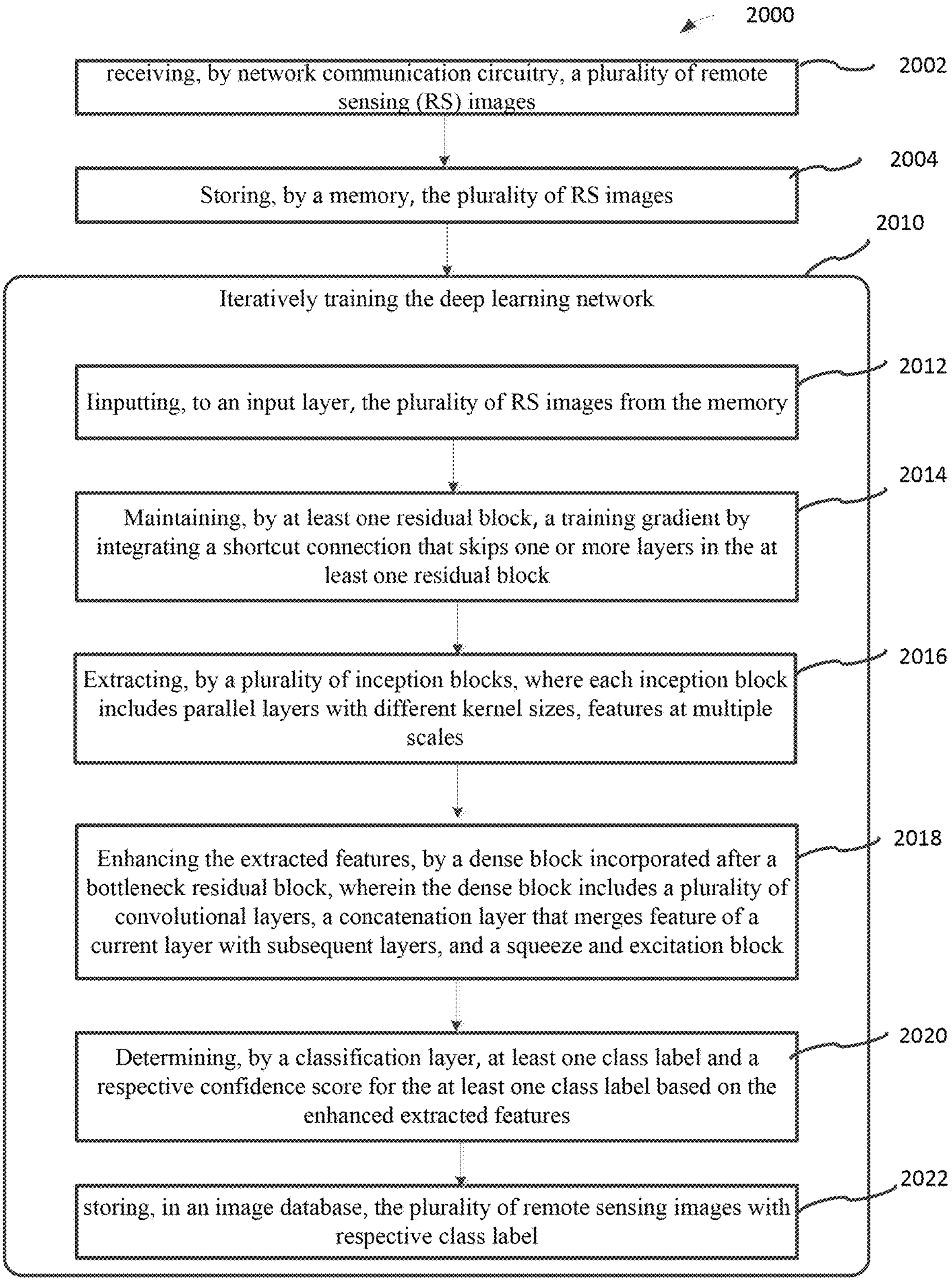
FIG. 20 illustrates a flowchart of an exemplary computer-implemented method for automatic classification of land use and land cover, according to certain embodiments.

FIG. 20 illustrates a computer-implemented method 2000 of automatic classification of land use and land cover (LULC). The method 2000 is executed by a system that includes workstation computer.

The method includes capturing, by sensors mounted on remote sensing devices, a plurality of remote sensing (RS) images. The sensor may be an optical RGB camera, a multispectral or hyperspectral imager, a thermal imager, or another aerial imaging payload suitable for earth observation. The sensors are configured to acquire imagery of a coastal or inland scene at a predetermined spatial resolution and at predetermined time intervals while the remote sensing devices operate in an autonomous or semi-autonomous flight mode. Each RS image represents a scene tile comprising a two-dimensional array of pixels arranged in one or more spectral channels.

The method includes transmitting, by transmission communication circuitry, the plurality of RS images. The transmission communication circuitry forms a wireless data link to a ground or cloud service and packages each RS image together with any associated metadata such as geographic coordinates, time of acquisition, and sensor configuration. The transmission may utilize one or more wireless protocols including Wi-Fi, cellular 4G/5G, long-range radio, or satellite links. The transmission step provides near real-time delivery of the captured imagery for downstream processing.

At block 2002, the method includes receiving, by server communication circuitry, the plurality of RS images. The server communication circuitry terminates the wireless session, authenticates the unmanned aerial vehicle, and ingests the image payloads into a server pipeline. The receiving operation verifies integrity by checksum and acknowledges successful receipt to the unmanned aerial vehicle.

At block 2004, the method includes storing, by a memory, the plurality of RS images. The memory is implemented using one or more of volatile and non-volatile storage media, such as RAM, flash, or disk arrays. The memory maintains an indexed repository of the images and the associated metadata so that training and inference components can access batched samples efficiently.

At block 2010, the method includes iteratively training, by a machine learning engine, a deep learning network. The machine learning engine executes a supervised optimization procedure over multiple epochs. During each epoch, minibatches of RS images and corresponding ground-truth labels are retrieved from the memory, forward-propagated through the deep learning network, and used to compute a loss signal. Network parameters are updated by a stochastic optimizer to reduce the loss across epochs, thereby improving classification accuracy while controlling computational cost.

At block 2012, the iteratively training step includes inputting, by an input layer, the plurality of RS images from the memory. The input layer forms a tensor of size H×W×C for each image in a mini-batch, applies any required normalization consistent with training statistics, and passes the tensor to the subsequent feature extraction blocks.

At block 2014, the iteratively training step includes maintaining, by at least one residual block, a training gradient by integrating a shortcut connection that skips one or more layers in the at least one residual block. Each residual block performs a sequence of two-dimensional convolutions with batch normalization and rectified linear unit activation while preserving a shortcut pathway. The block aggregates the convolutional result with the shortcut by element-wise addition and applies an activation. The residual topology maintains gradient magnitude during backpropagation through deep stacks and stabilizes optimization.

At block 2016, the iteratively training step includes extracting, by a plurality of inception blocks, features of the RS images at multiple scales. Each inception block implements parallel convolutional branches with different receptive fields. One branch uses a 1×1 kernel to capture pointwise relations. Another branch uses a 3×3 kernel to capture mid-scale edges and textures. Another branch uses a 5×5 kernel to aggregate wider spatial context. An additional branch may apply average pooling followed by a 1×1 convolution to preserve background statistics. Outputs of the branches are concatenated along a channel dimension to form a multiscale feature tensor that improves discrimination of land and water boundaries, man-made structures, and vegetative patterns.

At block 2018, the iteratively training step includes enhancing the extracted features, by a dense block incorporated after a bottleneck residual block, wherein the dense block includes a plurality of convolutional layers, a concatenation layer that merges feature of a current layer with subsequent layers, and a squeeze and excitation block. In each bottleneck block, a first 1×1 convolution reduces channel width, a 3×3 convolution extracts spatial structure, and a second 1×1 convolution restores channel width. Where spatial downsampling is required, a stride of 2 is used in the first bottleneck of a stage and stride 1 is used in subsequent bottlenecks of that stage. In each inverted bottleneck block, channels are first expanded by a 1×1 convolution, a depthwise 3×3 convolution models spatial context with low parameter count, and a 1×1 projection compresses channels back to the target width. Residual connections are used where dimensions permit. These blocks reduce multiply-accumulate operations while preserving power based on computational complexity.

The iteratively training step includes promoting, by a plurality of dense blocks, reuse of the extracted features. In each dense block, a sequence of layers is arranged so that the output of each layer is concatenated with all subsequent layers. A typical layer includes a 1×1 convolution to compress channels followed by a 3×3 convolution to refine local patterns, each followed by batch normalization and a rectified linear unit. The dense connectivity improves gradient flow, encourages feature reuse across the block, and increases parameter efficiency of the deep learning network.

At block 2020, the method includes determining, by a classification layer, at least one class label and a respective confidence score for the class label based on the enhanced extracted features. Prior to classification, global average pooling aggregates each channel to a scalar descriptor and dropout may be applied to regularize the classifier during training. A fully connected layer maps the pooled descriptors to logits. A softmax transforms the logits into normalized probabilities across the land use and land cover categories, and the category with the highest probability is output as the class label together with its confidence score.

At block 2020, the method includes storing, in an image database, the plurality of remote sensing images with respective class label.

In some embodiments, the iterative training uses a categorical cross-entropy loss and an adaptive optimizer with a mini-batch schedule. In some embodiments, the trained deep learning network produced by the iteratively training step is deployed either on the server computer for batch processing of the stored RS images or on an onboard processor of the unmanned aerial vehicle for real-time classification at the predetermined time interval of image capture. The method 2000 yields automatic classification of land use and land cover with an associated confidence measure for each processed image frame.

Figure 21:
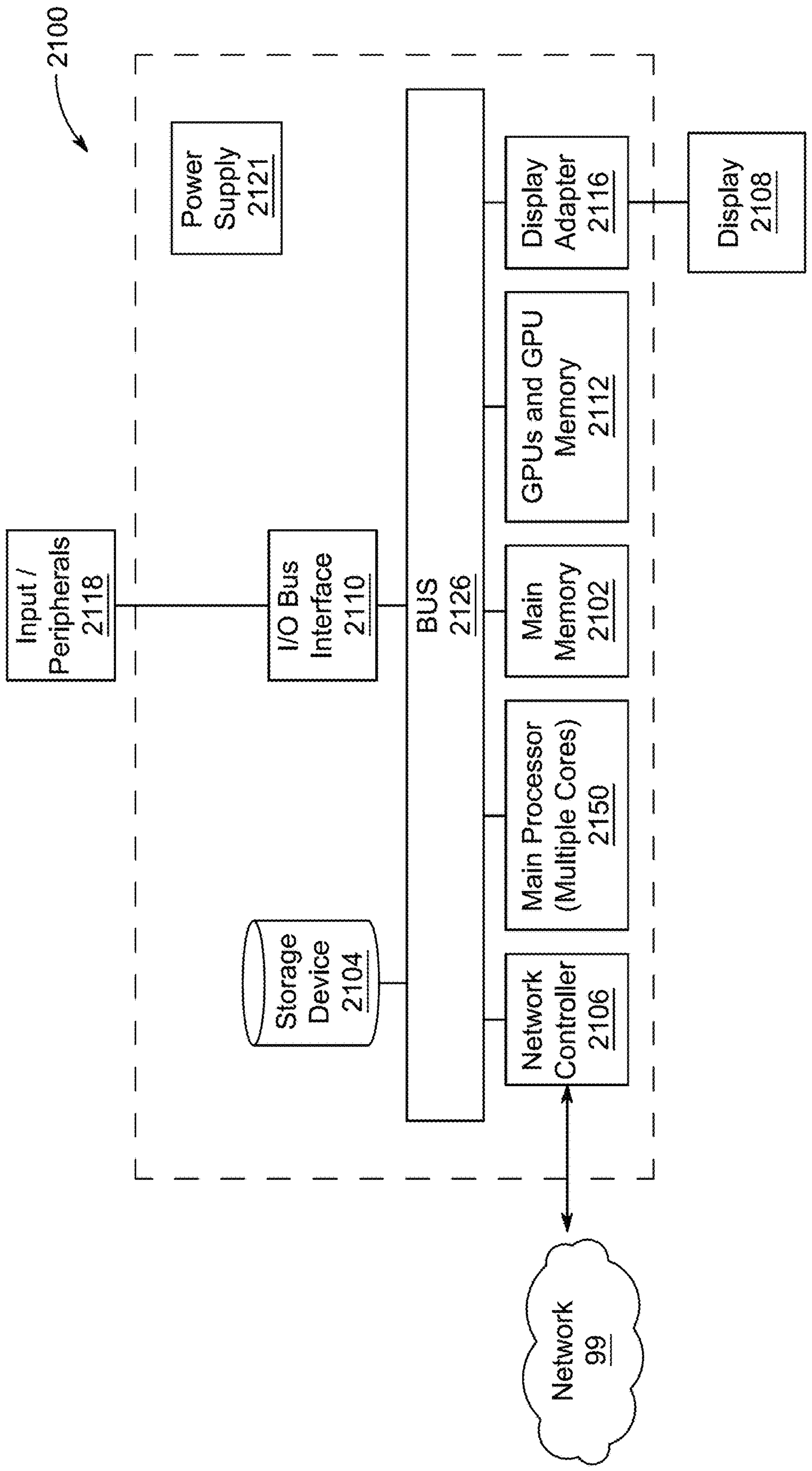
FIG. 21 illustrates a block diagram of an example computer workstation system for implementing machine-learning training and inference, according to certain embodiments.

FIG. 21 is a block diagram illustrating an example computer system 2100 for implementing the machine learning training and inference methods according to an exemplary aspect of the disclosure. The computer system 2100 may be an AI workstation running an operating system, for example Ubuntu Linux OS, Windows, a version of Unix OS, or Mac OS. The computer system 900 may include one or more central processing units (CPU) 2150 having multiple cores. The computer system 2100 may include a graphics board 2112 having multiple GPUs, each GPU having GPU memory. The graphics board 2112 may perform many of the mathematical operations of the disclosed machine learning methods.

In an exemplary implementation, the AI workstation is configured with an NVIDIA GA 100 GPU or later. This GPU includes 512 tensor cores for machine learning applications. This GPU pairs 40 GB HBM2e memory with the A100 PCIe 40 GB, which are connected using a 5120-bit memory interface.

A full implementation of the GA100 GPU includes the following units: 8 GPCs, 8 TPCs/GPC, 2 SMs/TPC, 16 SMs/GPC, 128 SMs per full GPU; 64 FP32 CUDA Cores/SM, 8192 FP32 CUDA Cores per full GPU; 4 third-generation Tensor Cores/SM, 512 third-generation Tensor Cores per full GPU; and 6 HBM2 stacks, 12 512-bit memory controllers. An NVIDIA A100 Tensor Core performs fused multiply-add (FMA) operations, accelerating matrix multiplications by multiplying two 4×4 matrices and adding the result to a third matrix, often in a single, high-throughput clock cycle.

The computer system 2100 includes main memory 2102, typically random access memory RAM, which contains the software being executed by the processing cores 2150 and GPUs 2112, as well as a non-volatile storage device 2104 for storing data and the software programs. Several interfaces for interacting with the computer system 2100 may be provided, including an I/O Bus Interface 2110, Input/Peripherals 2118 such as a keyboard, touch pad, mouse, Display Adapter 2116 and one or more Displays 2108, and a Network Controller 2106 to enable wired or wireless communication through a network 99. The interfaces, memory and processors may communicate over the system bus 2126. The computer system 2100 includes a power supply 2121, which may be a redundant power supply.

In some embodiments, the computer system 2100 may include a server CPU and a graphics card by NVIDIA, in which the GPUs have multiple CUDA cores. In some embodiments, the computer system 2100 may include a machine learning engine.

Figure 22:
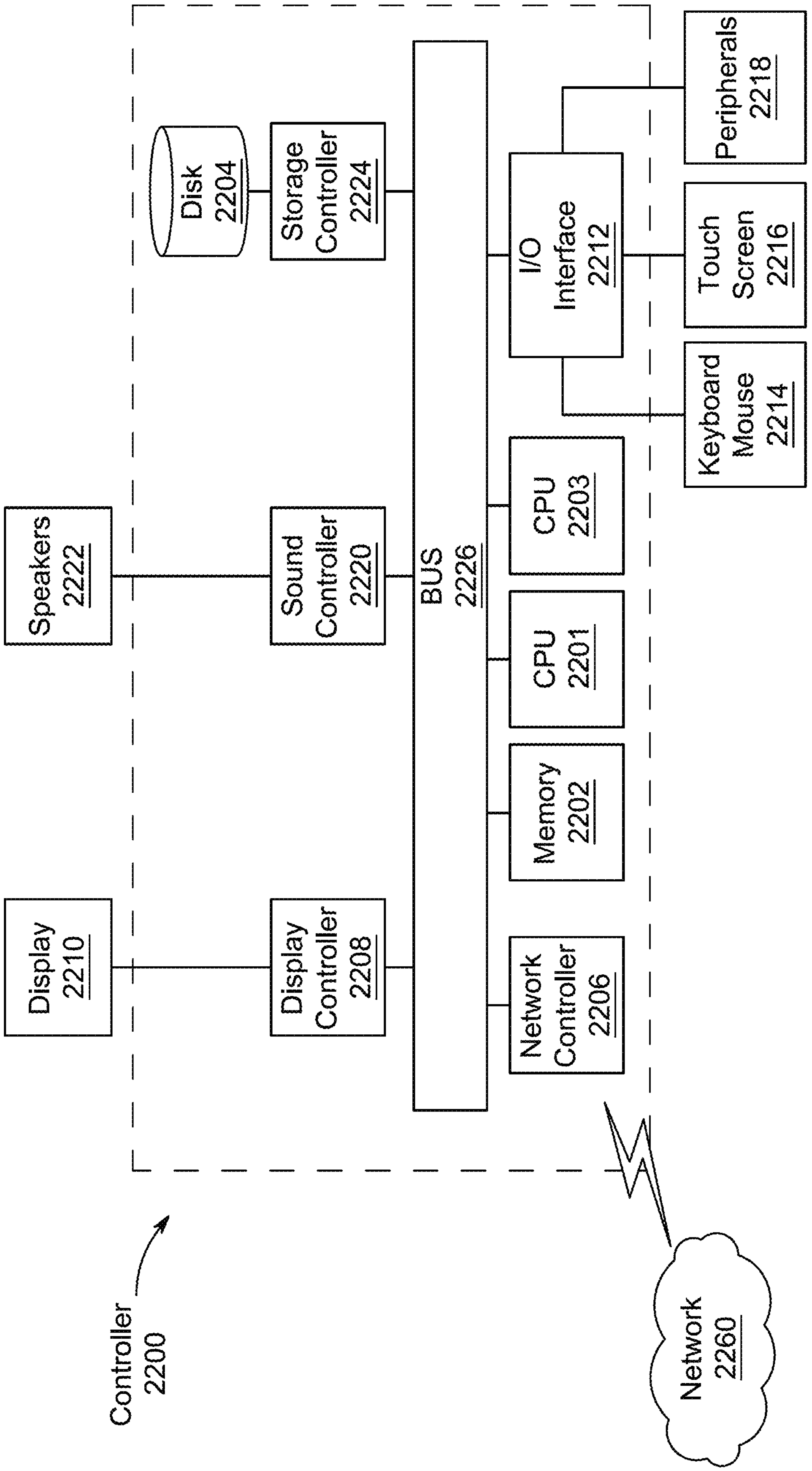
FIG. 22 is an illustration of a non-limiting example of details of computing hardware used in the computing system, according to certain embodiments.

Next, further details of a hardware description of a computing environment according to exemplary embodiments are described with reference to FIG. 22. In FIG. 22, a controller 2200 is described as representative of the base station 202 of FIG. 2 or the configuration for performing the above-described simulations. The controller 2200 includes a CPU 2202 which performs the processes described above. The process data and instructions may be stored in memory 2204. These processes and instructions may also be stored on a storage medium disk 2208 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 2202, 2206 and an operating system such as, Microsoft Windows, UNIX, Solaris, LINUX, Apple MAC-OS and other systems known to those skilled in the art.

The hardware elements in order to achieve the computing device may be realized by various circuitry elements, known to those skilled in the art. For example, CPU 2202 or CPU 2206 may be a Xenon or Core processor from Intel of America or an Opteron processor from AMD of America, or may be other processor types that would be recognized by one of ordinary skill in the art. Alternatively, the CPU 2202, 2206 may be implemented on an FPGA, ASIC, PLD or using discrete logic circuits, as one of ordinary skill in the art would recognize. Further, CPU 2202, 2206 may be implemented as multiple processors cooperatively working in parallel to perform the instructions of the inventive processes described above.

The computing device in FIG. 22 also includes a network controller 2210, such as an Intel Ethernet PRO network interface card from Intel Corporation of America, for interfacing with network 2232. As can be appreciated, the network 2232 can be a public network, such as the Internet, or a private network such as an LAN or WAN network, or any combination thereof and can also include PSTN or ISDN sub-networks. The network 2232 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 2212, such as a NVIDIA GeForce GTX or Quadro graphics adaptor from NVIDIA Corporation of America for interfacing with display 2214, such as a Hewlett Packard HPL2445w LCD monitor. A general purpose I/O interface 2216 interfaces with a keyboard and/or mouse 2218 as well as a touch screen panel 2220 on or separate from display 2210. General purpose I/O interface also connects to a variety of peripherals 2214 including printers and scanners, such as an OfficeJet or DeskJet from Hewlett Packard.

A sound controller 2224 is also provided in the computing device such as Sound Blaster X-Fi Titanium from Creative, to interface with speakers/microphone 2226 thereby providing sounds and/or music.

The general purpose storage controller 2228 connects the storage medium disk 2208 with communication bus 2230, which may be an ISA, EISA, VESA, PCI, or similar, for interconnecting all of the components of the computing device. A description of the general features and functionality of the display 2214, keyboard and/or mouse 2218, as well as the display controller 2212, storage controller 2228, network controller 2210, sound controller 2224, and general purpose I/O interface 2216 is omitted herein for brevity as these features are known. The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 23.

Figure 23:
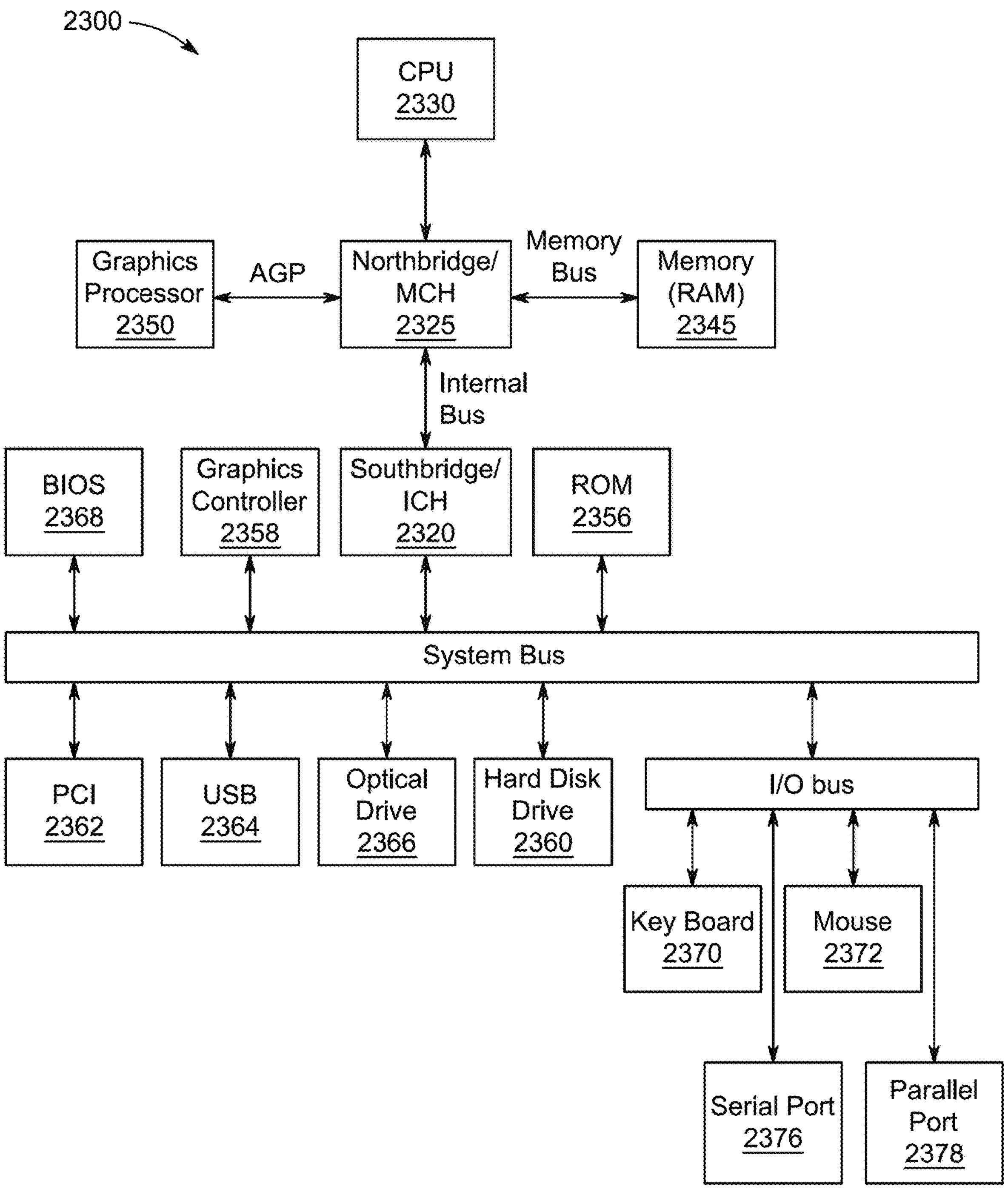
FIG. 23 is an exemplary schematic diagram of a data processing system used within the computing system, according to certain embodiments.

FIG. 23 shows a schematic diagram of a data processing system 2300, according to certain embodiments, for performing the functions of the exemplary embodiments. The data processing system is an example of a computer in which code or instructions implementing the processes of the illustrative embodiments may be located.

In FIG. 23, data processing system 2300 employs a hub architecture including a north bridge and memory controller hub (NB/MCH) 2302 and a south bridge and input/output (I/O) controller hub (SB/ICH) 2304. The central processing unit (CPU) 2306 is connected to NB/MCH 2302. The NB/MCH 2302 also connects to the memory 2308 via a memory bus, and connects to the graphics processor 2310 via an accelerated graphics port (AGP). The NB/MCH 2302 also connects to the SB/ICH 2304 via an internal bus (e.g., a unified media interface or a direct media interface). The CPU Processing unit 2306 may contain one or more processors and even may be implemented using one or more heterogeneous processor systems.

Figure 24:
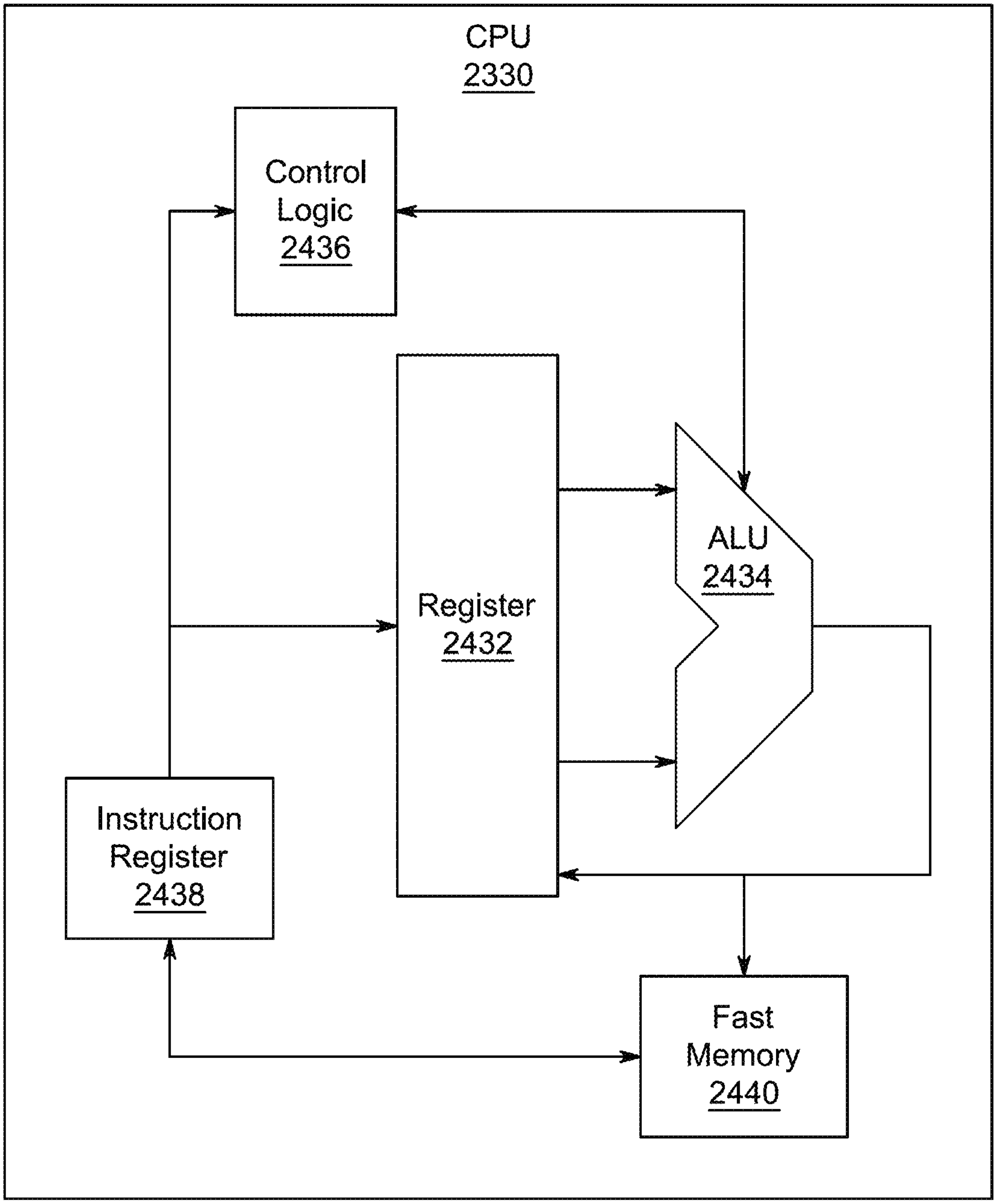
FIG. 24 is an exemplary schematic diagram of a processor used with the computing system, according to certain embodiments.

For example, FIG. 24 shows one implementation of CPU 2306. In one implementation, the instruction register 2408 retrieves instructions from the fast memory 2410. At least part of these instructions are fetched from the instruction register 2408 by the control logic 2406 and interpreted according to the instruction set architecture of the CPU 2406. Part of the instructions can also be directed to the register 2402. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 2404 that loads values from the register 2402 and performs logical and mathematical operations on the loaded values according to the instructions. The results from these operations can be feedback into the register and/or stored in the fast memory 2410. According to certain implementations, the instruction set architecture of the CPU 2306 can use a reduced instruction set architecture, a complex instruction set architecture, a vector processor architecture, a very large instruction word architecture. Furthermore, the CPU 2306 can be based on the Von Neuman model or the Harvard model. The CPU 2306 can be a digital signal processor, an FPGA, an ASIC, a PLA, a PLD, or a CPLD. Further, the CPU 2306 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 23, the data processing system 2300 can include that the SB/ICH 2304 is coupled through a system bus to an I/O Bus, a read only memory (ROM) 2312, universal serial bus (USB) port 2314, a flash binary input/output system (BIOS) 2316, and a graphics controller 2318. PCI/PCIe devices can also be coupled to SB/ICH 2304 through a PCI bus 2320. The PCI devices may include, for example, Ethernet adapters, add-in cards, and PC cards for notebook computers. The Hard disk drive 2322 and CD-ROM 2324 can use, for example, an integrated drive electronics (IDE) or serial advanced technology attachment (SATA) interface. In one implementation the I/O bus can include a super I/O (SIO) device.

Further, the hard disk drive (HDD) 2322 and optical drive 2324 can also be coupled to the SB/ICH 2304 through a system bus. In one implementation, a keyboard 2326, a mouse 2328, a parallel port 2330, and a serial port 2332 can be connected to the system bus through the I/O bus. Other peripherals and devices that can be connected to the SB/ICH 2304 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 25:
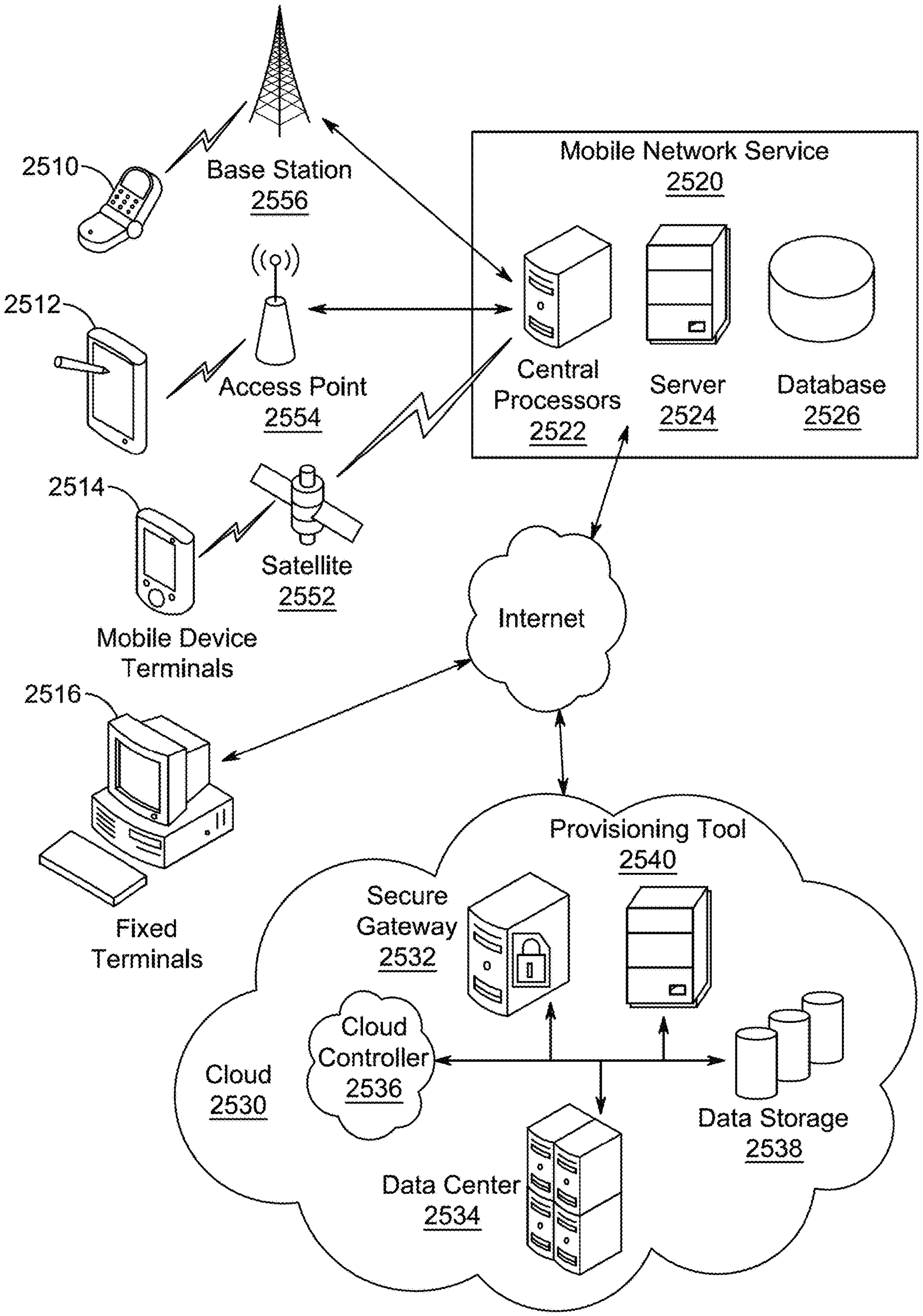
FIG. 25 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 2502 including a cloud controller 2504, a secure gateway 2506, a data center 2508, data storage 2510 and a provisioning tool 2512, and mobile network services 2514 including central processors 2516, a server 2518 and a database 2520, which may share processing, as shown by FIG. 25, in addition to various human interface and communication devices (e.g., display monitors 2522, smart phones 2528, tablets 2526, personal digital assistants (PDAs) 2524). The network may be a private network, such as a LAN, satellite 2532 or WAN 2534, or be a public network 2530, may such as the Internet 2536. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A system for analyzing land use and land cover (LULC), comprising:

network communication circuitry configured to receive a plurality of remote sensing (RS) images from multiple sources, wherein each RS image includes a geographic region, a GPS location and a timestamp, a memory configured to store the plurality of RS images, processing circuitry configured to iteratively train a squeeze-excitation multiscale fusion network, including:

input, to an input layer, the plurality of RS images from the memory, maintain, by at least one residual block, a training gradient by integrating a shortcut connection that skips one or more layers in the at least one residual block, extract, by a plurality of inception blocks, where each inception block includes parallel layers with different kernel sizes, features at multiple scales, enhance the extracted features, by a dense block incorporated after a bottleneck residual block, wherein the dense block includes a plurality of convolutional layers, a concatenation layer that merges feature of a current layer with subsequent layers, and a squeeze and excitation block, and determine, by a classification layer, at least one class label and a respective confidence score for the at least one class label based on the enhanced extracted features for a RS image of the plurality of RS images store, in an image database, the plurality of remote sensing images with respective class label;

a system interface configured to input a selection of whether general or specific LULC images are of interest;

when general is selected, input a date and time, input whether count of number of each class is selected, input whether area of each class is selected, input whether there is a change in class for a location is selected, when specific LULC is selected, input class name, input a region of interest, input a location, input whether change detection is selected, a database compute component configured to determine a count of images in each respective class for a date/time, determine a total area of the images in each respective class for a data/time, determine a change in an image for a region, determine a change in an image for a location.

2. The system of claim 1, wherein the processing circuitry is further configured to store classified remote sensing images in the image database by downstream applications including images regarding land cover, urban settings, agriculture areas, protected areas, and natural disaster incidents, and wherein each of the classified remote sensing images are stored by one or more of the downstream applications.

3. The system of claim 2, wherein the processing circuitry is further configured to iteratively train a plurality of separate deep learning networks for the downstream applications in accordance with the training of the squeeze-excitation multiscale fusion network.

4. The system of claim 1, further comprising:

a plurality of the squeeze-excitation (SE) blocks, each said SE block includes a global average pooling layer configured to perform a squeeze operation through which a scalar value is calculated for each channel, a resulting squeezed vector is reshaped to (1, 1, C), where C is a number of channels, and two dense layers configured to receive the reshaped vector, wherein a first of the dense layers reduces the number of channels and a second of the dense layers restores the original number of channels.

5. The system of claim 4, wherein each inception block is embedded after a respective said SE block including a plurality of parallel layers, each said parallel layer having different kernel sizes of 1×1, 3×3, and 5×5.

6. The system of claim 4, further comprising three bottleneck blocks, wherein each bottleneck block is integrated with a respective SE block, a first of the bottleneck blocks has a stride of 2 to reduce spatial dimensions, and the other two bottleneck blocks have a stride of 1 to enhance the extracted features.

7. The system of claim 4, wherein each dense block is connected to a respective inverted bottleneck block, wherein each layer in a dense block is connected directly to all subsequent layers, and wherein each dense block comprises four layers, each consisting of a 1×1 convolutional layer, a 3×3 convolutional layer, a concatenation operation, and a respective squeeze and excitation block.

8. The system of claim 1, wherein each bottleneck residual block includes a compression layer configured to reduce spatial dimensions of the extracted features.

9. The system of claim 1, wherein the processing circuitry is further configured to apply a crossentropy loss function in order to train the squeeze-excitation multiscale fusion network.

10. The system of claim 1, further comprising a satellite constellation having communication circuitry configured to transmit the plurality of RS images synchronously captured over a plurality of predetermined time periods.

11. A non-transitory computer-readable storage medium including computer executable instructions, wherein the instructions, when executed by a computer, cause the computer to perform a method for analyzing land use and land cover (LULC), the method comprising:

receiving, by network communication circuitry, a plurality of remote sensing (RS) images from multiple sources, wherein each RS image includes a geographic region, a GPS location and a timestamp;

storing, by a memory, the plurality of RS images;

iteratively training, by processing circuitry, a squeeze-excitation multiscale fusion network including:

inputting, to an input layer, the plurality of RS images from the memory, maintaining, by at least one residual block, a training gradient by integrating a shortcut connection that skips one or more layers in the at least one residual block, extracting, by a plurality of inception blocks, where each inception block includes parallel layers with different kernel sizes, features at multiple scales, enhancing the extracted features, by a dense block incorporated after a bottleneck residual block, wherein the dense block includes a plurality of convolutional layers, a concatenation layer that merges feature of a current layer with subsequent layers, and a squeeze and excitation block, determining, by a classification layer, at least one class label and a respective confidence score for the at least one class label based on the enhanced extracted features for a RS image of the plurality of RS images;

storing, in an image database, the plurality of remote sensing images with respective class label;

inputting, by a system interface, a selection of whether general or specific LULC images are of interest;

when general is selected, inputting, a date and time;

inputting whether count of number of each class is selected;

inputting whether area of each class is selected;

inputting whether there is a change in class for a location is selected;

when specific LULC is selected, inputting class name;

inputting a region of interest;

inputting a location;

inputting whether change detection is selected;

determining, by a database compute component, a count of images in each respective class for a date/time;

determining, by the database compute component, a total area of the images in each respective class for a data/time;

determining, by the database compute component, a change in an image for a region; and determining, by the database compute component, a change in an image for a location.

12. The non-transitory computer-readable storage medium of claim 11, further comprising storing, by the processing circuitry, classified remote sensing images in the image database by downstream applications, including images regarding land cover, urban settings, agriculture areas, protected areas, and natural disaster incidents, and wherein each of the classified remote sensing images are stored by one or more of the downstream applications.

13. The non-transitory computer-readable storage medium of claim 12, further comprising iteratively training, by the processing circuitry, a plurality of separate deep learning networks for the downstream applications in accordance with the training of the squeeze-excitation multiscale fusion network.

14. The non-transitory computer-readable storage medium of claim 11, the method further comprising passing, in each squeeze-excitation (SE) block, input features through a global average pooling layer to perform a squeeze operation through which a scalar value is calculated for each channel;

reshaping a resulting squeezed vector to (1, 1, C), where C is a number of channels; and applying two dense layers to the reshaped vector, wherein a first of the dense layers reduces the number of channels and a second of the dense layers restores the original number of channels.

15. The non-transitory computer-readable storage medium of claim 14, the method further comprising extracting, by each inception block embedded after a respective said SE block and having a plurality of parallel layers, different features for each said parallel layer having different kernel sizes of 1×1, 3×3, and 5×5.

16. The non-transitory computer-readable storage medium of claim 14, the method further comprising:

reducing, by a first bottleneck block having a stride of 2, spatial dimensions; and enhancing, by two other bottleneck blocks each having a stride of 1, feature extraction.

17. The non-transitory computer-readable storage medium of claim 14, wherein each dense block is connected to a respective inverted bottleneck block, and wherein each layer in a dense block is connected directly to all subsequent layers, and the method further comprising, for each dense block:

performing a 1×1 convolution;

performing a 3×3 convolution;

concatenating results of the 1×1 convolution and the 3×3 convolution; and emphasizing a region, by a respective squeeze and excitation block.

18. The non-transitory computer-readable storage medium of claim 11, the method further comprising reducing, by a compression layer in each bottleneck residual block, spatial dimensions of the extracted features.

19. The non-transitory computer-readable storage medium of claim 11, the method further comprising applying, by a machine learning engine, a crossentropy loss function in order to train the squeeze-excitation multiscale fusion network.

20. The non-transitory computer-readable storage medium of claim 11, the method further comprising transmitting, by satellite communication circuitry of a satellite constellation to a base station, a plurality of RS images captured synchronously over a plurality of predetermined time periods.

* * * * *